(12) United States Patent
Tomic et al.

(10) Patent No.: US 8,830,873 B2
(45) Date of Patent: Sep. 9, 2014

(54) FLEXIBLE RADIX SWITCH

(75) Inventors: Ratko V. Tomic, Lexington, MA (US); Christopher John Williams, Manchester by the Sea, MA (US); Leigh Richard Turner, Charlestown, MA (US); Reed Graham Lewis, Hudson, MA (US)

(73) Assignee: Infinetics Technologies, Inc., Charlestown, MA (US)

( * ) Notice: Subject to any disclaimer, the term of this patent is extended or adjusted under 35 U.S.C. 154(b) by 115 days.

(21) Appl. No.: 13/466,907

(22) Filed: May 8, 2012

(65) Prior Publication Data

US 2013/0083701 A1 Apr. 4, 2013

Related U.S. Application Data

(60) Provisional application No. 61/483,686, filed on May 8, 2011, provisional application No. 61/483,687, filed on May 8, 2011.

(51) Int. Cl.
*H04L 12/28* (2006.01)
*G06F 15/177* (2006.01)

(52) U.S. Cl.
USPC .......................................... 370/255; 709/220

(58) Field of Classification Search
CPC ......... H04L 41/12; H04L 45/02; H04L 45/00; H04L 49/10; H04L 49/15; H04L 45/04; H04L 12/40; H04L 12/42; H04L 12/4637; H04L 12/437
USPC .......... 370/254–258, 386, 400; 709/220–222, 709/223–226
See application file for complete search history.

(56) References Cited

U.S. PATENT DOCUMENTS

| | | | | |
|---|---|---|---|---|
| 5,125,076 A | * | 6/1992 | Faber et al. | 709/245 |
| 5,684,959 A | * | 11/1997 | Bhat et al. | 709/224 |
| 5,793,975 A | * | 8/1998 | Zeldin | 709/224 |
| 6,046,988 A | * | 4/2000 | Schenkel et al. | 370/254 |
| 6,697,338 B1 | * | 2/2004 | Breitbart et al. | 370/254 |
| 6,829,641 B2 | * | 12/2004 | Schenkel et al. | 709/224 |
| 6,928,475 B2 | * | 8/2005 | Schenkel et al. | 709/224 |
| 7,272,770 B2 | * | 9/2007 | Matsumoto | 714/752 |
| 7,369,513 B1 | * | 5/2008 | Sankaran | 370/256 |
| 2007/0162811 A1 | * | 7/2007 | Matsumoto | 714/749 |

OTHER PUBLICATIONS

WO2012/154751, Flexible Switching Network, Application's PCT equivalent with ISR. Nov. 15, 2012.*
Mudigonda et al., "Taming the Flying Cable Monster: A Topology Design and Optimization Framework for Data-Center Networks", HP Labs, Palo Alto, CA USENIX ATC-11, slides 1-33, 2011.
Lee et al., "Network Topology Analysis", Sandia Report SAND2008-0069, Sandia National Laboratories, Albequerque, NM and Livermore, CA, pp. 1-45, 2008.

(Continued)

*Primary Examiner* — Warner Wong
(74) *Attorney, Agent, or Firm* — Nixon Peabody LLP; David F. Crosby

(57) ABSTRACT

A system and method for interconnecting nodes and routing data packets in high radix networks includes constructing or redefining a network structure to provide improved performance. Computation and data storage nodes are connected to a network of switching nodes that provide near optimum bandwidth and latency for networks of any size. Specialized interconnection patterns and addressing methods ensure reliable data delivery in very large networks with high data traffic volume.

20 Claims, 26 Drawing Sheets

(56) References Cited

OTHER PUBLICATIONS

Kim et al., "Flattened Butterfly: A Cost-Efficient Topology for High-Radix Networks", ISCA '07, pp. 126-137, Stanford University, 2007.
Kim, "High-Radix Interconnection Networks", PhD thesis, Stanford University, 2008.
Abts et al., "High Performance Datacenter Networks: Architectures, Algorithms, and Opportunities", Morgan & Claypool, 2011.
Abts et al., "Energy Proportional Datacenter Networks", ISCA '10, Saint-Malo, France, pp. 338-347, 2010.
Guo et al., "BCube: A High Performance, Server-centric Network Architecture for Modular Data Centers", SIGCOMM '09, Barcelona, Spain, pp. 63-74, 2009.
Wu et al., "MDCube: A High Performance Network Structure for Modular Data Center Interconnection", CoNEXT '09, Rome, Italy., pp. 25-36, 2009.
Guo et al., "DCell: A Scalable and Fault-Tolerant Network Structure for Data Centers", SIGCOMM, Seattle, WA, pp. 75-86, 2008.
Ahn et al., "HyperX: Topology, Routing, and Packaging of Efficient Large-Scale Networks", SC09, Portland, OR, pp. 14-20, 2009.
Kim et al., "Technology-Driven, Highly-Scalable Dragonfly Topology", ISCA '08, IEEE, pp. 77-88, 2008.
Akers et al., "A Group-Theoretic Model for Symmetric Interconnection Networks", IEEE Transactions on Computers, vol. 38, No. 4, pp. 555-566, 1989.
Donetti et al., "Optimal network topologies: Expanders, Cages, Ramanujan graphs, Entangled networks and all that", http://arxiv.org/abs/cond-mat/0605565, Jun. 15, 2006.
Bra-ket notation, http://en.wikipedia.org/wiki/Bra-ket_notation, Mar. 18, 2014.
Arndt "Matters Computational: Ideas, Algorithms, Source Code", Springer, 2011.
Macwilliams et al., "The Theory of Error-Correcting Codes", North-Holland Publishing Co., 1977.
Moon, "Error Correction Coding, Mathematical Methods and Algorithms", John Wiley & Sons, Inc., Hoboken, NJ, 2005.
Brouwer et al., Code Tables, http://www.codetables.de/, Mar. 18, 2014.
Steinberg, "Representation Theory of Finite Groups", Springer, 2011.
Horn et al., "Matrix Analysis", Cambridge University Press, 1985, Chapters 1, 2 and 4 only.
Schurer, "Ordered Orthogonal Arrays And Where to Find Them", Univ. of Salzburg PhD thesis, 2006.
Schmid et al., MinT Database http://mint.sbj.ac.at/index.php, Mar. 18, 2014.
Iglesias et al., "Walsh Transforms, Balanced Sum Theorems and Partition Coefficients over Multary Alphabets", GECCO '05, Washington, DC, pp. 1303-1308, 2005.
Cook et al., "The Hypercube Graph and the Inhibitory Hypercube Network", California State University, Channel Islands, 2006.

\* cited by examiner

| φ = 4 | | Virtual Servers (10G NICs) | | | Physical Servers (1G NICs) | | | Bisection | Max Power |
|---|---|---|---|---|---|---|---|---|---|
| HC dim | Switches | 10G Ports | $/10G port | Cost $1000s | TORs 1G | 1G Ports | $/1G port | Gb/s | W/10G port |
| 3 | 8 | 219 | 438 | 96 | 55 | 2,633 | 99 | 549 | 12.8 |
| 4 | 16 | 384 | 500 | 192 | 96 | 4,608 | 104 | 960 | 14.6 |
| 5 | 32 | 683 | 563 | 384 | 171 | 8,192 | 109 | 1,707 | 16.4 |
| 6 | 64 | 1,229 | 625 | 768 | 307 | 14,746 | 115 | 3,072 | 18.2 |
| 7 | 128 | 2,234 | 688 | 1,536 | 559 | 26,810 | 120 | 5,585 | 20.1 |
| 8 | 256 | 4,096 | 750 | 3,072 | 1,024 | 49,152 | 125 | 10,240 | 21.9 |
| 9 | 512 | 7,562 | 813 | 6,144 | 1,890 | 90,742 | 130 | 18,905 | 23.7 |
| 10 | 1024 | 14,043 | 875 | 12,288 | 3,511 | 168,521 | 135 | 35,109 | 25.5 |
| 11 | 2048 | 26,214 | 938 | 24,576 | 6,554 | 314,573 | 141 | 65,536 | 27.3 |
| 12 | 4096 | 49,152 | 1,000 | 49,152 | 12,288 | 589,824 | 146 | 122,880 | 29.2 |
| 13 | 8192 | 92,521 | 1,063 | 98,304 | 23,130 | 1,110,257 | 151 | 231,304 | 31.0 |
| 14 | 16384 | 174,763 | 1,125 | 196,608 | 43,691 | 2,097,152 | 156 | 436,907 | 32.8 |
| 15 | 32768 | 331,129 | 1,188 | 393,216 | 82,782 | 3,973,551 | 161 | 827,823 | 34.6 |
| 16 | 65536 | 629,146 | 1,250 | 786,432 | 157,286 | 7,549,747 | 167 | 1,572,864 | 36.5 |
| 17 | 131072 | 1,198,373 | 1,313 | 1,572,864 | 299,593 | 14,380,471 | 172 | 2,995,931 | 38.3 |
| 18 | 262144 | 2,287,802 | 1,375 | 3,145,728 | 571,951 | 27,453,626 | 177 | 5,719,505 | 40.1 |
| 19 | 524288 | 4,376,665 | 1,438 | 6,291,456 | 1,094,166 | 52,519,981 | 182 | 10,941,663 | 41.9 |
| 20 | 1048576 | 8,388,608 | 1,500 | 12,582,912 | 2,097,152 | 100,663,296 | 188 | 20,971,520 | 43.8 |

*Fig. 16*

| λ = 1 | | Virtual Servers (10G NICs) | | | Physical Servers (1G NICs) | | | Bisection | Max Power |
|---|---|---|---|---|---|---|---|---|---|
| HC dim | Switches | 10G Ports | $/10G port | Cost $1000s | TORs 1G | 1G Ports | $/1G port | Gb/s | W/10G port |
| 3 | 8 | 192 | 500 | 96 | 48 | 2,304 | 104 | 640 | 14.6 |
| 4 | 16 | 384 | 500 | 192 | 96 | 4,608 | 104 | 960 | 14.6 |
| 5 | 32 | 768 | 500 | 384 | 192 | 9,216 | 104 | 1,536 | 14.6 |
| 6 | 64 | 1,536 | 500 | 768 | 384 | 18,432 | 104 | 2,560 | 14.6 |
| 7 | 128 | 3,072 | 500 | 1,536 | 768 | 36,864 | 104 | 4,389 | 14.6 |
| 8 | 256 | 6,144 | 500 | 3,072 | 1,536 | 73,728 | 104 | 7,680 | 14.6 |
| 9 | 512 | 12,288 | 500 | 6,144 | 3,072 | 147,456 | 104 | 13,653 | 14.6 |
| 10 | 1024 | 24,576 | 500 | 12,288 | 6,144 | 294,912 | 104 | 24,576 | 14.6 |
| 11 | 2048 | 49,152 | 500 | 24,576 | 12,288 | 589,824 | 104 | 44,684 | 14.6 |
| 12 | 4096 | 98,304 | 500 | 49,152 | 24,576 | 1,179,648 | 104 | 81,920 | 14.6 |
| 13 | 8192 | 196,608 | 500 | 98,304 | 49,152 | 2,359,296 | 104 | 151,237 | 14.6 |
| 14 | 16384 | 393,216 | 500 | 196,608 | 98,304 | 4,718,592 | 104 | 280,869 | 14.6 |
| 15 | 32768 | 786,432 | 500 | 393,216 | 196,608 | 9,437,184 | 104 | 524,288 | 14.6 |
| 16 | 65536 | 1,572,864 | 500 | 786,432 | 393,216 | 18,874,368 | 104 | 983,040 | 14.6 |
| 17 | 131072 | 3,145,728 | 500 | 1,572,864 | 786,432 | 37,748,736 | 104 | 1,850,428 | 14.6 |
| 18 | 262144 | 6,291,456 | 500 | 3,145,728 | 1,572,864 | 75,497,472 | 104 | 3,495,253 | 14.6 |
| 19 | 524288 | 12,582,912 | 500 | 6,291,456 | 3,145,728 | 150,994,944 | 104 | 6,622,585 | 14.6 |
| 20 | 1048576 | 25,165,824 | 500 | 12,582,912 | 6,291,456 | 301,989,888 | 104 | 12,582,912 | 14.6 |

*Fig. 17*

| Dim=4 N=16 | | | Dim=6 N=64 | | | Dim=12 N=4096 | | | Dim=16 N=65536 | | |
| --- | --- | --- | --- | --- | --- | --- | --- | --- | --- | --- | --- |
| #LH | LH | MaxH AvgHops | #LH | LH | MaxH AvgHops | #LH | LH | MaxHops AvgHops | #LH | LH | MaxHops AvgHops |
| 0 | 0 | 4 2.0000 | 0 | 00 | 6 3.0000 | 0 | 000 | 12 6.0000 | 0 | 0000 | 16 8.0000 |
| 1 | F | 2 1.6667 | 1 | 3F | 3 2.4444 | 1 | FFF | 6 5.0349 | 1 | FFFF | 8 6.8309 |
| 2 | 3 | 2 1.6000 | 2 | 07 | 3 2.3492 | 2 | 03F | 6 4.8137 | 2 | 00FF | 8 6.5392 |
| 3 | 5 | 2 1.5333 | 3 | 0B | 3 2.2698 | 3 | 1C7 | 6 4.5797 | 3 | 0F0F | 8 6.2314 |
| 4 | 6 | 2 1.4667 | 4 | 0D | 3 2.1905 | 4 | 2D9 | 6 4.3504 | 4 | 3333 | 8 5.9252 |
| 5 | 7 | 2 1.4000 | 5 | 0E | 3 2.1111 | 5 | 36A | 6 4.1392 | 5 | 5555 | 8 5.6185 |
| 6 | 9 | 2 1.3333 | 6 | 13 | 3 2.0476 | 6 | 3B4 | 6 4.0117 | 6 | 96AC | 8 5.4060 |
| 7 | A | 2 1.2667 | 7 | 15 | 3 1.9841 | 7 | 4EC | 6 3.8662 | 7 | A9C6 | 7 5.2363 |
| 8 | B | 2 1.2000 | 8 | 16 | 3 1.9206 | 8 | 571 | 6 3.7485 | 8 | 17E7 | 7 5.1144 |
| 9 | C | 2 1.1333 | 9 | 19 | 3 1.8571 | 9 | 59A | 6 3.6459 | 9 | 1C72 | 7 5.0045 |
| 10 | D | 2 1.0667 | 10 | 1A | 2 1.7937 | 10 | 656 | 6 3.5431 | 10 | 2560 | 7 4.9073 |
| 11 | E | 1 1.0000 | 11 | 1C | 2 1.7302 | 11 | 6A3 | 6 3.4442 | 11 | 477A | 7 4.8047 |
| 12 | 1 | 1 1.0000 | 12 | 03 | 2 1.7143 | 12 | 70D | 4 3.3534 | 12 | 79B5 | 7 4.7171 |
| 13 | 1 | 1 1.0000 | 13 | 05 | 2 1.6984 | 13 | 04B | 4 3.3272 | 13 | F25D | 6 4.6295 |
| 14 | 1 | 1 1.0000 | 14 | 06 | 2 1.6825 | 14 | 057 | 4 3.3006 | 14 | 039A | 6 4.5360 |
| 15 | 1 | 1 1.0000 | 15 | 09 | 2 1.6667 | 15 | 065 | 4 3.2733 | 15 | 0734 | 6 4.4707 |
| 16 | 1 | 1 1.0000 | 16 | 0A | 2 1.6508 | 16 | 09B | 4 3.2464 | 16 | 0ACD | 6 4.4065 |
| 17 | 1 | 1 1.0000 | 17 | 0C | 2 1.6349 | 17 | 0E2 | 4 3.2256 | 17 | 184B | 6 4.3458 |
| 18 | 1 | 1 1.0000 | 18 | 0F | 2 1.6190 | 18 | 129 | 4 3.2027 | 18 | 2A25 | 6 4.2856 |
| 19 | 1 | 1 1.0000 | 19 | 11 | 2 1.6032 | 19 | 213 | 4 3.1778 | 19 | 3E96 | 6 4.2275 |
| 20 | 1 | 1 1.0000 | 20 | 12 | 2 1.5873 | 20 | 491 | 4 3.1556 | 20 | 9E1D | 5 4.1678 |

FLEXIBLE RADIX SWITCH

CROSS-REFERENCE TO RELATED APPLICATIONS

This application claims any and all benefits as provided by law, including benefit under 35 U.S.C. §119(e) of U.S. Provisional Application Nos. 61/483,686 and 61/483,687, both filed on May 8, 2011, both of which are hereby incorporated by reference in their entirety.

STATEMENT REGARDING FEDERALLY SPONSORED RESEARCH

Not Applicable

REFERENCE TO MICROFICHE APPENDIX

Not Applicable

FIELD OF THE INVENTION

The invention relates generally to the interconnection of nodes in a network. More specifically, the invention relates to interconnected nodes of a communication network that provide some combination of computation and/or data storage and provide an efficient interchange of data packets between the interconnected nodes. The network can be defined by a base network structure that can be optimized by selectively defining and connecting long hops between sections of the network, for example, to reduce the network diameter.

The invention provides a system and method for creating a cost-effective way of connecting together a very large number of producers and consumers of data streams.

BACKGROUND OF THE INVENTION

One real world analogy is the methods for constructing roadway networks that allow drivers to get from a starting location to a destination while satisfying real world constraints such as 1) a ceiling on the amount of tax people are willing to pay to fund roadway construction; 2) a desire to maximize speed of travel subject to safety constraints; and 3) a desire to avoid traffic jams at peak travel times of day.

In this analogy, the cars are similar to the data sent over a computer network and the starting locations and destinations represent the host computers connected to the network. The constraints translate directly into cost, speed and congestion constraints in computer networks.

The basic quality of solving these types of problems is that they get much harder to solve efficiently as the number of starting locations and destinations (e.g., host computers) increases. As a starting point, consider how three destinations can be connected together. FIGS. 1A and 1B show that there are really only two alternatives. The number of ways to connect the destinations together grows along with the number of destinations, for example, with four destinations, some of the possible methods of connection are shown in FIGS. 1C, 1D, 1E and 1F.

As can be seen from the figures, both the number of connections between nodes and the number of different ways of making those connections grows faster than the number of connections. For example, a set of 6 nodes can have more than twice as many alternative ways to connect the nodes as a set of 3 nodes. Also, the possible number of connections between the nodes can vary from, on the low side, the number of nodes (N) minus 1 for destinations connected, for example, along a single line as shown in FIG. 1C, to N(N−1)/2 connections as shown in FIG. 1F, where every single node has a direct connection to every other node.

Another measure of the performance of a network is the diameter of the network, which refers to how many connections need to be traveled in order to get from any one destination to another. In the network shown in FIG. 1C, its economy in the number of connections (3) is offset by the consequence that the only path, from one end of the network to the other, requires travel across three connections, thus slowing the journey. On the other hand as shown in FIG. 1F, the large number of connections results in every destination only being one connection away from any other, permitting more rapid travel.

The two networks shown in FIGS. 1C and 1F can also have very different behavior at peak traffic times. Assuming that each connection can support the same rate of traffic flow, the two end point nodes of the network shown in FIG. 1C will be affected if there is a lot of traffic traveling between the two nodes in the middle of the line. Conversely, in network shown in FIG. 1F, since there is an individual connection between every possible combination of nodes, traffic flowing between two nodes is not affected at all by traffic flowing between a different pair of nodes.

Another difficulty arises in the construction of computer networks: It is difficult to have a large number of connections converging on a single point, such as shown in FIG. 1F. In a computer data center, the devices that allow multiple connections to converge are called switches. These switches that allow multiple connections to converge typically have physical limitations on the number of connections or ports, for example, around 50 ports for inexpensive switches, and can approach 500 ports for more modem, expensive switches. This means that for a fully-meshed network like that shown in FIG. 1F where delays and congestion are minimized, no more than, for example, 499 destination hosts could be connected together.

SUMMARY OF THE INVENTION

The sample network layouts shown in FIGS. 1A-1F, 2A-2C, and in fact all other network layouts conceived to date, suffer from a fundamental tradeoff between the cost and difficulty of building the network, and the ability of the network to support high traffic rates. The present invention allows for the design of networks that can include a very large number of connections and a high level of complexity of the switches that manage those connections, while providing very high immunity from the congestion that limits the ability of all nodes to communicate with each other at maximum speed, no matter how other nodes are using the network.

The emergence of "cloud computing", supported by huge data centers where hundreds of thousands of computers all connected to one network provide economies of scale and thereby reduced costs, has stressed the ability of current network designs to provide a reliable and cost effective way of allowing data to be exchanged between the computers.

A number of approaches have been tried by both academia and industry, but to date, all the approaches fall short of theoretical limits by a factor of 2 to 5 times. Some embodiments of the invention include a method for constructing networks that can be within 5-10% of the theoretical maximum for data throughput across networks with multiple simultaneously communicating hosts, a highly prevalent use case in modern data centers.

In accordance with some embodiments of the invention, methods for constructing highly ordered networks of hosts and switches are disclosed that make maximum use of available switch hardware and interconnection wiring. The basic approach can include the following: selecting a symmetrical network base design, such as, a hypercube, a star, or another member of the Cayley graph family; developing an appropriate topological routing method that simplifies data packet forwarding; and adding short cuts or long hops to the base symmetrical network to reduce the network diameter.

The regularity of symmetrical networks makes them well suit for topological addressing schemes.

It is one of the objects of the present invention to provide an improved network design that can be expanded greatly without performance penalty.

It is another object of the present invention to provide an improved network design allows the network to be more easily operated and managed. In some embodiments, the entire network can be operated and managed as a single switch.

It is another object of the present invention to provide an improved network design that provided improved network performance. In some embodiments, the network can have 2 to 5 times greater bisection bandwidth than with conventional network architectures that use the same number of component switches and ports.

The invention also includes flexible methods for constructing physical embodiments of the networks using commercially available switches and method for efficiently, accurately and economically interconnecting (wiring) the switched together to form a high performance network having improved packet handing.

DESCRIPTION OF DRAWINGS

FIG. 16 illustrates data center available bandwidth and cost for 4× external/topology port ratio.

FIG. 17 illustrates data center available bandwidth and cost for 1× external/topology port ratio.

FIG. 18 illustrates the reduction in average and maximum hops.

FIG. 19 illustrates optimized wiring pattern using port dimension mapping according to an embodiment of the invention.

DETAILED DESCRIPTION OF EMBODIMENTS OF THE INVENTION

Figure 1A:
FIGS. 1A-1F show sample network layouts.
Figure 1B:
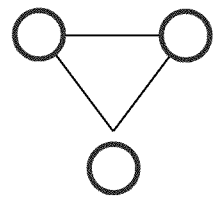
Figure 1C:
Figure 1D:
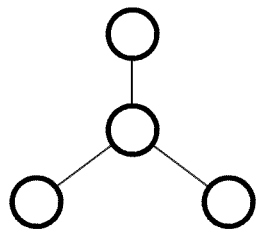
Figure 1E:
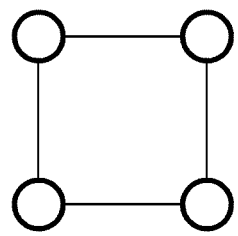
Figure 1F:
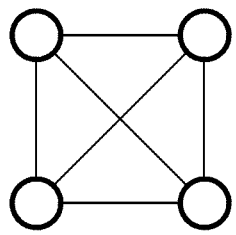

The present invention is directed methods and systems for designing large networks and the resulting large networks. In accordance with some embodiments of the invention, a way of connecting large numbers of nodes, consisting of some combination of computation and data storage, and providing improved behaviors and features. These behaviors and features can include: a) practically unlimited number of nodes, b) throughput which scales nearly linearly with the number of nodes, without bottlenecks or throughput restriction, c) simple incremental expansion where increasing the number of nodes requires only a proportional increase in the number of switching components, while maintaining the throughput per node, d) maximized parallel multipath use of available node interconnection paths to increase node-to-node bandwidth, e) Long hop topology enhancements which can simultaneously minimize latency (average and maximum path lengths) and maximize throughput at any given number of nodes, f) a unified and scalable control plane, g) a unified management plane, h) simple connectivity—nodes connected to an interconnection fabric do not need to have any knowledge of topology or connection patterns, i) streamlined interconnection path design—dense interconnections can be between physically near nodes, combined with a reduced number of interconnections between physically distant nodes, resulting in simple interconnection or wiring.

In one embodiment of the invention, the nodes can represent servers or hosts and network switches in a networked data center, and the interconnections represent the physical network cables connecting the servers to network switches, and the network switches to each other.

In another embodiment of the invention, the nodes can represent geographically separated clusters of processing or data storage centers and the network switches that connect them over a wide area network. The interconnections in this case can be the long distance data transfer links between the geographically separated data centers.

Those skilled in the art will realize that the described invention can be applied to many other systems where computation or data storage nodes require high bandwidth interconnection, such as central processing units in a massively parallel supercomputer or other multiple CPU or multi-core CPU processing arrays.

In accordance with some embodiments of the invention, component switches can be used as building blocks, wherein the component switches are not managed by data center administrators as individual switches. Instead, switches can be managed indirectly via the higher level parameters characterizing collective behavior of the network, such as latency (maximum and average shortest path lengths), bisection (bottleneck capacity), all-to-all capacity, aggregate oversubscription, ratio of external and topological ports, reliable transport behavior, etc. Internal management software can be used to translate selected values for these collective parameters into the internal configuration options for the individual switches and if necessary into rewiring instructions for data center technicians. This approach makes management and monitoring scalable.

Hypercubes and their variants have attracted great deal of attention within parallel and supercomputer fields, and recently for data center architectures as well due to their highly efficient communications, high fault tolerance and reliable diagnostics, lack of bottlenecks, simple routing & processing logistics, and simple, regular construction. In accordance with some embodiments of the invention, a method of designing an improved network includes modifying a basic hypercube network structure in order to optimize latency and bandwidth across the entire network. Similar techniques can be used to optimize latency and bandwidth across other Cayley graph symmetrical networks such as star, pancake and truncated hypercube networks.

Figure 2A:
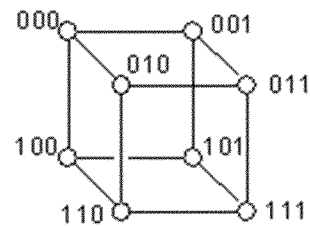
FIGS. 2A-2C show symmetrical network structures according to some embodiments of the invention.
Figure 2B:
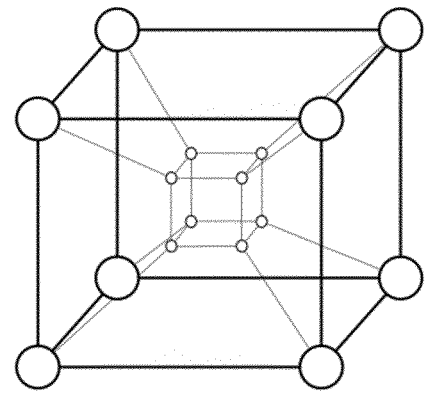

A symmetrical network is one that, from the perspective of a source or a destination looks the same no matter where you are in the network and which allows some powerful methods to be applied for developing both routing methods for moving traffic through the network and for adding short cuts to improve throughput and reduce congestion. One commonly known symmetrical network structure is based on the structure of a hypercube. The hypercube structured network can include a set of destinations organized as the corners of a cube, such as shown in FIG. 2A. The structure shown in FIG. 2A is known as an order 3 hypercube, based on each destination having three connections to neighboring destinations. To generate a higher order hypercube, copy the original hypercube and connect all the destinations in the first hypercube with the corresponding destination in the copy as shown in FIG. 2B.

Figure 2C:
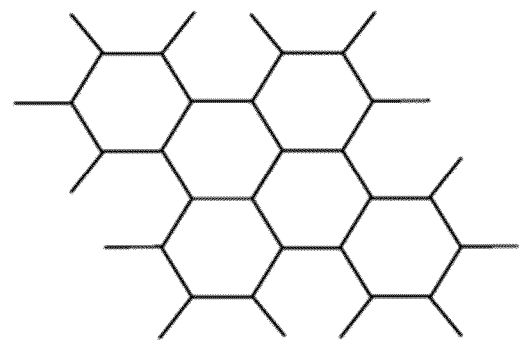

Hypercubes are just one form of symmetrical network. Another form of symmetrical network is the star graph shown in FIG. 2C. There are many other types of symmetrical networks, known formally as Cayley graphs that can be used as a basis on which to apply the methods of the invention.

Figure 3A:
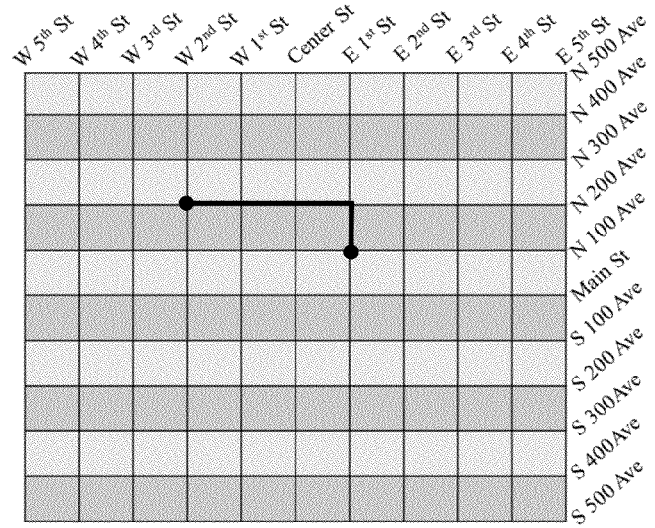
FIGS. 3A and 3B show an example of topological routing.

In accordance with some embodiments of the present invention, topological routing can be used route messages through the symmetrical network. Topological routing can include a method for delivering messages from a source node to a destination node through a series of intermediate locations or nodes where the destination address on the message describes how to direct the message through the network. A simple analogy is the choice of method for labeling streets and numbering houses in a city. In some planned areas such as Manhattan, addresses not only describe a destination location, "425 17$^{th}$ Street", but also describe how to get there from a starting point. If it is known that house numbers are allocated 100 per block, and the starting location is 315 19$^{th}$ Street, it can be determined that the route includes going across one block and down two streets to get to the destination. Similarly, for the organization shown in FIG. 3A, traveling from N 200 W. 2$^{nd}$ Street to N 100 E 1$^{st}$ Street can include going east 3 blocks and south one block.

Figure 3B:
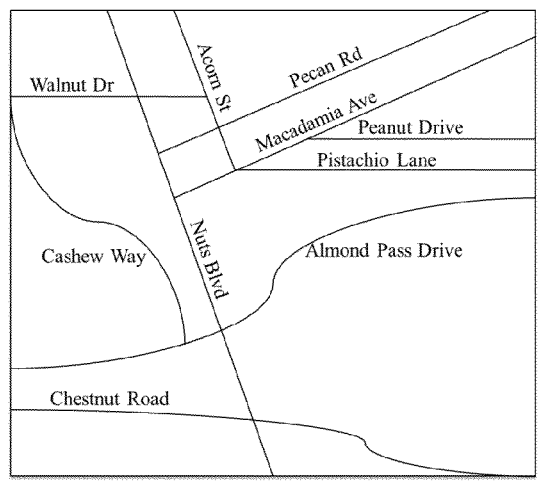

In contrast, a typical unplanned town like Concord, Mass., shown in FIG. 3B, has road that are not laid out in any regular pattern and the names for streets have no pattern either. This "plan" requires a "map" to determine how to get from one place to another.

Topological addressing is important in large networks because it means that a large map does not have to be both generated and then consulted at each step along the way of sending a message to a destination. Generating a map is time consuming and consumes a lot of computing resources, and storing a map at every step along the way between destinations consumes a lot of memory storage resources and requires considerable computation to look up the correct direction on the map each time a message needs to be sent on its way towards its destination. The small maps required by topological addressing are not just a matter of theoretical concern. Present day data centers have to take drastic, performance impacting measures to keep their networks divided into small enough segments that the switches that control the forwarding of data packets do not get overwhelmed with building a map for the large number of destinations for which traffic flows through each switch.

The regularity of symmetrical networks makes them excellent candidates for having topological addressing schemes applied to them, just as a regular, basically symmetrical, arrangement of streets allows addresses to provide implied directions for getting to them.

Figure 4A:
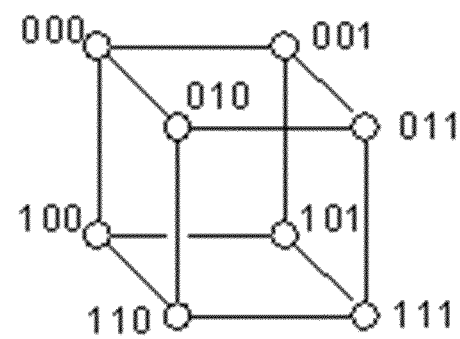
FIG. 4A shows an order 3 hypercube and FIG. 4B shows an order 3 hypercube with shortcuts added.
Figure 4B:
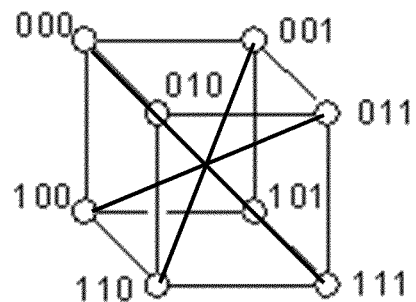

In accordance with some embodiments of the invention, the performance of these symmetrical networks can be greatly improved by the select placement of "short cuts" or long hops according to the invention. The long hops can simultaneously reduce the distance between destinations and improve the available bandwidth for simultaneous communication. For example, FIG. 4A show a basic order 3 hypercube, where the maximum distance of three links between destination nodes occurs at the opposite corners. In accordance with some embodiments of the invention, adding shortcuts across all three corners as shown in FIG. 4B reduces the distance between the destinations that used to have the worst case distance of three to a distance of one link.

In accordance with some embodiments of the invention, this method can be applied to hypercubes of higher order with many more destinations. In accordance with some of the embodiments of the invention, a method for identifying select long hops in higher order hypercube networks and symmetric networks can include determining a generator matrix using linear error correcting codes to identify potential long hops within the network.

Figure 5:
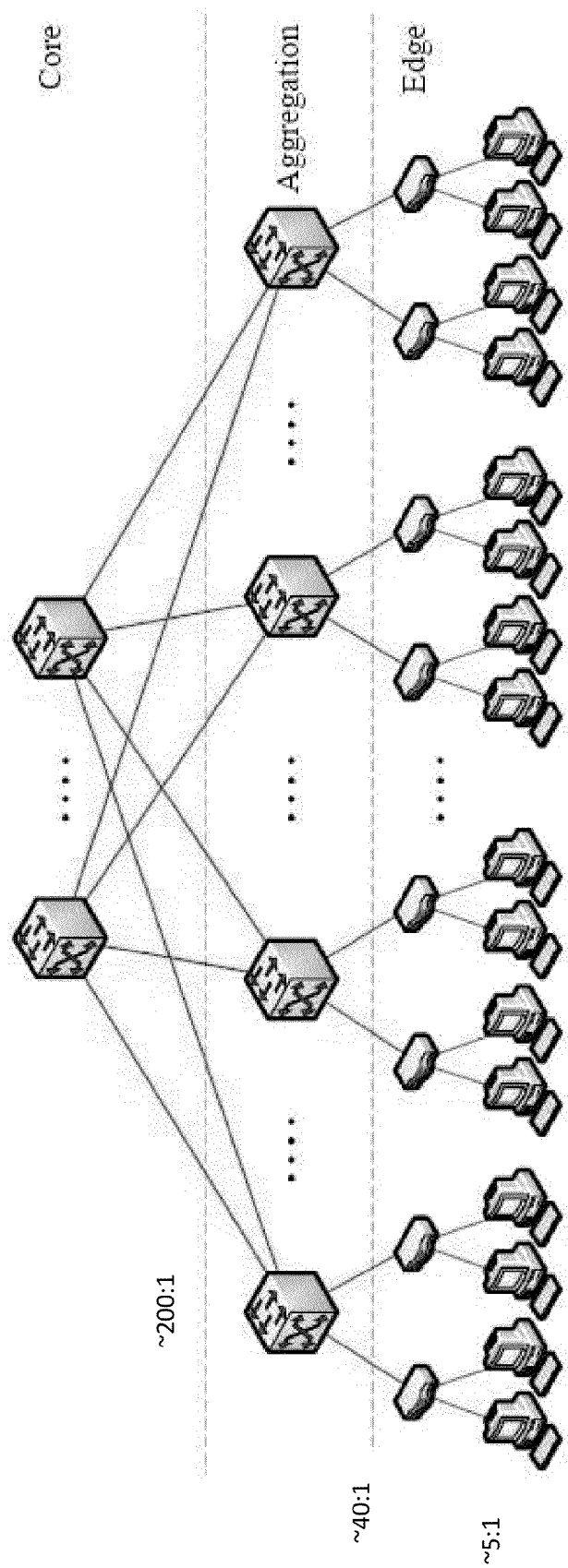
FIG. 5 illustrates a typical large data center layer 2 network architecture.

FIG. 5 shows a diagram of a typical commercial data center. FIG. 5 also shows the typical port oversubscription ratios, and hence bottlenecks, at each level (core, aggregation, and edge) of the network, that result from the traditional approaches to building data centers. In addition, none of these approaches work well as the number of devices connected to the network increase exponentially, as has happened as a result of adoption of highly centralized data centers with large numbers of host computers or servers at a single location.

All real world network implementations are limited by the physical constraints of constructing switches and wiring them together. With the limitations of conventional wiring techniques, one of the parameters that can be adjusted to improve network performance is to increase the number of ports per network switch, which allows that group of ports to exchange data with very high throughput within the single physical device. Problems then arise maintaining that high throughput when groups of switches have to be assembled in order to connect a large number of servers together. Switch manufacturers have been able to increase the number of ports per switch into the several hundreds (e.g., 500), and some new architectures claim the ability to create switch arrays that have several thousand ports. However, that is two to three orders of magnitude less than the number of servers in large data centers. The number of switch ports is referred to as the "radix" of the switch.

In accordance with some embodiments of the invention, one difference between networks according to the invention and the prior art, networks according to the invention can be expanded (increasing the number of host computer ports) practically, without limit or performance penalty. The expansion can be flexible, using commodity switches having a variable radix. Although there are presently switches which can be upgraded from an initial configuration with a smaller radix to a configuration with a higher radix, the latter maximum radix is fixed in advance to at most a few hundred ports. Further, the 'radix multiplier' switching fabric for the maximum configuration is hardwired in the switch design. For example, a typical commercial switch such as the Arista 7500 can be expanded to 384 ports by adding up to 8 line cards, each providing 48 ports; but the switching fabric gluing the 8 separate 48 port switches into one 384 port switch is rigidly fixed by the design and it is even included in the basic unit. In contrast, the networks constructed according some embodiments of the invention have no upper limit on the maximum number of ports it can provide. And this holds for an initial network design as well as any subsequent expansion of the same network. In accordance with some embodiments of the invention, for any given type of switch having radix R, the upper limit for simple expansion without performance penalty is $2^{R-1}$ component switches. Since typical R is at least 48, even this conditional limit of $2^{47} \approx 1.4 \cdot 10^{14}$ on the radix expansion is already far larger than the number of ports in the entire interne, let alone in any existing or contemplated data center.

Another difference between networks according to some embodiments of the invention and prior art data centers is that data center layer 2 networks are typically operated and managed as networks of individual switches where each switch requires individual installation, configuration, monitoring and management. In accordance with some embodiments of the invention, the data center network can be operated and managed as a single switch. This allows the invention to optimize all aspects of performance and costs (of switching fabric, cabling, operation and management) to a far greater degree than existing solutions.

In addition, networks according to some embodiments of the invention can provide improved performance over any existing data center Layer 2 networks, on the order of 2 to 5 times greater bisection bandwidth than conventional network architectures that use the same number of component switches and ports.

The invention also describes novel and flexible methods for realizing physical embodiments of the network systems described, both in the area of wiring switches together efficiently, accurately and economically, as well as ways to use existing functionality in commercial switches to improve packet handing.

Figure 6:
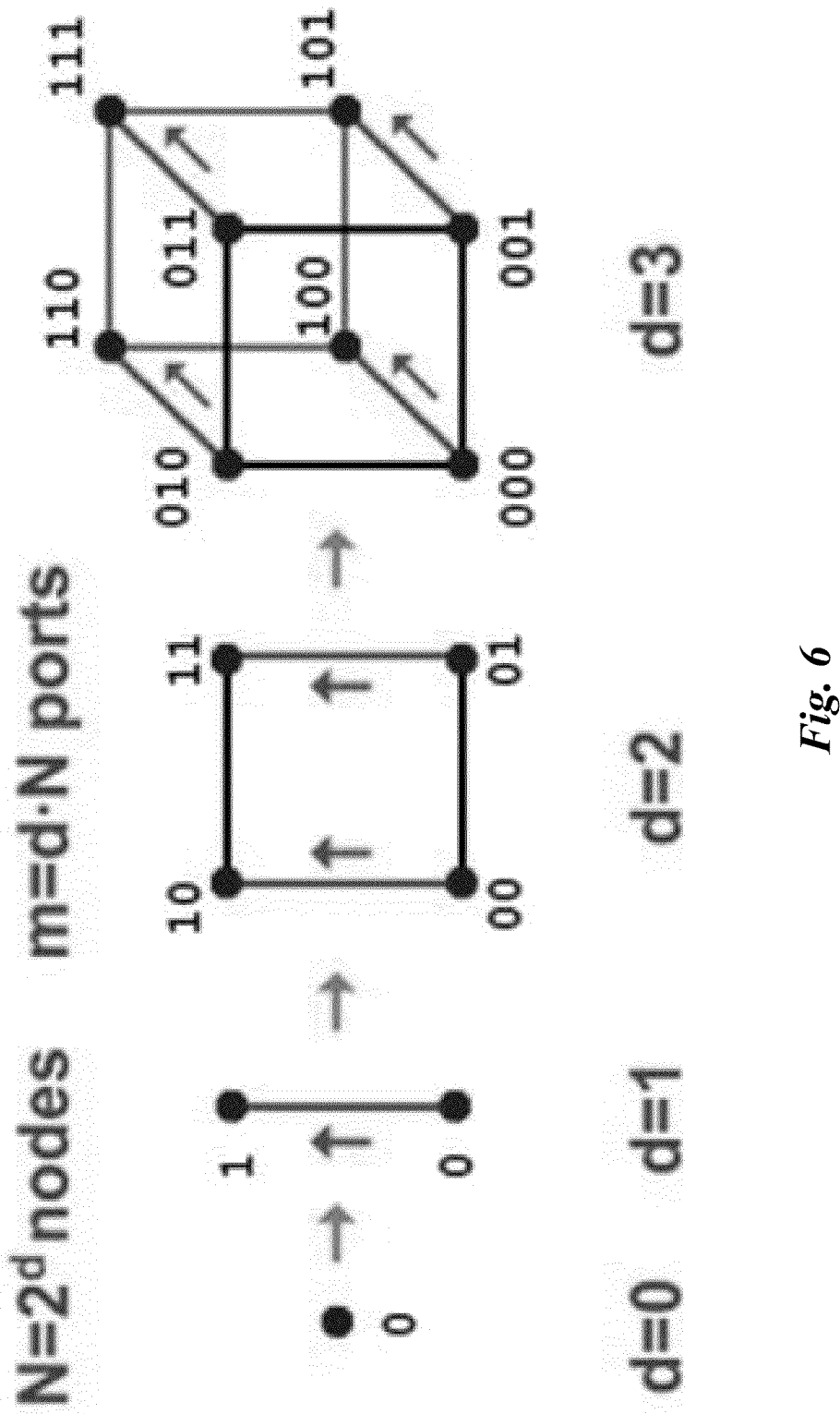
FIG. 6 illustrates hypercube notation and construction.

Hypercubes can be characterized by their number of dimensions, d. To construct a (d+1)-cube, take two d-cubes and connect all $2^d$ corresponding nodes between them, as shown in FIG. 6 for transitions d: 0→1→2→3 (red lines indicate added links joining two d-cubes).

For purpose of illustrating one embodiment of the invention, a d-cube can be a d-dimensional binary cube (or Hamming cube, hypercube graph) with network switches as its nodes, using d ports per switch for the d connections per node. By convention, coordinate values for nodes can be 0 or 1, e.g. a 2-cube has nodes at (x, y)=(0,0), (0,1), (1,0), (1,1), or written concisely as binary 2-bit strings: 00, 01, 10 and 11.

Each switch can have some number of ports dedicated to interconnecting switches, and hosts can be connected to some or all of the remaining ports not used to interconnect switches. Since the maximum number of switches N in a d-cube is $N=2^d$, the dimensions d of interest for typical commercial scalable data center applications can include, for example, d=10 . . . 16, i.e. d-cubes with 1K-64K switches, which corresponds to a range of 20K-1280K physical host (computers or servers), assuming a typical subscription of 20 hosts per switch.

In accordance with some embodiments of the invention, a concise binary d-bit notation for nodes (and node labels) of a d-cube can be used. The hops, defined as the difference vectors between directly connected nodes, can be d-bit strings with a single bit=1 and (d−1) bits=0. The jumps (difference vectors) between any two nodes $S_1$ and $S_2$ can be: $J_{12} = S_1\hat{\ }S_2$ ($\hat{\ }$ is a bitwise XOR) and the minimum number of hops (distance or the shortest path) L between them is the Hamming weight (count of 1's) of the jump $J_{12}$ i.e. $L \equiv L(J_{12}) = |J_{12}|$. There are exactly L! distinct shortest paths of equal length L between any two nodes $S_1$ and $S_2$ at distance L. The diameter D (maximum shortest path over all node pairs) of a d-cube is $D = \log(N) = d$ hops, which is also realized for each node. For any node S, its bitwise complement (~S) is at the maximum distance D from S. The average number of hops between two nodes is d/2 and bisection (minimum number of links to cut in order to split a d-cube into 2 equal halves) is N/2.

In accordance with some embodiments of the invention, the d-cube coordinates of the switches (d-bit strings with d~10 . . . 16) can be used as their physical MAC addresses M, and the optimal routing becomes very simple. Routing can be done entirely locally, within each switch using only O(log (N)) resources (where O can be _____ and N is the maximum number of switches). When a frame with $M_{dst}$ arrives at a switch M, the switch M computes $J = M\hat{\ }M_{dst}$ and if J=0, then the switch M is the destination. Otherwise it selects the next hop h corresponding to any bit=1 in J which will bring the frame one hop closer to the $M_{dst}$ since the next node after the hop at $M_{nxt} = M\hat{\ }h$ will have one less bit=1, hence one less hop, in its jump vector to $M_{dst}$ which is $J_{nxt} = M_{nxt}\hat{\ }M_{dst}$.

In accordance with some embodiments of the invention, the total number of switches $N_s$ in the network is not an exact power of 2, so in this case, the d-cubes can be truncated so that for any accessible M the relation $M<N_s$ holds, where bit string M is interpreted as an integer (instead of $M<2^d$ which is used for a complete d-cube). Hence, instead of the O(N) size forwarding table and an O(N) routing tree, the switches only need one number $N_s$ and their own MAC address M to forward frames along the shortest paths.

Figure 7:
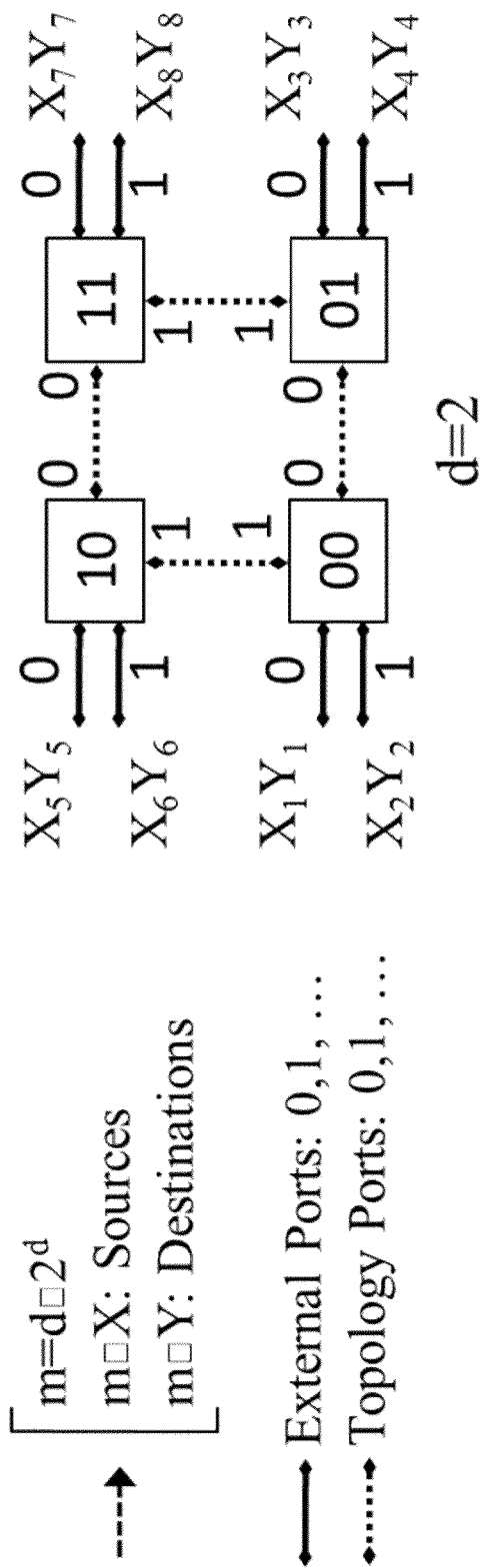
FIG. 7 illustrates partitioning between topology and external ports.

In accordance with some embodiments of the invention, one useful parameter of the hypercubic network topology is the port distribution or ratio of the internal topology ports (T-ports) used to interconnect switches and external ports (E-ports) that the network uses to connect the network to hosts (servers and routers). Networks built according to some embodiments of the invention can use a fixed ratio: $\lambda \equiv E/T$ (E=#E-ports, T=#T-ports) for all IPA switches. In accordance with one embodiment, the ratio is $\lambda=1$ (ports are split evenly between E and T), is shown in FIG. 7 for d=2.

For a hypercube of dimension d there are $m \equiv d \cdot 2^d$ total T-ports and E-ports, d ports per switch for either type. Since the ports are duplex, each E-port can be simultaneously a source and a sink (destination) of data packets. Hence, there are m sources $X_1, X_2, \ldots X_m$ and m destinations $Y_1, Y_2 \ldots Y_m$. The non-blocking (NB) property of a network or a switch can usually be defined via performance on the 'permutation task'—each source $X_i$ (i=1 . . . m) is sending data to a distinct destination $Y_j$ (where $j = \pi_m[i]$ and $\pi_m$ a permutation of m elements), and if these m transmissions can occur without collisions/blocking, for all m! permutations of Ys, the network is NB. The evaluation of the NB property of a network can depend on the specific meaning of "sending data" as defined by the queuing model. Based on kinds of "sending data", there can be two forms of NB, Circuit NB (NB-C) and Packet NB (NB-P). For NB-C, each source X can send a continuous stream at its full port capacity to its destination Y. For NB-P, each source can send one frame to its destination Y. In both cases, for NB to hold, for any $\pi(Y)$ there exists a set of m paths (sequences of hops), each path connecting its XY pair. The difference in these paths for the two forms of NB is that for NB-C each XY path has to have all its hops reserved exclusively for its XY pair at all times, while for NB-P, the XY path needs to reserve a hop only for the packet forwarding step in which the XY frame is using it. Hence NB-C is a stronger requirement, i.e. if a network is NB-C then it is also NB-P.

In accordance with some embodiments of the invention, a hypercube network with a $\lambda=1$ has Packet Non-Blocking Property. This is self-evident for d=1, where there are only 2 switches, two ports per switch, one T-port and one E-port. In this case m=2, hence there are only 2!=2 sets of XY pairing instances to consider: $I_1=[X_1 \rightarrow Y_1, X_2 \rightarrow Y_2]$ and $I_2=[X_1 \rightarrow Y_2, X_2 \rightarrow Y_1]$. The set of m=2 paths for $I_1$ are: $\{(X_1 0 Y_1), (X_2 1 Y_2)\}$, each taking 0 hops to reach its destination (i.e. there were no hops between switches, since the entire switching function in each path was done internally within the switch). The paths are shown as $(X\ S_1\ S_2\ \ldots\ S_k Y)$, where $S_i$ sequence specifies switches visited by the frame in each hop from X. This path requires k-1 hops between the switches (X and Y are not switches but ports on $S_1$ and $S_k$ respectively). For the pairing $I_2$, the two paths are $\{(X_1 0\ 1\ Y_2), (X_2 1\ 0\ Y_1)\}$, each 1 hop long. Since there were no collisions in either instance $I_1$ or $I_2$, the d=1 network is NB-P. For the next size hypercube, d=2, m=8 and there are 8! (40320) XY pairings, so we will look at just one instance (selected to maximize the demands over the same links) and show the selection of the m=8 collision free paths, before proving the general case.

Figure 8:
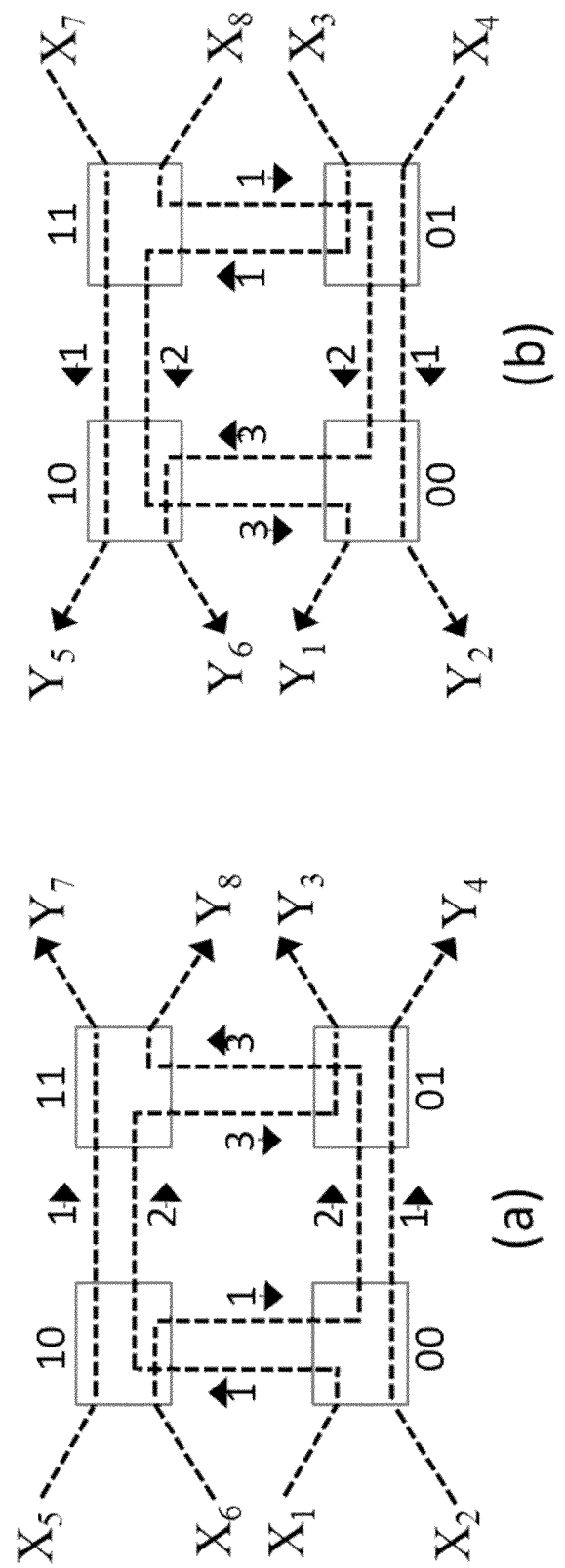
FIG. 8 illustrates packet non-blocking with 4 switches and 8 paths.

FIG. 8 shows the 8 paths with their properties discernable by splitting the diagram into (a) and (b) parts, but the two are actually running on the same switches and lines simultaneously. The short arrows with numbers show direction of the frame hop and the switching step/phase at which it takes place. It is evident that at no stage of the switching, which lasts 3 hops, is any link required to carry 2 or more frames in the same direction (these are duplex lines, hence 2 frames can share a link in opposite direction) hence NB-P holds for this instance. Not all paths are the shortest ones possible (e.g. $X_1 \rightarrow Y_3$ which took 3 hops, although the shortest path is 1 hop, the same one as the path $X_2 \rightarrow Y_4$).

To prove that in the general case all m=d·N frames sent by $X_1, X_2, \ldots X_m$ can be delivered to proper destinations, in a finite time and without collisions or dropped frames, the following routing algorithm can be used. In the initial state when m frames are injected by the sources into the network, each switch receives d frames from its d S-ports. If there were just one frame per switch instead of d, the regular hypercube routing could solve the problem, since there are no conflicts between multiple frames targeting the same port of the same switch. Since each switch also has exactly d T-ports, if each switch sends d frames, one frame to each port in any order, in the next stage each switch again has exactly d frames (received via its d T-ports), without collisions or frame drops so far. While such 'routing' can go on forever without collisions/ frame drops, it does not guarantee delivery. In order to assure a finite time delivery, each switch must pick out of the maximum d frames it can have in each stage, the frame closest to its destination (the one with the lowest Hamming weight of its jump vectorDst^Current) and send it to the correct port. The remaining d-1 frames (at most; there may be fewer) are sent on the remaining d-1 ports applying the same rule (the closest one gets highest priority, etc). Hence after this step is done on each of the N switches, there are at least N frames (the N "winners" on N switches) which are now closer by 1 hop to their destinations i.e. which are now at most d-1 hops away from their destination (since the maximum hop distance on a hypercube is d). After k such steps, there will be at least N frames which are—at most d-k hops away from their destinations. Since the maximum distance on a hypercube is d hops, in at most d steps from start at least N frames are delivered to their destinations and there are no collisions/ drops. Since the total number of frames to deliver is d·N, the above sequence of steps need not be repeated more than d times, therefore all frames are delivered in at most $d^2$ steps after the start. QED.

In accordance with some embodiments of the invention, load balancing can be performed locally at each switch. For each arriving frame, the switch can select the next hop along a different d-cube dimension than the last one sent, if one is available. Since for any two points with distance (shortest path) L there are L! alternative paths of equal length L, there are plenty of alternatives to avoid congestion, especially if aided by a central control and management system with a global picture of traffic flows.

Much of this look ahead at the packet traffic flow and density at adjacent nodes required to decide which among the equally good alternatives to pick can be done completely locally between switches with a suitable lightweight one-hop (or few hops) self-terminating (time to live set to 1 or 2) broadcast through all ports, notifying neighbors about its load. The information packet broadcast in such manner by a switch M can also combine its knowledge about other neighbors (with their weight/significance scaled down geometrically, e.g. by a factor 1/d for each neighbor). The division of labor between this local behavior of switches and a central control and management system can be that switching for short distance and near time regions can be controlled by switches and that switching for long distance and long time behavior can be controlled by the central control and management system.

In accordance with some embodiments of the invention, symmetrical networks with long hop shortcuts are used to achieve high performance in the network, however additional forwarding management can be used to optimize the network and achieve higher levels of performance. As the size of the network (number of hosts) becomes large, it is useful to optimize the forwarding processes to improve network performance.

One reason for current data center scaling problems is the non-scalable nature forwarding tables used in current switches. These tables grow as $O(N^2)$ where N is the number of edge devices (hosts) connected to the network. For large networks, this quickly leads to forwarding tables that can not be economically supported with current hardware, leading to various measures to control forwarding table size by segmenting networks, which leads to further consequences and sub-optimal network behavior.

In accordance with some embodiments of to the invention, each switch can maintain a single size forwarding table (of size O(N)) and network connection matrix (of size O(N·R), where R is the switch radix and N the number of switches). The scalable layer 2 topology and forwarding tables maintained by the switches can be based on hierarchical labeling and corresponding hierarchical forwarding behavior of the switches, which require only $m \cdot N^{1/m}$ table entries for the m-level hierarchy (where m is a small integer parameter, typically m=2 or 3).

In accordance with one embodiment of the invention, the network can be divided into a hierarchy of clusters, which for performance reasons align with the actual network connectivity. The $1^{st}$ level clusters contain R nodes (switches) each, while each higher level cluster contains R sub-clusters of the previous lower level. Hence, each node belongs to exactly one $1^{st}$ level cluster, which belongs to exactly one $2^{nd}$ level cluster, etc. The number of levels m needed for a network with N nodes and a given R, is then determined from the relations $R^{m-1} < N \leq R^m$, i.e. $m = \lceil \log(N)/\log(R) \rceil$. The forwarding identifier (FID or Forwarding ID) of a node consists of m separate fields (digits of the node ordinal 0 ... N−1 expressed in radix R), FID=$F_1$. $F_2$ ... $F_m$ where $F_1$ specifies the node index (number 0 ... R−1) within its $1^{st}$ level cluster, $F_2$ the index of the node's $1^{st}$ level cluster within its second level cluster, etc.

For example, in an N=100 node network and selecting R=10, each node is labeled via two decimal digits, e.g. a node 3.5 is a node with index 3 in a cluster with index 5. In this embodiment, if node 3.5 needs to forward to some node 2.8, all that 3.5 needs to know is how to forward to a single node in cluster 8, as long as each node within the cluster 8 knows how to forward within its own cluster. For multi-path topologies, nodes have more than single destination forwarding address. Or, for a general node—each node needs to know how to forward to 9 nodes in its own cluster and to a single node in each of other 9 clusters, hence it needs tables with only 2*9=18 elements (instead of 99 elements that conventional forwarding uses).

In accordance with some embodiments of the invention, the forwarding tables for each node can consist of m arrays $T_i$, i=1 ... m, each of size R elements (the elements are forwarding ports). For example, for R=16 and a network with N=64*1024 switches (corresponding to a network with 20*N=1280*1024 hosts), the forwarding tables in each switch consist of 4 arrays, each of size 16 elements, totaling 64 elements.

For any node F with FID(F)=$F_1$. $F_2$ ... $F_m$ the array $T_1[R]$ contains ports which F needs to use to forward to each of the R nodes in its own $1^{st}$ level cluster. This forwarding is not assumed to be a single hop, so the control algorithm can seek to minimize the number of hops when constructing these tables. A convenient topology, such as hypercube type, makes this task trivial since each such forwarding step is a single hop to the right cluster. In accordance with some embodiments of the invention, in the hypercube network, the control algorithm can harmonize node and cluster indexing with port numbers so that no forwarding tables are needed at all. The array $T_2$ contains ports F needed for forwarding to a single node in each of the R $2^{nd}$ level clusters belonging to the same third level cluster as node F; $T_3$ contains ports F needed for forwarding to a single node in each of the R $3^{rd}$ level clusters belonging to the same $4^{th}$ level cluster as F, ... and finally $T_m$ contains ports F needs to use to forward to a single node in each of the $Rm^{th}$ level cluster belonging to the same $(m+1)^{th}$ cluster (which is a single cluster containing the whole network).

In accordance with some embodiments of the invention, forwarding can be accomplished as follows. A node F with FID(F)=$F_1$.$F_2$ ... $F_m$ receiving a frame with final destination FID(Z)=$Z_1$. $Z_2$ ... $Z_m$ determines the index i=1 ... m of the highest 'digit' $Z_i$ that differs from its own corresponding 'digit' F, and forward the frame to the port $T_i[Z_i]$. The receiving node G then has (from the construction of tables $T_i$) for its i-th digit the value $G_i = Z_i$. Hence, repeating the procedure, node G determines the index j<i of the highest digit $Z_j$ differing from corresponding $G_j$ and forwards to port $T_j[Z_j]$ ... etc., until j=1, at which point the node is performing the final forwarding within its own cluster.

In accordance with some embodiments of the invention, the implementation of this technique can involve the creation of hierarchical addresses. Since the forwarding to clusters at levels >1 involves approximation (a potential loss of information, and potentially sub-optimal forwarding), for the method to forward efficiently it can be beneficial to a) reduce the number of levels m to the minimum needed to fit the forwarding tables into the CAMs (content addressable memories) and b) reduce the forwarding approximation error for m>1 selecting the formal clustering used in the construction of the network hierarchy to match as closely as possible the actual topological clustering of the network.

Forwarding efficiency can be improved by reducing the number of levels m to the minimum needed to fit the forwarding tables into the CAMs. In situations where one can modify only the switch firmware but not the forwarding hardware to implement hierarchical forwarding logic, the conventional CAM tables can be used. The difference from the conventional use is that instead of learning the MAC addresses, which introduce additional approximation and forwarding inaccuracy, the firmware can program the static forwarding tables directly with the hierarchical tables.

Since m levels reduce the size of the tables from N to $m \cdot N^{1/m}$ entries (e.g. m=2 reduces the tables from N entries to $2 \cdot \sqrt{N}$ entries), a 2-3 level hierarchy may be sufficient to fit the resulting tables in the C=16K entries CAM memory (e.g. m=2, C=16K allows 2.8K entries, or $N=64 \cdot 20^6$ nodes). Generally, m is the lowest value satisfying inequality: $m \cdot N^{1/m} \leq C$.

In order to reduce the forwarding approximation error for m>1, the formal clustering used in the construction of the hierarchical should match as closely as possible the actual topological clustering of the network. For enhanced hypercube topologies used by the invention, optimum clustering is possible since hypercubes are a clustered topology with m=log(N). In practice, where minimum m is preferred, the hypercubes of dimension d are intrinsically clustered into lower level hypercubes corresponding to partition of d into m parts. E.g. partition d=a+b corresponds to $2^a$ clusters (hypercube of dim=a) of size $2^b$ each (hypercubes of dim=b). The following clustering algorithm performs well in practice and can be used for general topologies:

A node which is the farthest node from the existent complete clusters is picked as the seed for the next cluster (the first pick, when there are no other clusters, is arbitrary). The new cluster is grown by adding to it one of the unassigned nearest neighbors x based on the scoring function: V(x)=#i−#e, where #i is the number of intra-cluster links and #e is the number of extra-cluster links in the cluster resulting from adding node x to it. The neighbor x with max value of V(x) score is then assigned to the cluster. The cluster growth stops when there are no more nodes or when the cluster target size is reached (whichever comes first). When no more unassigned nodes are available the clustering layer is complete. The next layer clusters are constructed by using the previous lower layer clusters as the input to this same algorithm.

In accordance with some embodiments of the invention, networks can be considered to include n "switches" (or nodes) of radix (number of ports per switch) $R_i$ for the i-th switch, where i=1 ... n. The network thus has the total of $P_T = \Sigma_i R_i$ ports. Some number of ports $P_1$ is used for internal connections between switches ("topological ports") leaving $P = P_T − P_I$ ports free ("external ports"), available for use by servers, routers, storage, ... etc. The number of cables $C_1$ used by the internal connections is $C_1 = P_1/2$. For regular networks (graphs), those in which all nodes have the same number of topological links per node m (i.e. m is a node degree), it follows that $P_1 = n \cdot m$.

Figure 9:
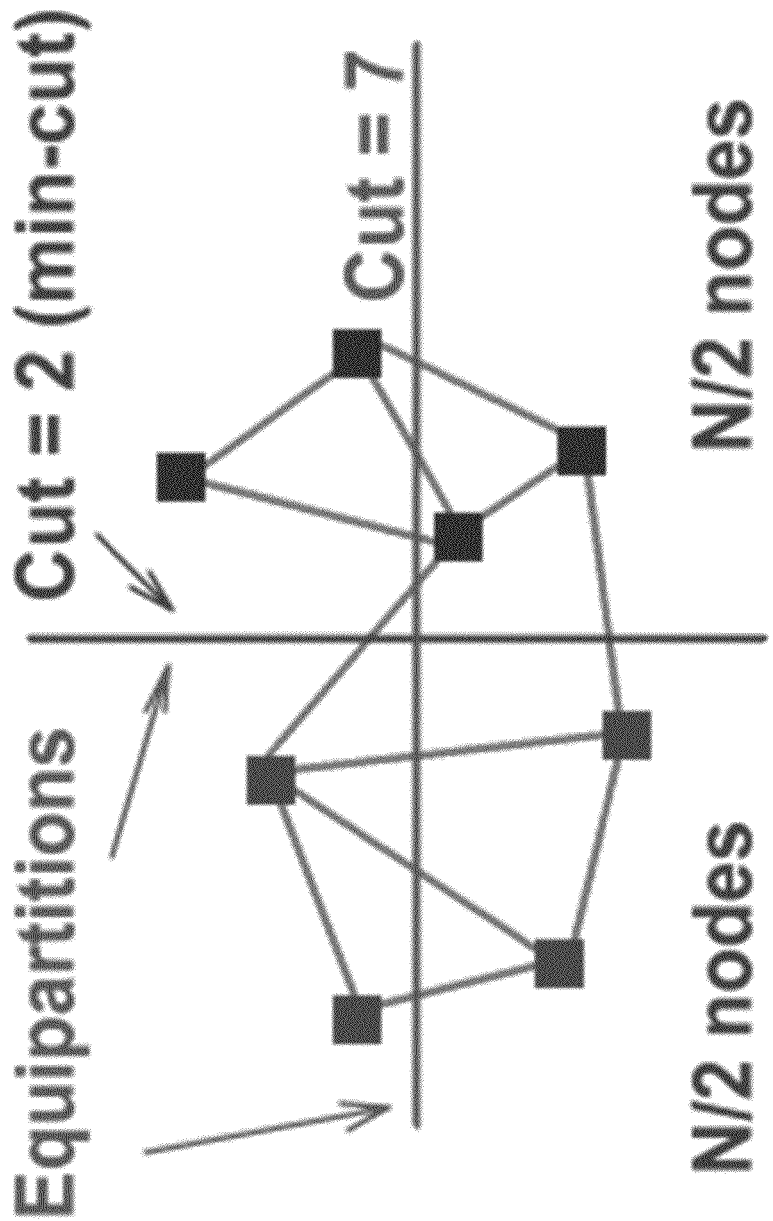
FIG. 9 illustrates a network bisection according to some embodiments of the invention.

The network capacity or throughput is commonly characterized via the bisection (bandwidth) which is defined in the following manner: network is partitioned into two equal subsets (equipartition) $S_1 + S_2$ so that each subset contains n/2 nodes (within ±1 for odd n). The total number of links connecting $S_1$ and $S_2$ is called a cut for partition $S_1 + S_2$. Bisection B is defined as the smallest cut (min-cut) for all possible equipartitions $S_1 + S_2$ of the network. FIG. 9 illustrates this definition on an 8 node network with B=2.

Bisection is thus an absolute measure of the network bottleneck throughput. A related commonly used relative throughput measure is the network oversubscription $\phi$ defined by considering the P/2 free ports in each min-cut half, $S_1$ and $S_2$, with each port sending and receiving at its maximum capacity to/from the ports in the opposite half. The maximum traffic that can be sent in each direction this way without overloading the network is B link (port) capacities since that's how many links the bisection has between the halves. Any additional demand that free ports are capable of generating is thus considered to be an "oversubscription" of the network. Hence, the oversubscription $\phi$ is defined as the ratio:

$$\phi \equiv \frac{P/2}{B} \tag{3.1}$$

The performance comparisons between network topologies, such as [1]-[5], [9]-[10], typically use non-oversubscribed networks $\phi=1$) and compare the costs in terms of number of switches n of common radix R and number of internal cables $C_1$ used in order to obtain a given target number of free ports P. Via eq. (3.1), that is equivalent to comparing the costs n and $C_1$ needed to obtain a common target bisection B.

Therefore, the fundamental underlying problem is how to maximize B given the number of switches n each using some number of topological ports per switch m (node degree). This in turn breaks down into two sub-problems:

(i) Compute bisection B for given network
(ii) Modify/select links which maximize B computed via (i)

For general networks (graphs), both sub-problems are computationally intractable, i.e. NP-complete problems. For example, the 'easier' of the two tasks is (i), since (ii) requires multiple evaluations of (i) as the algorithm (ii) iterates/searches for the optimum B. Task (i) involves finding the graph equipartition $H_0 + H_1$ which has the minimum number of links between the two halves, in general case would have to examine every possible equipartition $H_0 + H_1$ and in each case count the links between the two, then pick the one with the lowest count. Since there are $C(n, n/2) \approx 2^{n/2}\sqrt{\pi n/2}$ ways to split the set of n nodes into two equal halves, the exact brute force solution has exponential complexity. The problem with approximate bisection algorithms is the poor solution quality as network size increases—the polynomial complexity algorithms bisection applied to general graphs cannot guarantee to find an approximate cut even to within merely a constant factor from the actual minimum cut as n increases. And without an accurate enough measure of network throughput, the subtask (ii) cannot even begin to optimize the links.

An additional problem with (ii) becomes apparent, that even for small networks such as those with few dozen nodes, for which one can compute exact B via brute force and also compute the optimum solution by examining all combinations of the links. Namely, a greedy approach for solving (ii), successively computes B for all possible addition of the next link, then picks the link which produces the largest increment of B among all possible additions. That procedure continues until the target number of links per node is reached. The numerical experiments on small networks show that in order to get the optimum network in step m→m+1 links per node, one often needs to replace one or more existent links as well, the links which were required for optimum at previous smaller values of m.

In addition to bandwidth optimization for a given number of switches and cables, the latency, average or maximum (diameter), is another property that is often a target of optimization. Unlike the B optimization, where an optimum solution dramatically reduces network costs, yielding ~2-5 fewer switches and cables compared to conventional and approximate solutions, the improvements in latency are less sensitive to the distinction between the optimal and approximate solutions, with typical advantage factors of only 1.2-1.5. Accordingly, greater optimization can be achieved in LH networks by optimizing the bisection than by optimizing the network to improve latency.

The present invention is directed to Long Hop networks and methods of creating Long Hop networks. The description provides illustrative examples of methods for constructing a Long Hop network in accordance with the invention. In accordance with one embodiment, one function of a Long Hop network is to create a network interconnecting a number of computer hosts to transfer data between computer hosts connected to the network. In accordance some embodiments, the data can be transferred simultaneously and with specified constraints on the rate of data transmission and the components (e.g., switches and switch interconnect wiring) used to build the network.

In accordance with the invention, a Long Hop network includes any symmetrical network whose topography can be represented by a Cayley graph, and the corresponding Cayley graphs have generators corresponding to the columns of Error Correcting Code (ECC) generator matrices G (or their isometric equivalents, also instead of G one can use equivalent components of the parity check matrix H). In addition, the Long Hop networks in accordance with some embodiments of the invention can have performance (bisection in units of n/2) within 90% of the lower bounds of the related ECC, as described by the Gilbert-Varshamov bound theorem. In accordance with some embodiments of the invention, Long Hop networks will include networks having 128 or more switches (e.g., dimension 7 hypercube or greater) and/or direct networks. In accordance with some embodiments of the invention, Long Hop networks can include networks having the number of interconnections m not equal to d, d+1, . . . d+d−1 and m not equal to n−1, n−2. In accordance with some embodiments of the invention, the wiring pattern for connecting the switches of the network can be determined from a generator matrix that is produced from the error correcting code that corresponds to the hypercube dimension and the number of required interconnections determined as function of the oversubscription ratio.

In other embodiments of the invention, similar methods can be used to create networks for interconnecting central processing units (CPUs) as is typically used in supercomputers, as well as to interconnect data transfer channels within integrated circuits or within larger hardware systems such as backplanes and buses.

In accordance with some embodiments of the invention, the Long Hop network can include a plurality of network switches and a number of network cables connecting ports on the network switches to ports on other network switches or to host computers.

Each cable connects either a host computer to a network switch or a network switch to another network switch. In accordance with some embodiments of the invention, the data flow through a cable can be bidirectional, allowing data to be sent simultaneously in both directions. In accordance with some embodiments of the invention, the rate of data transfer can be limited by the switch or host to which the cable is connected. In accordance with other embodiments of the invention, the data flow through the cable can be uni-directional. In accordance with other embodiments of the invention, the rate of data transfer can be limited only the physical capabilities of the physical cable media (e.g., the construction of the cable). In accordance with some embodiments, the cable can be any medium capable of transferring data, including metal wires, fiber optic cable, and wired and wireless electromagnetic radiation (e.g., radio frequency signals and light signals). In accordance with some embodiments, different types of cable can be used in the same Long Hop network.

In accordance with some embodiments of the invention, each switch has a number of ports and each port can be connected via a cable to another switch or to a host. In accordance with some embodiments of the invention, at least some ports can be capable of sending and receiving data, and at least some ports can have a maximum data rate (bits per second) that it can send or receive. Some switches can have ports that all have the same maximum data rate, and other switches can have groups of ports with different data rates or different maximum data transfer rates for sending or receiving. In accordance with some embodiments, all switches can have the same number of ports, and all ports can have the same send and receive maximum data transfer rate. In accordance with other embodiments of the invention, at least some of the switches in a Long Hop network can have different numbers of ports, and at least some of the ports can have different maximum data transfer rates.

The purpose of a switch is to receive data on one of its ports and to send that data on out another port based on the content of the packet header fields. Switches can receive data and send data on all their ports simultaneously. A switch can be thought of as similar to a rail yard where incoming train cars on multiple tracks can be sent onward on different tracks by using a series of devices that control which track among several options a car continues onto.

In accordance with some embodiments of the invention, the Long Hop network is constructed of switches and cables. Data transferred between a host computer or a switch and another switch over a cable. The data received from a sending host computer enters a switch, which can then forward the data either directly to a receiving host computer or to another switch which in turn decides whether to continue forwarding the data to another switch or directly to a host computer connected to the switch. In accordance with some embodiments of the invention, all switches in the network can be both connected to other switches and to hosts. In accordance with other embodiments of the invention, there can be interior switches that only send and receive to other switches and not to hosts as well.

In accordance with some embodiments, the Long Hop network can include a plurality of host computers. A host computer can be any device that sends and/or receives data to or from a Switch over a Cable. In accordance with some embodiments of the invention, host computers can be considered the source and/or destination of the data transferred through the network, but not considered to be a direct part of the Long Hop network being constructed. In accordance with some embodiments of the invention, host computers cannot send or receive data faster than the maximum data transfer rate of the Switch Port to which they are connected.

In accordance with some embodiments of the invention, at least some of following factors can influence the construction of the network. The factors can include 1) the number of Hosts that must be connected; 2) the number of switches available, 3) the number of ports on each switch; 4) the maximum data transfer rate for switch ports; and 5) the sum total rate of simultaneous data transmission by all hosts. Other factors, such as the desired level of fault tolerance and redundancy can also be factor in the construction of a Long Hop network.

In accordance with some embodiments of the invention, the desired characteristics of the Long Hop network can limit combinations of the above factors used in the construction of a Long Hop network that can actually be built. For example, it is not possible to connect more hosts to a network than the total number of switches multiplied by the number of ports per switch minus the number of ports used to interconnect switches. As one ordinary skill would appreciate, a number of different approaches can be used to design a network depending on the desired outcome. For example, for a specified number of hosts, switches with a given maximum data transfer rate, and ports per switch, how many switches are needed and how should they be connected in order to allow all hosts to send and receive simultaneously at 50% of their maximum data transfer rate, Alternatively, for a specified number of hosts, number of switches with a given number of ports and maximum data transfer rate, how much data can be simultaneously transferred across the network and what switch connection pattern(s) supports that performance.

For purposes of illustration, the following description explains how to construct a Long Hop network according to some embodiments of the invention. In this embodiment, the Long Hop network includes 16 switches and uses up to 7 ports per switch for network interconnections (between switches). As one of ordinary skill will appreciate any number of switches can be selected and the number ports for network interconnection can be selected in accordance with the desired parameters and performance of the Long Hop network.

In accordance with some embodiments of the invention, the method includes determining how to wire the switches (or change the wiring of an existing network of switches) and the relationship between the number of attached servers per switch and the oversubscription ratio.

In accordance with some embodiments of the invention, the ports on each switch can be allocated to one of two purposes, external connections (e.g., for connecting the network to external devices including host computers, servers and external routers or switches that serve as sources and destinations within the network), and topological or internal connections. An external network connection is a connection between a switch and a source or destination device that enables data to enter the network from a source or exit the network to a destination. A topological or internal network connection is a connection between networks switches that form the network (e.g., that enables data to be transferred across network).

In accordance with some embodiments of the invention, the oversubscription ratio can be determined as the ratio between the total number of host connections (or more generally, external ports) and the bisection (given as number of links crossing the min-cut partition). In accordance with some embodiments of the invention, an oversubscription ratio of 1 indicates that in all cases, all hosts can simultaneously send at the maximum data transfer rate of the switch port. In accordance with some embodiments of the invention, an oversubscription ratio of 2 indicates that the network can only support a sum total of all host traffic equal to half of the maximum data transfer rate of all host switch ports. In accordance with some embodiments of the invention, an oversubscription ratio of 0.5 indicates that the network has twice the capacity required to support maximum host traffic, which provides a level of failure resilience such that if one or more switches or connections between switches fails, the network will still be able to support the full traffic volume generated by hosts.

In accordance with some embodiments of the invention, the base network can be an n-dimensional hypercube. In accordance with other embodiments of the invention, the base network can be another symmetrical network such as a star, a pancake and other Cayley graphs based network structure. In accordance with some embodiments of the invention, an n-dimensional hypercube can be selected as a function of the desired number of switches and interconnect ports.

In accordance with some embodiments of the invention, a generator matrix is produce for the linear error correcting code that matches the underlying hypercube dimension and the number of required interconnections between switches as determined by the network oversubscription ratio. In accordance with some embodiments of the invention, the generator matrix can be produced by retrieving it from one of the publicly available lists, such as the one maintained by the MinT project (http://mint.sbg.ac.at/index.php). In accordance with other embodiments of the invention, the generator matrix can be produced using a computer algebra system such as the Magma package (available from http://magma.maths.usyd.edu.au/magma/). For example, in Magma package a command entered into Magma calculator (http://magma.maths.usyd.edu.au/calc/):

C:=BKLC(GF(2),7,4); C;

produces as output the generator matrix for the binary linear code [7,4,3]:

[7, 4, 3] Linear Code over GF(2)
Generator Matrix:

[1 0 0 0 0 1 1]
[0 1 0 0 1 0 1]
[0 0 1 0 1 1 0]
[0 0 0 1 1 1 1]

In accordance with some embodiments of the invention, a linear error correcting code generator matrix can be converted into a wiring pattern matrix by rotating the matrix counter-clockwise 90 degrees, for example, as shown in Table 4.9.

In the illustrative example shown in Table 4.9, each switch has 7 ports connected to other switches and 16 total switches corresponding to an LH augmented dimension 4 hypercube. Generators $h_1$ through $h_7$ correspond to the original columns from rotated $[G_{4,7}]$ matrix that can be used to determine how the switches are connected to each other by cables.

In accordance with some embodiments of the invention, the 16 switches can be labeled with binary addresses, 0000, 0001, through 1111. The switches can be connected to each other using the 7 ports assigned for this purpose, labeled h1 through h7, by performing the following procedure for each of the sixteen switches. For example, connect a cable between each source switch network port (1-7) and the same port number on the destination switch whose number is determined by performing an exclusive or logical operation between the source switch number and the value of the Cayley graph generator $h_1$ to $h_7$ (column 2 in the table below) for the network port number.

For example, to determine how to connect the 7 wires going from switch number 3 (binary 0011), take the graph generator (number in $2^{nd}$ column) and exclusive or (XOR) it with 0011 (the source switch number), which results in "Destination switch number" in the following connection map (the XOR of columns 2 and 3 yields column 4):

| Port on switch 3 | Generators $h_1$-$h_7$ | Source switch number | Destination switch number |
|---|---|---|---|
| 1 | 0001 (1) | 0011 (3) | 0010 (2) |
| 2 | 0010 (2) | 0011 (3) | 0001 (1) |
| 3 | 0100 (4) | 0011 (3) | 0111 (7) |
| 4 | 1000 (8) | 0011 (3) | 1011 (11) |
| 5 | 0111 (7) | 0011 (3) | 0100 (4) |
| 6 | 1110 (14) | 0011 (3) | 1101 (13) |
| 7 | 1011 (11) | 0011 (3) | 1000 (8) |

This wiring procedure describes how to place the connections to send from a source switch to a destination switch, so for each connection from a source switch to a destination switch, there is also a connection from a destination switch to a source switch. As a practical matter, in this embodiment, a single bi-directional cable is used for each pair of connections.

Construction of Long Hop Networks

The LH networks are direct networks constructed using general Cayley graphs $Cay(G_n, S_m)$ for the topology of the switching network. The preferred embodiment for LH networks belongs to the most general hypercubic-like networks, with uniform number of external (E) and topological (m) ports per switch (where E+m=R='switch radix'), which retain the vertex and edge symmetries of the regular d-cube $\mathbb{Q}_d$. The resulting LH network with n=$2^d$ switches in that case is a Cayley graph of type $Cay(Z_2^d, S_m)$ with n−1>m>d+1 (these restriction on m exclude well known networks such as d-cube $\mathbb{Q}_d$ which has m=d, folded d-cube $\mathbb{FQ}_d$ with m=d+1, as well as fully meshed network m=n and m=n−1). It will become evident that the construction method shown on $Z_2^d$ example applies directly to the general group $Z_q^d$ with q>2. For q>2, the resulting $Cay(Z_q^d, S_m)$ is the most general LH type construction of a d-dimensional hyper-torus-like or flattened butterfly-like networks of extent q (which is equivalent to a hyper-mesh-like network with cyclic boundary conditions). The preferred embodiment will use q=2, since $Z_2^d$ is the most optimal choice from practical perspective due to the shortest latency (average and max), highest symmetry, simplest forwarding and routing, simplest job partitioning (e.g. for multi-processor clusters), easiest and most economical wiring in the $Z_q^d$ class.

Following the overall task breakdown in section 3, the LH construction proceeds in two main phases:

(i) Constructing a method for efficient computation of the exact bisection B (ii) Computing the optimal set of m links (hops) $S_m$ per node maximizing this B For the sake of clarity, the main phases are split further into smaller subtasks, each described in the sections that follow.

Generators and Adjacency Matrix

Network built on $Cay(Z_q^d, S_m)$ graph has n=$q^d$ vertices (syn. nodes), and for q=2 which is the preferred embodiment, n=$2^d$ nodes. These n nodes make the n element vertex set $V=\{v_0, v_2, \ldots v_{n-1}\}$. We are using 0-based subscripts since we need to do modular arithmetic with them.

Node Labels and Group Operation Table

The nodes $v_i$ are labeled using d-tuples in alphabet of size q: $v_i \equiv i \in \{0, 1, \ldots n-1\}$ expressed as d-digit integers in base q. The group operation, denoted as $\oplus$, is not the same as integer addition mod n but rather it is the component-wise addition modulo q done on d components separately. For q=2, this is equivalent to a bitwise XOR operation between the d-tuples, as illustrated in Table 2.1 (Appendix A) which shows the full $Z_2^d$ group operation table for d=4.

Table 4.1 illustrates analogous $Z_3^d$ group operation table for d=2 and q=3, hence there are $n=3^2=9$ group elements and the operations table has $n \times n = 9 \times 9 = 81$ entries. The 2-digit entries have digits which are from alphabet $\{0,1,2\}$. The n rows and n columns are labeled using 2-digit node labels. Table entry at row r and column c contains result of $r \oplus c$ (component-wise addition mod q=3). For example, the 3rd row labeled 02, and the 6-th column labeled 12, yield table entry $02 \oplus 12 = (0+1)\%3, (2+2)\%3 = 1,1 = 11$.

TABLE 4.1

|    | 00 | 01 | 02 | 10 | 11 | 12 | 20 | 21 | 22 |    |
|----|----|----|----|----|----|----|----|----|----|----|
| 00:| 00 | 01 | 02 | 10 | 11 | 12 | 20 | 21 | 22 | :00|
| 01:| 01 | 02 | 00 | 11 | 12 | 10 | 21 | 22 | 20 | :01|
| 02:| 02 | 00 | 01 | 12 | 10 | 11 | 22 | 20 | 21 | :02|
| 10:| 10 | 11 | 12 | 20 | 21 | 22 | 00 | 01 | 02 | :10|
| 11:| 11 | 12 | 10 | 21 | 22 | 20 | 01 | 02 | 00 | :11|
| 12:| 12 | 10 | 11 | 22 | 20 | 21 | 02 | 00 | 01 | :12|
| 20:| 20 | 21 | 22 | 00 | 01 | 02 | 10 | 11 | 12 | :20|
| 21:| 21 | 22 | 20 | 01 | 02 | 00 | 11 | 12 | 10 | :21|
| 22:| 22 | 20 | 21 | 02 | 00 | 01 | 12 | 10 | 11 | :22|
|    | 00 | 01 | 02 | 10 | 11 | 12 | 20 | 21 | 22 |    |

It can be noted in Table 4.1 for $Z_3^d$ and in Table 2.1 (Appendix A) for $Z_2^d$ that each row r and column c contains all n group elements, but in a unique order. The 0-th row or 0-th column contain the unmodified r and c values since the 'identity element' is $I_0=0$. Both tables are symmetrical since the operation $r \oplus c = c \oplus r$ is symmetrical (which is a characteristic of the abelian group $Z_q^d$ used in the example).

Construction of Adjacency Matrix [A]

Generator set $S_m$ contains m "hops" $h_1, h_2, \ldots h_m$ (they are also elements of the group $G_n$ in $Cay(G_n, S_m)$), which can be viewed as the labels of the m nodes to which the "root" node, $v_0 \equiv 0$ is connected. Hence, the row r=0 of the adjacency matrix [A] has m ones, at columns A(0,h) for m hops $h \in S_m$ and 0 elsewhere. Similarly, the column c=0 has m ones at rows A(h,0) for m hops $h \in S_m$ and 0 elsewhere. In a general case, some row r=y, has m ones at columns $A(y, y \oplus h)$ for $h \in S_m$ and 0 elsewhere. Similarly a column c=x has m ones at rows $A(x \oplus h, x)$ for $h \in S_m$ and 0 elsewhere. Denoting contributions of a single generator $h \in S_m$ to the adjacency matrix [A] as a matrix T(h), these conclusions can be written more compactly via Iverson brackets and bitwise OR operator '|' as:

$$T(a)_{i,j} = [i \oplus a = j] \mid [j \oplus a = i] \quad a \in G_n \tag{4.1}$$

$$[A] = \sum_{h \in S_m} T(h) = \sum_{s=1}^{m} T(h_s) \tag{4.2}$$

Note that eq. (4.1) defines T(a) for any element a (or vertex) of the group $G_n$. Since the right hand side expression in eq. (4.1) is symmetric in i and j it follows that T(a) is a symmetric matrix, hence it has real, complete eigenbasis:

$$T(a)_{i,j} = T(a)_{j,i} \tag{4.3}$$

For the group $G_n = Z_2^d$, the group operator $\oplus$ becomes regular XOR '^' operation, simplifying eq. (4.1) to:

$$T(a)_{i,j} = [i \hat{} j = a], \quad a \in Z_2^d \tag{4.4}$$

Table 4.2 illustrates the T(a) matrices for q=2, d=3, n=8 and all group elements a=0 ... 7. For given a=0 ... 7, value 1 is placed on row r and column c iff $r \hat{} c = a$, and 0 otherwise (0s are shown as '-').

TABLE 4.2

```
1 - - - - - - -     - 1 - - - - - -     - - 1 - - - - -     - - - 1 - - - -
- 1 - - - - - -     1 - - - - - - -     - - - 1 - - - -     - - 1 - - - - -
- - 1 - - - - -     - - - 1 - - - -     1 - - - - - - -     - 1 - - - - - -
- - - 1 - - - -     - - 1 - - - - -     - 1 - - - - - -     1 - - - - - - -
- - - - 1 - - -     - - - - - 1 - -     - - - - - - 1 -     - - - - - - - 1
- - - - - 1 - -     - - - - 1 - - -     - - - - - - - 1     - - - - - - 1 -
- - - - - - 1 -     - - - - - - - 1     - - - - 1 - - -     - - - - - 1 - -
- - - - - - - 1     - - - - - - 1 -     - - - - - 1 - -     - - - - 1 - - - a = 0                a = 1               a = 2               a = 3

- - - - 1 - - -     - - - - - 1 - -     - - - - - - 1 -     - - - - - - - 1
- - - - - 1 - -     - - - - 1 - - -     - - - - - - - 1     - - - - - - 1 -
- - - - - - 1 -     - - - - - - - 1     - - - - 1 - - -     - - - - - 1 - -
- - - - - - - 1     - - - - - - 1 -     - - - - - 1 - -     - - - - 1 - - -
1 - - - - - - -     - 1 - - - - - -     - - 1 - - - - -     - - - 1 - - - -
- 1 - - - - - -     1 - - - - - - -     - - - 1 - - - -     - - 1 - - - - -
- - 1 - - - - -     - - - 1 - - - -     1 - - - - - - -     - 1 - - - - - -
- - - 1 - - - -     - - 1 - - - - -     - 1 - - - - - -     1 - - - - - - - a = 4                a = 5               a = 6               a = 7
```

Table 4.3 (a) shows the 8×8 adjacency matrix [A] obtained for the generator set $S_4 \equiv \{1, 2, 4, 7\}_{hex} \equiv \{001, 010, 100, 111\}_{bin}$ by adding the 4 generators from Table 4.2: [A]=T(1)+T(2)+T(4)+T(7), via eq. (4.2). For pattern clarity, values 0 are shown as '-'. Table 4.3 (b) shows the indices of the 4 generators (1, 2, 3, 4) which contributed 1 to a given element of [A] in Table 4.3 (a).

TABLE 4.3

| - | 1 | 1 | - | 1 | - | - | 1 | | - | 1 | 2 | - | 3 | - | - | 4 |
|---|---|---|---|---|---|---|---|---|---|---|---|---|---|---|---|---|
| 1 | - | - | 1 | - | 1 | 1 | - | | 1 | - | - | 2 | - | 3 | 4 | - |
| 1 | - | - | 1 | - | 1 | 1 | - | | 2 | - | - | 1 | - | 4 | 3 | - |
| - | 1 | 1 | - | 1 | - | - | 1 | | - | 2 | 1 | - | 4 | - | - | 3 |
| 1 | - | - | 1 | - | 1 | 1 | - | | 3 | - | - | 4 | - | 1 | 2 | - |
| - | 1 | 1 | - | 1 | - | - | 1 | | - | 3 | 4 | - | 1 | - | - | 2 |
| - | 1 | 1 | - | 1 | - | - | 1 | | - | 4 | 3 | - | 2 | - | - | 1 |
| 1 | - | - | 1 | - | 1 | 1 | - | | 4 | - | - | 3 | - | 2 | 1 | - |

(a)  (b)

Figure 10:
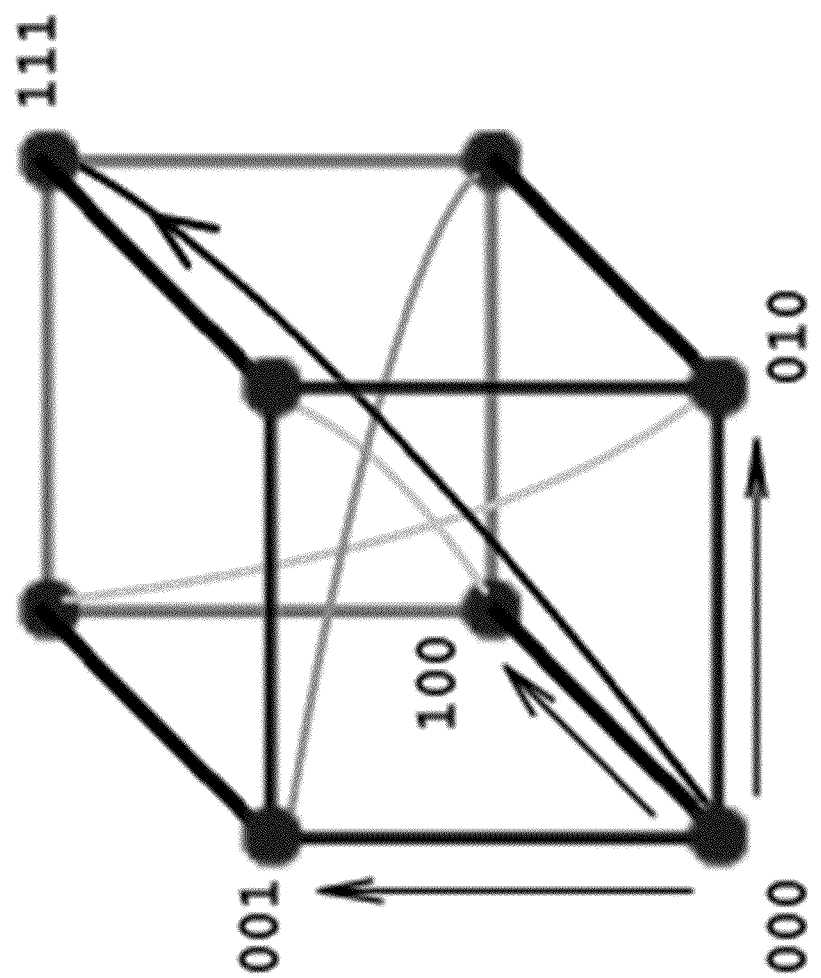
FIG. 10 illustrates an 8 node network with long hops added.

FIG. 10 shows the resulting 8-node network (folded 3-cube, $\mathbb{FQ}_3$). Actions (bitwise XOR) of the 4 generators $T(a) \in \{001, 010, 100, 111\}_{bin}$ on the node 000 are indicated by the arrows pointing to the target vertex. All other links are shown without arrows. The total number of links is $C = n \cdot m/2 = 8 \cdot 4/2 = 16$, which can be observed directly in the figure.

Eigenvectors of T(a) and [A]

To solve the eigen-problem of [A], couple additional properties of T(a) are derived from eq. (4.4) (using x^x=0 and x^y=y^x):

$$(T(a)T(b))_{i,j} = \sum_{k=0}^{n-1} T(a)_{i,k} T(b)_{k,j} = \sum_{k=0}^{n-1} [k = i\,\hat{}\,a][k = j\,\hat{}\,b] == [i\,\hat{}\,a = j\,\hat{}\,b] =$$

$$[i\,\hat{}\,j = a\,\hat{}\,b] = T(a\,\hat{}\,b)_{i,j} \Rightarrow$$

$$T(a)T(b) = T(a\,\hat{}\,b) \quad (4.5)$$

$$T(a)T(b) = T(a\,\hat{}\,b) = T(b\,\hat{}\,a) = T(b)T(a) \quad (4.6)$$

Eq. (4.5) shows that T(a) matrices are a representation of the group $G_n$ and eq. (4.6) that they commute with each other. Since via eq. (4.2), [A] is the sum of T(a) matrices, then [A] commutes with all T(a) matrices as well. Therefore, since they are all also symmetric matrices, the entire set $\{[A], T(a) \forall a\}$ has a common eigenbasis (via result ($M_4$) in section 2.F). The next sequence of equations shows that Walsh functions viewed as n-dimensional vectors $|U_k\rangle$ are the eigenvectors for T(a) matrices. Using eq. (4.4) for the matrix elements of the T(a), the action of T(a) on Walsh ket vector $|U_k\rangle$ yields for the i-th component of the resulting vector:

$$(T(a)|U_k\rangle)_i = \sum_{j=0}^{n-1} T(a)_{i,j} U_k(j) = \sum_{j=0}^{n-1} [j = i\,\hat{}\,a] U_k(j) = U_k(i\,\hat{}\,a) \quad (4.7)$$

The result $U_k(i\,\hat{}\,a)$ is transformed via eq. (2.5) for the general function values of $U_k(x)$:

$$U_k(i\,\hat{}\,a) = (-1)^{\sum_{\mu=0}^{d-1} k_\mu (i\,\hat{}\,a)_\mu} = \quad (4.8)$$

$$(-1)^{\sum_{\mu=0}^{d-1} k_\mu a_\mu + \sum_{\mu=0}^{d-1} k_\mu i_\mu} == (-1)^{\sum_{\mu=0}^{d-1} k_\mu a_\mu} \cdot (-1)^{\sum_{\mu=0}^{d-1} k_\mu i_\mu} =$$

$$U_k(a) U_k(i) = U_k(a)(|U_k\rangle)_i$$

Collecting all n components of the left side of eq. (4.7) and right side of eq. (4.8) yields in vector form:

$$T(a)|U_k\rangle = U_k(a)|U_k\rangle \quad (4.9)$$

Hence, the orthogonal basis set $\{|U_k\rangle, k=0 \ldots n-1\}$ is the common eigenbasis for all T(a) matrices and for the adjacency matrix [A]. The is eigenvalues for T(a) are Walsh function values $U_k(a)$, $k=0 \ldots n-1$. The eigenvalues for [A] are obtained by applying eq. (4.9) to the expansion of [A] via T(h), eq. (4.2):

$$[A]|U_k\rangle = \sum_{s=1}^{m} T(h_s)|U_k\rangle = \left(\sum_{s=1}^{m} U_k(h_s)\right) \cdot |U_k\rangle \equiv \lambda_k |U_k\rangle \quad (4.10)$$

$$\text{where: } \lambda_k \equiv \sum_{s=1}^{m} U_k(h_s) \quad (4.11)$$

Since $U_0(x)=1$ is constant (for $x=0 \ldots n-1$), the eigenvalue $\lambda_0$ of [A] for the eigenvector $|U_0\rangle$ is:

$$\lambda_0 = m \geq \lambda_k \quad (4.12)$$

From eq. (4.11) it also follows that $\lambda_0 \geq \lambda_k$ for $k=1 \ldots n-1$ since the sum in eq. (4.11) may contain one or more negative addends $U_k(h_s)=-1$ for k>0, while for the k=0 case all addends are equal to +1.

Computing Bisection

Cuts from Adjacency Matrix and Partition Vector

The bisection B is computed by finding the minimum cut C(X) in the set $E=\{X\}$ of all possible equipartitions $X=S_1+S_2$ of the set of n vertices. An equipartition X can be represented by an n-dimensional vector $|X\rangle \in \mathbb{V}_n$ containing n/2 values +1 selecting nodes of group $S_1$, and n/2 values -1 selecting the nodes of group $S_2$. Since the cut value of a given equipartition X does not depend on particular +1/-1 labeling convention (e.g. changing sign of all elements defines the same graph partition), all vectors $|X\rangle$ will have by convention the 1$^{st}$ component set to 1 and only the remaining n-1 components need to be varied (permuted) to obtain all possible distinct equipartitions from E. Hence, the equipartitions set E consists of all vectors $X=(x_0, x_1, \ldots x_{n-1})$, where $$x_0 = 1, x_i \in \{+1, -1\} \text{ and } \sum_{i=0}^{n-1} x_i = 0.$$

The cut value C(X) for a given partition $X=(x_0, x_1, \ldots x_{n-1})$ is obtained as the count of links which cross between nodes in $S_1$ and $S_2$. Such links can be easily identified via E and adjacency matrix [A], since $[A]_{i,j}$ is 1 iff nodes i and j are connected and 0 if they are not connected. The group membership of some node i is stored in the component $x_i$ of the partition X. Therefore, the links (i,j) that are counted have $[A]_{i,j}=1$, i.e. nodes i and j must be connected, and they must be in opposite partitions i.e. $x_i \neq x_j$. Recalling that $x_i$ and $x_j$ have values +1 or -1, the "$x_i \neq x_j$" is equivalent to "$(x_i \cdot x_j) = -1$". To express that condition as a contribution +1 when $x_i \neq x_j$ and a contribution 0 when $x_i = x_j$, expression $(1 - x_i \cdot x_j)/2$ is constructed which yields precisely the desired contributions +1 and 0 for any $x_i, x_j = \pm 1$. Hence, the values added to the link count can be written as $(1 - x_i \cdot x_j) \cdot [A]_{i,j}/2$ since $C_{i,j} = 1$ iff nodes i and j are connected ($[A]_{i,j} = 1$) and they are in different groups ($x_i \cdot x_j = -1$). Otherwise $C_{i,j}$ is 0, thus adding no contribution to the C(X).

A counting detail that needs a bit of care arises when adding $C_{i,j}$ terms for all i,j=0 ... n−1. Namely, if the contribution of e.g. $C_{3,5}$ for nodes 3 and 5 is 1, because $[A]_{3,5}=1$ (3,5 linked), $x_3=-1$ and $x_5=+1$, then the contribution of the same link will contribute also via $C_{5,3}$ term since $[A]_{5,3}=1$, $x_5=+1$, $x_3=-1$. Hence the sum of $C_{i,j}$ for all i,j=0 ... n−1 counts the contribution for each link twice. Therefore, to compute the cut value C(X) for some partition X, the sum of $C_{i,j}$ terms must be divided by 2. Noting also that for any vector $$X \in E \Rightarrow \langle X | X \rangle = \sum_{i=0}^{n-1} x_i x_i = n \text{ and } \sum_{i,j=0}^{n-1} [A]_{i,j} = \sum_{j=0}^{n-1} m = n \cdot m,$$

yields for the cut C(X):

$$C(X) = \frac{1}{2} \sum_{i,j=0}^{n-1} \frac{1}{2}(1 - x_i x_j)[A]_{i,j} = \quad (4.14)$$

$$\frac{nm}{4} - \frac{1}{4} \sum_{i,j=0}^{n-1} x_i x_j [A]_{i,j} = \frac{n}{4}\left(m - \frac{\langle X|A|X \rangle}{\langle X|X \rangle}\right)$$

To illustrate operation of the formula (4.14), the Table 4.5 shows adjacency matrix [A] for $Cay(Z_2^4, S_5)$, which reproduces $\mathbb{FQ}$ (folded 4-cube), with d=4, $n=2^d=2^4=16$ nodes, m=5 links per node, produced by the generator set $S_5=\{1, 2, 4, 8, F\}_{hex} = \{0001, 0010, 0100, 1000, 1111\}_{bin}$. The row and column headers show the sign pattern of the example partition X=(1, 1, 1, 1, −1, −1, −1, −1, 1, 1, 1, 1, −1, −1, −1, −1) and the shaded areas indicate the blocks of [A] in which eq. (4.14) counts ones—elements of [A] where row r and column c have opposite signs of the X components $x_r$ and $x_c$. The cut is computed as C(X)=½ (sum of ones in shaded blocks)=½* (4*8)=16 which is the correct B for $\mathbb{FQ}_4$ (2*n/2=2*8=16). Note that the zeros (they don't contribute to C(X)) in the matrix [A] are shown as '-' symbol.

TABLE 4.5

| X | + + + + | − − − − | + + + + | − − − − |
|---|---|---|---|---|
| + | − 1 1 − | 1 − − − | 1 − − − | − − − 1 |
| + | 1 − − 1 | − 1 − − | − 1 − − | − − 1 − |
| + | 1 − − 1 | − − 1 − | − − 1 − | − 1 − − |
| + | − 1 1 − | − − − 1 | − − − 1 | 1 − − − |
| − | 1 − − − | − 1 1 − | 1 − − − | 1 − − − |
| − | − 1 − − | 1 − − 1 | − 1 − − | − 1 − − |
| − | − − 1 − | 1 − − 1 | − − 1 − | − − 1 − |
| − | − − − 1 | − 1 1 − | − − − 1 | − − − 1 |
| + | 1 − − − | − − − 1 | − 1 1 − | 1 − − − |
| + | − 1 − − | − − 1 − | 1 − − 1 | − 1 − − |
| + | − − 1 − | − 1 − − | 1 − − 1 | − − 1 − |
| + | − − − 1 | 1 − − − | − 1 1 − | − − − 1 |
| − | − − − 1 | 1 − − − | 1 − − − | − 1 1 − |
| − | − − 1 − | − 1 − − | − 1 − − | 1 − − 1 |
| − | − 1 − − | − − 1 − | − − 1 − | 1 − − 1 |
| − | 1 − − − | − − − 1 | − − − 1 | − 1 1 − |

Finding the Minimum Cut (Bisection)

Bisection B is computed as the minimum cut C(X) for all $X \in E$, which via eq. (4.14) yields:

$$B = \quad (4.15)$$

$$\min_{X \in E}\left\{\frac{n}{4}\left(m - \frac{\langle X|A|X \rangle}{\langle X|X \rangle}\right)\right\} = \frac{nm}{4} - \frac{n}{4}\max_{X \in E}\left\{\frac{\langle X|A|X \rangle}{\langle X|X \rangle}\right\} \equiv \frac{nm}{4} - \frac{n}{4}M_E$$

$$\text{where: } M_E \equiv \max_{X \in E}\left\{\frac{\langle X|A|X \rangle}{\langle X|X \rangle}\right\} \quad (4.16)$$

Despite the apparent similarity between the max{ } term $M_E$ in eq. (4.16) to the max { } term $M_V$ in eq. (2.46), the Rayleigh-Ritz eqs. (2.45)-(2.46) do not directly apply to min{ } and max{ } expressions in eq. (4.15). Namely, the latter extrema are constrained to the set E of equipartitions, which is a proper subset of the full vector space $\mathbb{V}_n$ to which the Rayleigh-Ritz applies. The $M_E \equiv \max\{$ } in eq. (4.16) can be smaller than the $M_V \equiv \max\{$ } computed by eq. (2.46) since the result $M_V$ can be a vector from $\mathbb{V}_n$ which doesn't belong to E (the set containing only the equipartition vectors X) i.e. if $M_V$ is solved only by some vectors Y which do not consist of exactly n/2 elements +1 and n/2 elements −1.

As an illustration of the problem, $M_E$ is analogous to the "tallest programmer in the world" while $M_V$ is analogous to the "tallest person in the world." Since the set of "all persons in the world" (analogous to $\mathbb{V}_n$) includes as a proper subset the set of "all programmers in the world" (analogous to E) the tallest programmer may be shorter than the tallest person (e.g. the latter might be a non-programmer). Hence in general case the relation between the two extrema is $M_E \leq M_V$. The equality holds only if at least one solution from $M_V$ belongs also to $M_E$, or in the analogy, if at least one person among the "tallest person in the world" is also a programmer. Otherwise, strict inequality holds $M_E < M_V$.

In order to evaluate $M_E \equiv \max\{$ } in eq. (4.16), the n-dimensional vector space $\mathbb{V}_n$ (the space to which vectors |X⟩ belong) is decomposed into a direct sum of two mutually orthogonal subspaces:

$$\mathbb{V}_n = \mathbb{V}_o \oplus \mathbb{V}_E \quad (4.17)$$

Subspace $\mathbb{V}_0$ is one dimensional space spanned by a single 'vector of all ones' ⟨1| defined as:

$$\langle 1| \equiv (1,1,1,\ldots,1) \quad (4.18)$$

while $\mathbb{V}_E$ is the (n−1) dimensional orthogonal complement of $\mathbb{V}_0$ within $\mathbb{V}_n$, i.e. $\mathbb{V}_E$ is spanned by some basis of n−1 vectors which are orthogonal to ⟨1|. Using the eq. (2.6) for Walsh function $U_0(x)$, it follows:

$$\langle 1| \equiv (1,1,1,\ldots,1) = \langle U_0| \quad (4.19)$$

Hence, $\mathbb{V}_E$ is spanned by the remaining orthogonal set of n−1 Walsh functions $|U_k\rangle$, k=1 ... n−1. For convenience the latter subset of Walsh functions is labeled as set Φ below:

$$\Phi \equiv \{|U_k\rangle : k=1 \ldots n-1\} \quad (4.20)$$

Since all vectors $X \in E$ contain n/2 components equal +1 and n/2 components equal −1, then via (4.18):

$$\langle 1 | X \rangle = \sum_{i=0}^{n-1} 1 \cdot x_i = 0, \forall X \in E \quad (4.21)$$

i.e. $\langle 1|$ is orthogonal to all equipartion vectors X from E, hence the entire set E is a proper subset of $\mathbb{V}_E$ (which is the set of all vectors$\in \mathbb{V}_n$ orthogonal to $\langle 1|$). Using $M_E$ in eq. (4.16) and eq. (2.46) results in:

$$M_E \equiv \max_{X \in E}\left\{\frac{\langle X|A|X\rangle}{\langle X|X\rangle}\right\} \leq M_V \equiv \max_{X \in V_E}\left\{\frac{\langle X|A|X\rangle}{\langle X|X\rangle}\right\} = \lambda_{max} \quad (4.22)$$

The $M_V$ in eq. (4.22) is solved by an eigenvector $|Y\rangle$ of $[A]$ for which $[A]|Y\rangle = \lambda_{max}|Y\rangle$ since:

$$\frac{\langle Y|A|Y\rangle}{\langle Y|Y\rangle} = \frac{\langle Y|\lambda_{max}|Y\rangle}{\langle Y|Y\rangle} = \frac{\lambda_{max}\langle Y|Y\rangle}{\langle Y|Y\rangle} = \lambda_{max} \quad (4.23)$$

Recalling, via eq. (4.10), that the eigenbasis of the adjacency matrix $[A]$ in eq. (4.22) is the set of Walsh functions $|U_k\rangle$, and that $\mathbb{V}_E$ in which the $M_V$=max{ } is searched for, is spanned by the n−1 Walsh functions $|U_k\rangle \in \Phi$, it follows that the eigenvector $|Y\rangle$ of $[A]$ in eq. (4.23) can be selected to be one of these n−1 Walsh functions from $\Phi$ (since they form a complete eigenbasis of $[A]$ in $\mathbb{V}_E$) i.e.:

$$|Y\rangle \in \Phi \equiv \{|U_k\rangle : k=1 \ldots n-1\} \quad (4.24)$$

The equality in (4.22) holds if at least one solution $|Y\rangle \in \mathbb{V}_E$ is also a vector from the set E. In terms of the earlier analogy, this can be stated as: in the statement "the tallest student"≤"the tallest person", the equality holds if at least one among the "tallest person" happens to be a "programmer."

Since $|Y\rangle$ is one of the Walsh functions from $\Phi$ and since all $|U_k\rangle \in \Phi$ have, via eqs. (2.5) and (2.7), exactly n/2 components equal +1 and n/2 components equal −1, $|Y\rangle$ belongs to the set E. Hence the exact solution for $M_E$ in eq. (4.22) is the Walsh functions $|U_k\rangle \in \Phi$ with the largest eigenvalue $\lambda_k$. Returning to the original bisection eq. (4.15), where $M_E$ is the second term, it follows that B is solved exactly by this same solution $|Y\rangle = |U_k\rangle \in \Phi$. Combining thus eq. (4.15) with equality case for $M_E$ in eq. (4.22) yields:

$$B = \frac{nm}{4} - \frac{n}{4}M_E = \frac{n}{4}(m - \lambda_{max}) = \frac{n}{4}\left(m - \max_{k \in [1,n)}\{\lambda_k\}\right) \quad (4.25)$$

Therefore, the computation of B is reduced to evaluating n−1 eigenvalues $\lambda_k$ of $[A]$ for k=1 ... n−1 and finding a t=(k with the largest $\lambda_k$) i.e. at such that $\lambda_t \geq \lambda_k$ for k=1 ... n−1. The corresponding Walsh function $U_t$ provides the equipartition which achieves this bisection B (the exact minimum cut). The evaluation of $\lambda_k$ in eq. (4.25) can be written in terms of the m generators $h_s \in S_m$ via eq. (4.11) as:

$$B = \frac{n}{4}\left(m - \max_{k \in [1,n)}\left\{\sum_{s=1}^{m} U_k(h_s)\right\}\right) \quad (4.26)$$

Although the function values $U_k(x)$ above can be computed via eq. (2.5) as $U_k(x) = (-1)^{\mathbb{P}(k \& x)}$, due to parallelism of binary operation on a regular CPU, it is computationally more efficient to use binary form of Walsh functions, $W_k(x)$. The binary$\leftrightarrow$ algebraic translations in eqs. (2.8) can be rewritten in vector form for $U_k$ and $W_k$, with aid of definition of 11) from eq. (4.18), as:

$$|W_k\rangle \equiv \frac{1}{2}(|1\rangle - |U_k\rangle) \quad (4.27)$$

$$|U_k\rangle = |1\rangle - 2 \cdot |W_k\rangle \quad (4.28)$$

Hence, the B formula (4.26) can be written in terms of $W_k$ via eq. (4.28) and $W_k$ formula eq. (2.10) as:

$$B = \frac{n}{4}\left(m - \max_{k \in [1,n)}\left\{\sum_{s=1}^{m}(1 - 2 \cdot W_k(h_s))\right\}\right) = \quad (4.29)$$

$$\frac{n}{4}\left(m - \max_{k \in [1,n)}\left\{m - 2\sum_{s=1}^{m} W_k(h_s)\right\}\right) \Rightarrow \Rightarrow B =$$

$$\frac{n}{2}\min_{k \in [1,n)}\left\{\sum_{s=1}^{m} W_k(h_s)\right\} = \frac{n}{2}\min_{k \in [1,n)}\left\{\sum_{s=1}^{m}\mathbb{P}(k \& h_s)\right\}$$

The final expression in (4.29) is particularly convenient since for each k=1 ... n−1 it merely adds parities of the bitwise AND terms: (k&$h_s$) for all m Cayley graph generators $h_s \in S_m$. The parity function $\mathbb{P}(x)$ in eq. (4.29) can be computed efficiently via a short C function ([14] p. 42) as follows:

```
//-- Parity for 32-bit integers
inline int Parity(unsigned int x)                    (4.30)
{
    x^=x>>16, x^=x>>8, x^=x>>4, x^=x>>2;
    return (x^(x>>1))&1;
}
```

Using a $\mathbb{P}(x)$ implementation Parity(x), the entire computation of B via eq. (4.29) can be done by a small C function Bisection(n,hops[ ],m) as shown in code (4.31).

```
int Bisection(int n,int *ha,int m)                            (4.31)
{
    int cut,b,i,k;                    // n=2^d is # of nodes, m=# of hops
    for(b=n,k=1; k<n; ++k)            // Loop through all n−1 Wk( ) functions
    {                                 // Set initial min cut b=n (out of range since m<n)
        for(cut=i=0; i<m; ++i)        // Loop through all m hops ha[i], add
            cut+=Parity(ha[i]&k);     // +1 if hop[i] coincides with
                                      //    Wk(hop[i])
        if (cut<b) b=cut;             // Update min cut if count
                                      //    cut<old_min_cut
    }
    return b;                         // Return bisection (min cut) in units
                                      //    n/2
}
```

The inner loop in (4.31) executes m times and the outer loop (n−1) times, yielding total of ~m·n steps. Hence, for n−1 values of k, the total computational complexity of B is ~O(m·n²).

"Symmetry Optimization" of B Computation

A significant further speedup can be obtained by taking full advantage of the symmetries of Walsh functions $W_k$ particularly evident in the recursive definition of Hadamard matrix $H_n$ in eq. (2.1). The corresponding recursion for the binary Walsh matrix $[W_n]$ can be written as:

$$[W_2] = \begin{pmatrix} 0 & 0 \\ 0 & 1 \end{pmatrix} \quad (4.32)$$

$$[W_{2n}] = \begin{pmatrix} [W_n] & [W_n] \\ [W_n] & [\overline{W}_n] \end{pmatrix}$$

where $[\overline{W}_n]$ denotes bitwise complement of matrix $[W_n]$. For example, in the upper half of $[W_{2n}]$ the left and right sub-matrices $[W_n]$ are the same, suggesting that after computing in eq. (4.29) the partial sums of $W_k(h_s)$ over $h_s<n$ and $k<n$ (upper left quadrant of $W_{2n}$) the remaining n partial sums for $k≥n$ (top right quadrant of $W_{2n}$) can be copied from the computed left half. Similarly, in the lower half of $[W_{2n}]$ the left and right quadrants of sub-matrices are a complement of each other, which replaces the above copying method with subtractions from some constant and copying (the constant is the number of hops $h_s≥n$, i.e. the $h_s$ in the lower half of $W_{2n}$ matrix). The net result of these two computational short-circuits is a reduction of original computation in half. Since computation inside the halves $W_n$ are of the same type as the as those just described for $W_{2n}$, applying the same symmetry method recursively log(n) times to the halved matrices being generated in each stage, the net complexity of the computation of B is reduced from the earlier $O(m \cdot n^2)$ to $O(m \cdot n \cdot \log(n))$ i.e. the gain is a speedup factor of $n/\log(n)$ over the original method of eq. (4.29).

"Fast Walsh Transform Optimization" of B Computation

Analogue of the above 'halving' optimization of B computation can be formulated for the algebraic form of Walsh functions $U_k$ by defining a function $f(x)$ for $x=0, 1, \ldots n-1$ as:

$$f(x) \equiv [x \in S_m] = \begin{cases} 1 & \text{if } x \in S_m \\ 0 & \text{if } x \notin S_m \end{cases} \quad (4.33)$$

where and $0 \le x < n$ and $S_m = \{h_1, h_2, \ldots h_m\}$ is the set of m graph generators. Hence, $f(x)$ is 1 when x is equal to one of the generators $h_s \in S_m$ and 0 elsewhere. This function can be viewed as a vector $|f\rangle$, with components $f_i = f(i)$. Recalling the computation of adjacency matrix $[A]$ via eq. (4.2), vector $|f\rangle$ can also be recognized as the 0-th column of $[A]$ i.e. $f_i = [A]_{0,i}$. With this notation, the eq. (4.26) for B becomes:

$$B = \frac{n}{4}\left(m - \max_{k \in [1,n)}\left\{\sum_{s=1}^{m} U_k(h_s)\right\}\right) = \quad (4.34)$$

$$\frac{n}{4}\left(m - \max_{k \in [1,n)}\{\langle U_k | f \rangle\}\right) \equiv \frac{n}{4}\left(m - \max_{k \in [1,n)}\{F_k\}\right)$$

where: $F_k \equiv \langle U_k | f \rangle$ (4.35)

Therefore, the B computation consists of finding the largest element in the set $\{F_k\}$ of n−1 elements. Using the orthogonality and completeness of the n vectors $|U_k\rangle$, $\langle U_j | U_k \rangle = n \cdot \delta_{j,k}$ from eq. (2.3), important property of the set $\{F_k\}$ follows:

$$\sum_{k=0}^{n-1} \frac{1}{n} F_k |U_k\rangle = \quad (4.36)$$

$$\sum_{k=0}^{n-1} \frac{1}{n} |U_k\rangle\langle U_k | f \rangle = \left(\frac{1}{n}\sum_{k=0}^{n-1} |U_k\rangle\langle U_k|\right)|f\rangle = I_n |f\rangle = |f\rangle$$

The eqs. (4.35),(4.36) can be recognized as the Walsh transform ([14] chap. 23) of function $f(x)$, with n coefficients $F_k/n$ as the transform coefficients. Hence, evaluation of all n coefficients $F_k$, which in direct (4.35) computation requires $O(n^2)$ steps, can be done via Fast Walsh Transform (FWT) in $O(n \cdot \log(n))$. Note that FWT will produce n coefficients $F_k$, including $F_0$, even though we don't need $F_0$ i.e. according to eq. (4.34), we still need to look for the max{ } in the set $\{F_1, F_2, \ldots F_{n-1}\}$. Since each step involves adding of m points, the net complexity of the B computation via (4.34) using FWT is $O(m \cdot n \cdot \log(n))$, which is the same as the "symmetry optimization" result in the previous section.

Although both methods above achieve a speedup by a factor $n/\log(n)$ over the direct use of eqs. (4.26) and (4.29), the far greater saving has already occurred in the original eq. (4.26). Namely, the eq. (4.26) computes B by computing only the n−1 cuts for equipartitions $U_k \in \Omega$, instead of computing the cuts for all equipartitions in the set E of all possible equipartitions. The size of the full set E of "all possible equipartitions" is (factor ½ is due to convention that all partitions in E have +1 as the $1^{st}$ component):

$$|E| = \frac{1}{2}\binom{n}{n/2} \approx \frac{2^{n-1}}{\sqrt[2]{\pi \cdot n/2}} \quad (4.37)$$

To appreciate the savings by eq. (4.26) alone, consider a very small network of merely n=32 nodes. To obtain the exact B for this network the LH method needs to compute n−1=31 cuts, while the exact enumeration would need to compute $|E|=0.5 \cdot C(32,16)=300{,}540{,}195$ cuts i.e. 9,694,845 times greater number of cuts. Further, this ratio via eq. (2.37) grows exponentially in the size of the network n, nearly doubling for each new node added.

Optimizing Bisection

With the couple $O(m \cdot n \cdot \log(n))$ complexity methods for computation of bisection B for a given set of generators $S_m$ described in the previous sections, the next task identified is the optimization of the generator set $S_m = \{h_1, h_2, \ldots h_m\}$ i.e. the finding of the $S_m$ with the largest B. The individual hops it, are constrained to n−1 values: 1, 2, ... n−1 (0 is eliminated since no node is connected to itself), i.e. $S_m$ is an m element subset of the integer sequence 1 ... n−1. For convenience, this set of all m-subsets of integer sequence 1 ... n−1 is labeled as follows:

$$\Omega(n, m) \equiv \Omega_n \equiv \{S_m: (S_m = \{h_1, h_2, \ldots, h_m\}) \quad (4.40)$$
and
$(0 < h_s < n)\}$ $$|\Omega| \equiv |\Omega(n, m)| = \binom{n-1}{m} = O(n^m) \quad (4.41)$$

With this notation and using the binary formula for B, eq. (4.29), the B optimization task is:

$$b \equiv \frac{B}{n/2} = \max_{S_m \in \Omega_n} \left\{ \min_{k \in [1,n)} \left\{ \sum_{s=1}^{m} W_k(h_s) \right\} \right\} \quad (4.42)$$

For convenience, eq. (4.42) also defines a quantity b which is the bisection in units n/2. The worst case computational complexity the B optimization is thus $O((m \cdot n \cdot \log(n))^m)$, which is polynomial in n, hence, at least in principle, it is a computationally tractable problem as n increases. (The actual exponent m would be (m−log(n)−1), not m, since the Cayley graphs are highly symmetrical and one would not have to search over the symmetrically equivalent subsets $S_m$. Note that m is typically a hardware characteristics of the network components, such as switches, which usually don't get replaced often as network size n increases.

Since for large enough n, even a low power polynomial can render 'an in principle tractable' problem practically intractable, approximate methods for the max{ } part of the computation (4.42) would be used in practice. Particularly attractive for this purpose would be genetic algorithms and simulated annealing techniques used in [12] (albeit for the task of computing B, which the methods of this invention solve efficiently and exactly). Some of the earlier implementations of this inventions have used fast greedy algorithms, which work fairly well. The 'preferred embodiment' for the invention which is described next does not perform any such direct optimization of eq. (4.42), but uses a more effective method instead.

Bisection B Optimization Via EC Codes

In order to describe this method, the inner-most term within the nested max{min{ }} expression in the eq. (4.42) is identified and examined in more detail. For convenience, this term, which has a meaning of a cut for a partition defined via the pattern of ones in the Walsh function $W_k(x)$, is labeled as:

$$C_k \equiv \sum_{s=1}^{m} W_k(h_s) = \sum_{s=1}^{m} \mathbb{P}(k \,\&\, h_s) \quad (4.43)$$

Eq. (4.43) also expresses $W_k(x)$ in terms of parity function $\mathbb{P}(x)$ via eq. (2.10). The function $\mathbb{P}(x)$ for some d-bit integer $x = (x_{d-1} \ldots x_1 x_0)_{binary}$ is defined as:

$$\mathbb{P}(x) \equiv \left( \sum_{\mu=0}^{d-1} x_\mu \right) \bmod 2 = (x_0 \wedge x_1 \wedge \ldots \wedge x_{d-1}) \quad (4.44)$$

The last expression in eq. (4.44) shows that $\mathbb{P}(x) \equiv \mathbb{P}(x_{d-1} \ldots x_1 x_0)$ is a "linear combination" in terms of the selected field $GF(2)^d$, of the field elements provided in the argument. The eq. (4.43) contains a modified argument of type $\mathbb{P}(k\&h)$, for $h \in S_m$, which can be reinterpreted as: the 'ones' from the integer k are selecting a subset of bits from the d-bit integer h, then $\mathbb{P}(x)$ performs the linear combination of the selected subset of bits of h. For example, if $k=11_{dec}=1011_{bin}$ than the action of $W_{1011}(h) \equiv \mathbb{P}(1011\&h)$ is to compute linear combination of the bits bit-0,1 and 3 of h (bit numbering is zero based, from low/right to high/left significance). Since eq. (4.43) performs the above "linear combination via ones in k" action of $W_k$ on a series of d-bit integers $h_s$, s=1 . . . m, the $W_k$ "action" on such series of integers is interpreted as the parallel linear combination on the bit-columns of the list of $h_s$ as shown in the Table 4.6, for k=1011 and $W_{1011}$ acting on a set of generators $S_5=\{0001, 0010, 0100, 1101\}$. The 3 bit-columns $V_3, V_1$ and $V_0$ selected by ones in k are combined via XOR into the resulting bit-column V: $|V_3\rangle \oplus |V_1\rangle \oplus |V_0\rangle = |V\rangle$.

TABLE 4.6

| k | 1 | 0 | 1 | 1 | Resulting column V |
|---|---|---|---|---|---|
|   | ↓ |   | ↓ | ↓ |   |
| $h_1 \rightarrow$ | 0 | 0 | 0 | 1 | 1 |
| $h_2 \rightarrow$ | 0 | 0 | 1 | 0 | 1 |
| $h_3 \rightarrow$ | 0 | 1 | 0 | 0 | 0 |
| $h_4 \rightarrow$ | 1 | 0 | 0 | 0 | 1 |
| $h_5 \rightarrow$ | 1 | 1 | 0 | 1 | 0 |
| Columns: | $V_3$ | ⊕ | $V_1$ | ⊕ $V_0$ |  |

Therefore, the action of a $W_k$ on the generator set $S_m = \{h_1, h_2, \ldots h_m\}$ can be seen as a "linear combination" of the length-m columns of digits (columns selected by ones in k from $W_k$) formed by the m generators $h_s$. If instead of the g used in the example of Table 4.6, there was a more general Cayley graph group, such as $Z_2^d$, instead of the bit-columns there would have been length-m columns made of digits in alphabet of size q (i.e. integers 0 . . . q−1) and the XOR would have been replaced with the appropriate GF(q) field arithmetic e.g. addition modulo q on m-tuples for $Z_q^d$ as illustrated in an earlier example in Table 4.1. The construction of column vectors $|V_\mu\rangle$ of Table 4.6 can be expressed more precisely via an m×d matrix $[R_{m,d}]$ defined as:

$$[R_{m,d}] \equiv \sum_{s=1}^{m} |e_s\rangle \langle h_s| = \begin{pmatrix} \langle h_1| \\ \ldots \\ \langle h_m| \end{pmatrix} = \begin{pmatrix} h_{1,d-1} & h_{1,d-2} & \ldots & h_{1,0} \\ \ldots & \ldots & \ldots & \ldots \\ h_{m,d-1} & h_{m,d-2} & \ldots & h_{m,0} \end{pmatrix} \equiv \quad (4.45)$$

$$\equiv (|V_{d-1}\rangle, |V_{d-2}\rangle, \ldots |V_0\rangle)$$

where: $(|V_\mu\rangle)_s \equiv h_{s,\mu} = (\langle h_s|)_\mu$ for $\mu = 0 \ldots d-1, s = 1 \ldots m$ (4.46)

Hence the m rows of matrix $[R_{m,d}]$ are m generators $\langle h_s| \in S_m$ and its d columns are d column vectors $|V_\mu\rangle$. The above 'linear combination of columns via ones in k' becomes in this notation:

$$|V(k)\rangle \equiv \sum_{\mu=0}^{d-1} k_\mu |V_\mu\rangle \quad (4.47)$$

where $$k \equiv \sum_{\mu=0}^{d-1} k_\mu 2^\mu$$

where the linear combination of $k_\mu |V_\mu\rangle$ is performed in GF(q) i.e. mod q on each component of m-tuples $k_\mu |V_\mu\rangle$. The sum computing the cut $C_k$ in eq. (4.43) is then simply adding (without mod q) all components of the vector $|V(k)\rangle$ from eq. (4.47). Recalling the definition of Hamming weight as the number of non-zero digits, this cut $C_k$ is recognizable as the Hamming weight of the vector $|V(k)\rangle$:

$$C_k = \langle V(k)\rangle \tag{4.48}$$

The next step is to propagate the new "linear combination" interpretation of $W_k$ action back one more level, to the original optimization problem in eq. (4.42), in which the cut $C_k$ was only the innermost term. The min{ } block of eq. (4.42), seeks a minimum value of $C_k$ for all k=1 . . . n−1. The set of n vectors $|V(k)\rangle$ obtained via eq. (4.47) when k runs through all possible integers 0 . . . n−1 is a d-dimensional vector space, a linear span (subspace of m-tuples vector space $\mathbb{V}_m$), which is denoted as $\mathbb{S}$ (d,m,q):

$$\mathbb{S}(d,m,q) \equiv \{|V(k)\rangle : k=0 \ldots n-1\} \tag{4.49}$$

Therefore, the min{ } level optimization in eq. (4.42) computing bisection b, seeks a non-zero vector $|V(k)\rangle$ from the linear span $\mathbb{S}$ (d,m,q) with the smallest Hamming weight $\langle V(k)\rangle$:

$$b = \min\{\langle V(k)\rangle : (V(k) \in \mathbb{S}(d,m,q)) \text{ and } (V(k) \neq 0)\} \tag{4.50}$$

While Hamming weight can be used in some embodiments of the invention, any other weight, such as Lee weight, which would correspond to other Cayley graph groups $G_n$ and generator sets $S_m$, can also be used.

But b in eq. (4.50) is precisely the definition eq. (2.25) of the minimum weight $w_{min}$ in the codeword space (linear span) $\mathbb{S}$ (_k,_n,q) of non-zero codewords Y. Note: In order to avoid the mix up in the notation between the two fields, the overlapping symbols [n,k] which have a different meaning in ECC, will in this section have an underscore prefix, i.e. the linear code [n,k] is relabeled as [_n,_k].

The mapping between the ECC quantities and LH quantities is then: $w_{min} \Leftrightarrow b$, _k $\Leftrightarrow$ d, _n $\Leftrightarrow$ m, _k vectors $\langle g_i|$ spanning linear space $\mathbb{S}$ (_k,_n,q) of _n-tuples and constructing code generator matrix [G] (eq. (2.20)) $\Leftrightarrow$ d columns $|V_\mu\rangle$ for $\mu$=0 . . . d−1 spanning linear space $\mathbb{S}$ (d,m,q) of m-tuples (digit-columns in the generator list). Since, via eq. (2.26) the minimum weight of the code $w_{min}$ is same as the minimum distance $\Delta$ between the codewords Y, it follows that the bisection b is also the same quantity as the ECC $\Delta$ (even numerically). Table 4.7 lists some of the elements of this mapping.

TABLE 4.7

| Linear EC codes | _k | _n | $\mathbb{S}$(_k,_n,q) | $\Delta$ | _k rows of _n-tuples $\langle g_i|$ | q for GF(q) |
|---|---|---|---|---|---|---|
| LH Networks | d | m | $\mathbb{S}$(d,m,q) | b | d columns of m-tuples $|V_\mu\rangle$ | q for $Z_q^d$ |

The optimization of linear code [_n,_k, $\Delta$] that maximizes $\Delta$ is thus the same optimization as the outermost level of the LH optimization, max{ } level in eq. (4.42) that seeks the Cayley graph generator set $S_m$ with the largest bisection b—other than difference in labeling conventions, both optimizations seek the d-dimensional subspace $\mathbb{S}$ (d,m,q) of some vectors space $\mathbb{V}_m$ which maximizes the minimum non-zero weight $w_{min} \Leftrightarrow$ 3 of the subspace $\mathbb{S}$. The two problems are mathematically one and the same.

Therefore, the vast numbers of good/optimal linear ECC codes computed over the last six decades (such as EC code tables [17] and [22]) are immediately available as good/optimal solutions for the b optimization problem of the LH networks, such as eq. (4.42) for Cayley graph group $G_n = Z_q^d$. Similarly any techniques, algorithms and computer programs (e.g. MAGMA ECC module http://magma.maths.usyd.edu.au/magma/handbook/linear_codes_over_finite_fields) used for constructing and combining of good/optimum linear EC codes, such as quadratic residue codes, Goppa, Justesen, BCH, cyclic codes, Reed-Muller codes, . . . [15],[16], via translation Table 4.7, automatically become techniques and algorithms for constructing good/optimum LH networks.

As an illustration of the above translation procedure, a simple parity check EC code [4,3,1]$_2$ with generator matrix [$G_{3,4}$] is shown in Table 4.8. The codeword has 1 parity bit followed by 3 message bits and is capable of detecting all single bit errors. The translation to the optimum network shown on the right, is obtained by rotating 90° counter-clockwise (5 the 3×4 generator matrix [$G_{3,4}$]. The obtained block of 4 rows with 3 bits per row is interpreted as 4 generators $h_s$, each 3 bits wide, for the Cay($Z_2^3$,$C_4$) graph. The resulting network thus has d=3, n=$2^3$=8 nodes and m=4 links/node. The actual network is a folded 3-cube shown within an earlier example in Table 4.4. Its bisection is: b=2 and B=b·n/2=8 links.

TABLE 4.8

$$[G_{3,4}] = \begin{pmatrix} 1 & 1 & 0 & 0 \\ 1 & 0 & 1 & 0 \\ 1 & 0 & 0 & 1 \end{pmatrix} \Rightarrow C_4 = \begin{matrix} h_1 = 001 = 1 \\ h_2 = 010 = 2 \\ h_3 = 100 = 4 \\ h_4 = 111 = 7 \end{matrix}$$

A slightly larger and denser network using EC code [7,4,3]$_2$ from Table 2.4 (Appendix A), is converted into an optimum solution, a graph Cay($Z_2^4$,$C_7$), with d=4, n=16 nodes and m=7 link/node as shown in Table 4.9.

TABLE 4.9

$$[G_{4,7}] = \begin{pmatrix} 1 & 1 & 0 & 1 & 0 & 0 & 0 \\ 0 & 1 & 1 & 0 & 1 & 0 & 0 \\ 1 & 1 & 1 & 0 & 0 & 1 & 0 \\ 1 & 0 & 1 & 0 & 0 & 0 & 1 \end{pmatrix} \Rightarrow C_7 = \begin{matrix} h_1 = 0001 = 1 \\ h_2 = 0010 = 2 \\ h_3 = 0100 = 4 \\ h_4 = 1000 = 8 \\ h_5 = 0111 = 7 \\ h_6 = 1110 = E \\ h_7 = 1011 = B \end{matrix}$$

The 4 row, 7 column generator matrix [$G_{4,7}$] of the linear EC code [7,4,3]$_2$ on the left side was rotated 90° counter-clockwise and the resulting 7 rows of 4 digits are binary values for the 7 generators $h_s$ (also shown in hex) of the 16 node Cayley graph. The resulting n=16 node network has relative bisection (in n/2 units) b=$\Delta$=3 and absolute bisection (in # of links) of: B=b·n/2=3·16/2=24 links. Since the network is a non-planar 4-dimensional cube with total n·m/2=16·7/2=56 links it is not drawn.

The above examples are captured by the following simple, direct translation recipe:

$$EC \text{ code}[\_n,\_k,\Delta]_q \rightarrow LHCay(Z_q^d, S_m) \tag{4.45}$$

(i) Take EC code generator matrix [$G_{\_k,\_n}$] and rotate it 90° (in either direction—direction of rotation merely selects order of generators in the list, which is an arbitrary convention.)

(ii) The result is m=_n row by d=_k column matrix $[R_{m,d}]$ of GF(q)-digits 0 ... q−1
(iii) Read m rows of d-tuples in base q from $[R_{m,d}]$ as m generators $h_s \in S_m \subset Z_q^d$
(iv) Compute Cayley graph LH=Cay($Z_q^d, S_m$) from the obtained generators $S_m = \{h_1, h_2, \ldots h_m\}$
(v) LH: $n = q^d$ nodes, m links/node, bisection: relative b=Δ, absolute B=Δ·n/2 links.

The methods of determining the bisection B can be implemented using a computer program or set of computer programs organized to perform the various steps described herein. The computer can include one or more processors and associate member, including volatile and non-volatile memory to store the programs and data. For example, a conventional IBM compatible computer running the Windows or Linux operating system or an Apple computer system can be used and the programs can be written, for example, the in C programming language.

Implementation Notes

N-1. Equivalent LH Networks

Order of elements in a generator set $S_m = \{h_1, h_2, \ldots h_m\}$ is clearly a matter of convention and network performance characteristics don't depend on particular ordering. Similarly, the subspace $\mathbb{S}(d,m,q)$ of the column vectors can be generated using any linearly independent set of d vectors from $\mathbb{S}(d,m,q)$ instead of the original subset $\{V_\mu\}$. All these transformation of a given network yield equivalent networks, differing only in labeling convention but all with the same distribution of cuts (including min-cut and max-cut) and the same network paths distribution (e.g. same average and max paths). This equivalence is used to compute specific generators optimized for some other objective, beyond the cuts and paths. Some of these other objectives are listed in the notes below.

N-2. Minimum Change Network Expansion

During expansion of the network, it is useful that the next larger network is produced with the minimum change from the previous configuration e.g. requiring the fewest cables to be reconnected to other switches or ports. The equivalence transforms of N-1 are used to "morph" the two configuration, initial and final toward each other, using the number of different links in $S_m$ as the cost function being minimized. Techniques and algorithms of "Compressive Sensing" [CS] (see [20]) are particularly useful as the source for the efficient "morphing" algorithms.

N-3. Diagonalization

It is often useful, especially in physical wiring, discovery and routing, to have a $Z_q^d$ based network in which (usually first) d hops from $S_m$ are powers of q. This property of generator set $S_m$ corresponds to systematic generator matrix $[G_{\_k,\_n}]$ for linear codes and can be recognized by the presence of identity matrix $I_d$ within $[G_{\_k,\_n}]$ (possibly with permuted columns). The two previous examples, Tables 4.8 and 4.9 were of this type (the digits of $I_d$ sub-matrix were in bold).

A simple, efficient method for computing a "systematic generator" from non-systematic one is to select for each column c=0 ... d−1 a row r(c)=1 ... m that contains a digit 1 in column c. If row r(c) doesn't contain any other ones, then we have one column with desired property (the $h_{r(c)}$ is a power of 2). If there are any other columns, such as c' which contain ones in row r(c), the column $V_c$ is XOR-ed into these columns $V_{c'}$, clearing the excessive ones in r(c). Finally, when there is a single 1 in row r(c) and column c, the hop $h_{r(c)}$ is swapped with hop $h_{c+1}$ so that the resulting matrix contains generator $h_{c+1} = 2^c$. The process is repeated for the remaining columns c<d.

The number of XOR operations between columns needed to reduce some row r(c) to a single 1 in column c, is $\langle h_{r(c)} \rangle - 1$. Therefore, to reduce number of required XOR-s (columns are m bits long which can be much larger than the machine word), for each new c to diagonalize, algorithm picks the row which has the smallest weight, $\min\{\langle h_{r(c)} \rangle\}$.

N-4. Digital or (t,m,s) Nets (or Designs, Orthogonal Arrays)

This research field closely related to design of optimal linear codes $[\_n,\_k,\Delta]_q$ (cf. [21],[22]). The basic problem in the field of 'digital nets' is to find distribution of points on s-dimensional hypercubic (fish-) net with "binary intervals" layout of 'net eyes' (or generally analogous b-ary intervals via powers of any base b, not only for b=2) which places the same number of points into each net eye. There is a mapping between $(t,\_m,s)_b$ digital nets and $[\_n,\_k]_q$ codes via identities: $\_n=s, \_k=s-\_m, q=b$. A large database of optimal (t,_m,s) nets, which includes linear code translations is available via a web site [22]. Therefore, the solutions, algorithms and computer programs for constructing good/optimal (t,_m,s) nets are immediately portable to construction of good/optimal LH networks via this mapping followed by the $[\_n,\_k]_q \to$ LH mapping in Table 4.7.

N-5. Non-Binary Codes

The linear codes with q>2 generate hyper-torus/-mesh type of networks of extent q when the Δ metrics of the code is Lee distance. When Hamming distance is used for q>2 codes, the networks are of generalized hypercube/flattened butterfly type [3]. For q=2, which is the binary code, the two types of distance metrics are one and the same.

N-6. Non-Binary Walsh Functions

Walsh functions readily generalize to other groups, besides cyclic group $Z_2^d$ used here (cf. [23]). A simple generalization to base q>2 for groups $Z_q^d$, for any integer q is based on defining function values via q-th primitive root of unity ω:

$$U_{q,k}(x) = \omega^{\sum_{\mu=0}^{d-1} k_\mu x_\mu} \text{ for } x, k < n \equiv q^d \quad (4.50)$$

where:

$$\omega \equiv e^{2\pi i/q} \quad (4.51)$$

For q=2, eq. (4.51) yields ω=(−1), which reduces $U_{q,k}(x)$ from eq. (4.50) to the regular Walsh functions $U_k(x)$, eq. (2.5). The q discrete values of $U_{q,k}(x)$ can be also mapped into integers in [0,q) interval to obtain integer-valued Walsh functions $W_{q,k}(x)$ (analogue of binary form $W_k(x)$), which is useful for efficient computer implementation, via analogous mapping to the binary case e.g. via mapping $a = \omega^b$ for integer b=0 ... n−1, where b:integer, a:algebraic value, as in eq. (2.8) where this same mapping (expressed differently) was used for q=2.

The non-binary Walsh functions $U_{q,k}$ can also be used to define graph partition into f parts where f is any divisor of q (including q). For even q, this allows for efficient computation of bisection. The method is a direct generalization of the binary case: the q distinct function values of $U_{q,k}(x)$ define partitions arrays $X_k[x] \equiv U_{q,k}(x)$ containing $n = q^d$ elements indexed by x=0 ... n−1. Each of q values of $U_{q,k}(x)$ indicates a node x belongs to one of the q parts. The partitions $X_k$ for k=1 ... n−1 are examined and cuts computed using the adjacency matrix [A] for Cay($Z_q^d, S_m$) graph, as in eq. (4.14) for q=2. The generators T(a) and adjacency matrix [A] are computed via general eqs. (4.1),(4.2), where ⊕ operator is GF(q) addition (mod q).

The algorithmic speed optimizations via "symmetry optimization" and "Fast Walsh Transform optimization" apply here as well (see [14] pp. 465-468 on fast transforms for multi-valued Walsh functions).

N-7. Secondary Optimizations

Once the optimum solution for (4.42) is obtained (via ECC, Digital nets, or via direct optimization), secondary optimizations, such as seeking the minimum diameter (max distance) or minimum average distance or largest max-cut, can be performed on the solution via local, greedy algorithms. Such algorithms were used in construction of our data solutions data base, where each set of parameters (d, m, q) has alternate solutions optimized for some other criteria (usually diameter, then average distance).

The basic algorithm attempts replacement of typically 1 or 2 generators $h_s \in S_m$, and for each new configuration it evaluates (incrementally) the target utility function, such as diameter, average distance or max-cut (or some hierarchy of these, used for tie-breaking rules). The number of simultaneous replacements depends on n, m and available computing resources. Namely, there are $\sim n^r$ possible simultaneous deletions and insertions (assuming the "best deletion" is followed by "best" insertion). The utility function also uses indirect measures (analogous to sub-goals) as a tie-breaking selection criterion e.g. when minimizing diameter, it was found that an effective indirect measure is the number of nodes #F in the farthest (from node 0) group of nodes. The indirect objective in this case would be to minimize the #F of such nodes, whenever the examined change (swap of 1 or two generators) leaves the diameter unchanged.

In addition to incremental updates to the networks after each evaluated generators replacement, these algorithms rely on vertex symmetry of Cayley graphs to further reduce computations. E.g. all distance tables are only maintained and updated for n−1 distances from node 0 ("root"), since the table is the same for all nodes (with mere permutation of indices, obtainable via T(a) representation of $G_n$ if needed).

Depending on network application, the bisection b can be maintained fixed for all replacements (e.g. if bisection is the highest valued objective), or one can allow b to drop by some value, if the secondary gains are sufficiently valuable.

After generating and evaluating all replacements to a given depth (e.g. replacement of 1 or 2 generators), the "best" one is picked (according to the utility/cost function) and replacement is performed. Then the outer iteration loop would continue, examining another set of replacements seeking the best one, etc. until no more improvements to the utility/cost function can be obtained in the last iteration.

Specialized Solution

This section describes several optimum LH solutions with particularly useful parameters or simple construction patterns.

S-1. High Density LH Networks for Modular Switches (LH-HD)

This is a special case of LH networks with high topological link density, suitable for combining smaller number of high radix switches into a single large radix modular switch. This is a specialized domain of network parameters where the 2-layer Fat Tree (FT-2) networks are currently used since they achieve the yield of E=R/3 external ports/switch, which is the maximum mathematically possible for the worst case traffic patterns. The 'high density' LH networks (LH-HD) match the FT-2 in this optimum E=R/3 external ports/switch yield for the worst case traffic patterns, while achieving substantially lower average latency and the cost in Gb/s of throughput on random or 'benign' (non-worst case) traffic.

In our preferred embodiment using Cay($Z_2^d, S_m$) graph, the network size is $n=2^d$ switches and the number of links per node m is one of the numbers: n/2, n/2+n/4, n/2+n/4+n/8, . . . , n/2+n/4+n/8+ . . . +1, then the optimum m generators for LH-HD are constructed as follows:

(i) $h_1=n-1, h_2=n-2, h_3=n-3, \ldots h_m=n-m$ (ii) Optionally diagonalize and sort $S_m$ via procedure (N-3) (Of course, there are a large number of equivalent configurations obtained via equivalence transforms N-1.)

The resulting bisection is: $b=\lfloor(m+1)/2\rfloor$ or B=b·n/2, diameter is 2 and average hops is 2−m/n. The largest LH-HD m=n/2+n/4+n/8+ . . . +1=n−1 has b=n/2 and corresponds to a fully meshed network.

Table 4.10 shows an example of LH-HD generators for $n=2^6=64$ nodes and m=n/2=32 hops/node, with the hops shown in hex and binary (binary 0s are shown as '-' character). Table 4.10(a) shows the non-diagonalized hops after the step (i), and Table 4.10(b) shows the equivalent network with m=32 hops after diagonalization in step (ii) and sorting. Other possible LH-HD m values for the same n=64 node network are m=32+16=48, m=48+8=56, m=56+4=60, m=60+2=62 and m=61+1=63 hops.

Additional modified LH-HD networks are obtained from any of the above LH-HD networks via removal of any one or two generators, which yields networks LH-HD1 with $m_1=m-1$ and LH-HD2 with $m_2=m-2$ generators. Their respective bisections are $b_1=b-1$ and $b_2=b-2$. These two modified networks may be useful when an additional one or two server ports are needed on each switch compared to the unmodified LH-HD network.

These three types of high density LH networks are useful for building modular switches, networks on a chip in multi-core or multi-processor systems, flash memory/storage network designs, or generally any of the applications requiring very high bisection from a small number of high radix components and where FT-2 (two level Fat Tree) is presently used. In all such cases, LH-HD will achieve the same bisections at a lower latency and lower cost for Gb/s of throughput.

TABLE 4.10

| | (a) | | | (b) | |
|---|---|---|---|---|---|
| 1. | 3F | 111111 | 1. | 1 | .....1 |
| 2. | 3E | 11111. | 2. | 2 | ....1. |
| 3. | 3D | 1111.1 | 3. | 4 | ...1.. |
| 4. | 3C | 1111.. | 4. | 8 | ..1... |
| 5. | 3B | 111.11 | 5. | 10 | .1.... |
| 6. | 3A | 111.1. | 6. | 20 | 1..... |
| 7. | 39 | 111..1 | 7. | 7 | ...111 |
| 8. | 38 | 111... | 8. | B | ..1.11 |
| 9. | 37 | 11.111 | 9. | D | ..11.1 |
| 10. | 36 | 11.11. | 10. | E | ..111. |
| 11. | 35 | 11.1.1 | 11. | 13 | .1..11 |
| 12. | 34 | 11.1.. | 12. | 15 | .1.1.1 |
| 13. | 33 | 11..11 | 13. | 16 | .1.11. |
| 14. | 32 | 11..1. | 14. | 19 | .11..1 |
| 15. | 31 | 11...1 | 15. | 1A | .11.1. |
| 16. | 30 | 11.... | 16. | 1C | .111.. |
| 17. | 2F | 1.1111 | 17. | 1F | .11111 |
| 18. | 2E | 1.111. | 18. | 23 | 1...11 |
| 19. | 2D | 1.11.1 | 19. | 25 | 1..1.1 |
| 20. | 2C | 1.11.. | 20. | 26 | 1..11. |
| 21. | 2B | 1.1.11 | 21. | 29 | 1.1..1 |
| 22. | 2A | 1.1.1. | 22. | 2A | 1.1.1. |
| 23. | 29 | 1.1..1 | 23. | 2C | 1.11.. |
| 24. | 28 | 1.1... | 24. | 2F | 1.1111 |
| 25. | 27 | 1..111 | 25. | 31 | 11...1 |
| 26. | 26 | 1..11. | 26. | 32 | 11..1. |
| 27. | 25 | 1..1.1 | 27. | 34 | 11.1.. |
| 28. | 24 | 1..1.. | 28. | 37 | 11.111 |
| 29. | 23 | 1...11 | 29. | 38 | 111... |

TABLE 4.10-continued

| (a) | | | (b) | | |
|---|---|---|---|---|---|
| 30. | 22 | 1...1. | 30. | 3B | 111.11 |
| 31. | 21 | 1....1 | 31. | 3D | 1111.1 |
| 32. | 20 | 1..... | 32. | 3E | 11111. |

S-2. Low Density LH Networks with b=3

This subset of LH networks is characterized by comparatively low link density and low bisection b=3 i.e. B=3n/2 links. They are constructed as a direct augmentation of regular hypercubic networks which have bisection b=1. The method is illustrated in Table 4.11 using augmentation of the 4-cube.

TABLE 4.11

| | | | | |
|---|---|---|---|---|
| $h_1 \rightarrow$ | 0 | 0 | 0 | 1 |
| $h_2 \rightarrow$ | 0 | 0 | 1 | 0 |
| $h_3 \rightarrow$ | 0 | 1 | 0 | 0 |
| $h_4 \rightarrow$ | 1 | 0 | 0 | 0 |
| $h_5 \rightarrow$ | 0 | 1 | 1 | 1 |
| $h_6 \rightarrow$ | 1 | 1 | 1 | 0 |
| $h_7 \rightarrow$ | 1 | 0 | 1 | 1 |
| | $C_1$ | $C_2$ | $C_3$ | $C_4$ |

The d=4 hops $h_1$, $h_2$, $h_3$ and $h_4$ for the regular 4-cube are enclosed in a 4×4 box on the top. The augmentation consists of 3 additional hops $h_5$, $h_6$ and $h_7$ added in the form of 4 columns $C_1$, $C_2$, $C_3$ and $C_4$, where each column $C_\mu$ ($\mu=1\ldots d$) has length of L=3 bits. The resulting network has n=16 nodes with 7 links per node and it is identical to an earlier example in Table 4.9 with b=3 obtained there via translation from a $[7,4,3]_2$ EC code into the LH network. General direct construction of the b=3 LH network from a d-cube is done by appending d columns $C_\mu$ ($\mu=1\ldots d$) of length L bits, such that each bit column has at least 2 ones and L is the smallest integer satisfying inequality:

$$2^L - L - 1 \geq d \quad (4.60)$$

The condition in eq. (4.60) expresses the requirement that d columns $C_\mu$ must have at least 2 ones. Namely, there are total of $2^L$ distinct bit patterns of length L. Among all $2^L$ possible L-bit patterns, 1 pattern has 0 ones (00 ... 0) and L patterns have a single one. By removing these two types, with 0 or single one, there are $2^L-(L+1)$ remaining L-bit patterns with two or more ones, which is the left hand side of eq. (4.60). Any subset of d distinct patterns out of these $2^L-(L+1)$ remaining patterns can be chosen for the above augmentation. The Table 4.12 shows values L (number of added hops to a d-cube) satisfying eq. (4.60) for dimensions d of practical interest.

TABLE 4.12

| $d_{min}$ | $d_{max}$ | L |
|---|---|---|
| 3 | 4 | 3 |
| 5 | 11 | 4 |
| 12 | 26 | 5 |
| 27 | 57 | 6 |

S-3. Augmentation of LH Networks with b=Odd Integer

This is a very simple, yet optimal, augmentation of an LH network which has m links per node and bisection b=odd integer into LH network with bisection $b_1$=b+1 and $m_1$=m+1 links per node. The method is illustrated in Table 4.14 using the augmented 4-cube (d=4, n=16 nodes) with m=7 links per node and bisection b=3, which was used in earlier examples in Tables 4.9 and 4.12.

TABLE 4.14

| | | | | |
|---|---|---|---|---|
| $h_1 \rightarrow$ | 0 | 0 | 0 | 1 |
| $h_2 \rightarrow$ | 0 | 0 | 1 | 0 |
| $h_3 \rightarrow$ | 0 | 1 | 0 | 0 |
| $h_4 \rightarrow$ | 1 | 0 | 0 | 0 |
| $h_5 \rightarrow$ | 0 | 1 | 1 | 1 |
| $h_6 \rightarrow$ | 1 | 1 | 1 | 0 |
| $h_7 \rightarrow$ | 1 | 0 | 1 | 1 |
| XOR | ⊕ | ⊕ | ⊕ | ⊕ |
| | ↓ | ↓ | ↓ | ↓ |
| $h_8 \rightarrow$ | 1 | 1 | 0 | 1 |

A single augmenting link $h_8 = h_1\hat{\,}h_2\hat{\,} \ldots \hat{\,}h_7$ (bitwise XOR of the list) is added to the network which increases bisection from b=3 to b=4 i.e. it increases the absolute bisection B by n/2=16/2=8 links. The general method for $\text{Cay}(Z_2^d, S_m)$ with b='odd integer' consists of adding the link $h_{m+1} = h_1\hat{\,}h_2\hat{\,} \ldots \hat{\,}h_m$ n (the bitwise XOR of the previous m hops) to the generator set $S_m$. The resulting LH network $\text{Cay}(Z_2^d, S_{m+1})$ has bisection $b_1$=b+1.

The only case which requires additional computation, beyond merely XOR-ing the hop list, is the case in which the resulting hop $h_{m+1}$ happens to come out as 0 (which is an invalid hop value, a self-link of node 0 to itself). In such case, it is always possible to perform a single hop substitution in the original list $S_m$ which will produce the new list with the same b value but a non-zero value for the list XOR result $h_{m+1}$.

LH Construction for a Target Network

In practice one would often need to construct a network satisfying requirements expressed in terms of some target number of external ports P having oversubscription $\phi$, obtained using switches of radix R. The resulting construction would compute the number n of radix-R switches needed, as well as the list for detailed wiring between switches. For concreteness, each radix-R switch will be assumed to have R ports labeled as port #1, #2, ... #R. Each switch will be connected to mother switches using ports #1, #2, ... #m (these are topological ports or links) and leave E=R−m ports: #m+1, #m+2, ... #R as "external ports" per switch available to the network users for servers, routers, storage, ... etc. Hence, the requirement of having total of P external ports is expressed in terms of E and number of switches n as:

$$E = P/n \quad (4.70)$$

The oversubscription eq. (3.1) is then expressed via definition of bisection b in eq. (4.42) as:

$$\phi \equiv \frac{P/2}{B} = \frac{E \cdot n/2}{B} = \frac{E}{\frac{B}{n/2}} = \frac{E}{b} = \frac{R-m}{b} \quad (4.71)$$

The illustrative construction below will use non-oversubscribed networks, $\phi=1$, simplifying eq. (4.71):

$$E=b=R-m \quad (4.72)$$

i.e. for non-oversubscribed networks, the number of external ports/switch E must be equal to the relative bisection b (this the bisection in units n/2), or equivalently, the number of links/switch: m=R−b.

In order to find appropriate $n=2^d$ and m parameters, LH solutions database, obtained by translating optimum EC code tables [17] and [22] via recipe (4.45), groups solutions by network dimension d into record sets $D_d$, where d=3, 4, ... 24. These dimensions cover the range of network sizes $n=2^d$ that are of practical interest, from $n=2^3=8$ to $n=2^{24}\approx16$ million switches. Each record set $D_d$ contains solution records for m=d, d+1, ... $m_{max}$ links/switch, where the present database has $m_{max}=256$ links/switch. Each solution record contains, among others, the value m, bisection b and the hop list $h_1, h_2, \ldots h_m$.

For given P, R and $\phi$, LH constructor scans record sets $D_d$, for d=3, 4, ... and in each set, inspects the records for m=d, d+1, ... computing for each (d,m) record values E(d,m)=R−m ports/switch, total ports $P(d,m)=n \cdot E(d,m)=2^d \cdot R-m)$ and oversubscription $\phi(d,m)=E(d,m)/b$ (value b is in each (d,m) record). The relative errors $\delta P=|P(d,m)-P|/P$ and $\delta\phi=|\phi(d,m)-\div\phi|/\phi$ are computed and the best match (record (d,m) with the lowest combined error) is selected as the solution to use. If the requirement is "at least P ports" then the constraint $P(d,m)-P\geq 0$ is imposed for the admissible comparisons. The requirements can also prioritize $\delta P$ and $\delta\phi$ via weights for each (e.g. $0.7 \cdot \delta P+0.3 \cdot \delta\phi$) for total error). After finding the best matching (d,m) record, the hop list $h_1, h_2, \ldots h_m$ is retrieved from the record and the set of links L(v) is computed for each node v, where v=0, 1, ... n−1, as: $L(v)=\{v \hat{~} h_s$ for s=1 ... m$\}$. Given n such sets of links, L(0), L(1), ..., L(n−1), the complete wiring for the network is specified. The examples below illustrate the described construction procedure.

EXAMPLE 1

Small Network with P=96 Ports at $\phi=1$, Using Switches with Radix R=12

The LH database search finds the exact match ($\delta P=0$, $\delta\phi=0$) for the record d=5, m=9, hence requiring $n=2^d=2^5=32$ switches of radix 11=12. The bisection b=3 and the hop list (in hex base) for the record is: $S_9=\{1, 2, 4, 8, 10, E, F, 14, 19\}_{hex}$. The number of external ports per switch is E=b=3, combined with m=9 topological ports/switch, results in radix 11=3+9=12 total ports/switch as specified. The total number of external ports is $P=E \cdot n=3 \cdot 32=96$ as required. Diameter (max hops) for the network is D=3 hops, and the average hops (latency) is Avg=1.6875 hops. Table 4.15 shows complete connection map for the network for 32 switches, stacked in a 32-row rack one below the other, labeled in leftmost column "Sw" as 0, 1, ... 1F (in hex). Switch 5 is outlined with connections shown for its ports #1, #2, ... #9 to switches (in hex) 04, 07, 01, 0D, 15, 0B, 0A, 11 and 1C. These 9 numbers are computed by XOR-ing 5 with the 9 generators (row 0): 01, 02, 04, 08, 10, 0E, 0F, 14, 19. The free ports are #10, #11 and #12.

TABLE 4.15

| Sw/Pt: | #1 | #2 | #3 | #4 | #5 | #6 | #7 | #8 | #9 | #10 | #11 | #12 |
|---|---|---|---|---|---|---|---|---|---|---|---|---|
| 0: | 01 | 02 | 04 | 08 | 10 | 0E | 0F | 14 | 19 | ** | ** | ** |
| 1: | 00 | 03 | 05 | 09 | 11 | 0F | 0E | 15 | 18 | ** | ** | ** |
| 2: | 03 | 00 | 06 | 0A | 12 | 0C | 0D | 16 | 1B | ** | ** | ** |
| 3: | 02 | 01 | 07 | 0B | 13 | 0D | 0C | 17 | 1A | ** | ** | ** |
| 4: | 05 | 06 | 00 | 0C | 14 | 0A | 0B | 10 | 1D | ** | ** | ** |
| 5: | 04 | 07 | 01 | 0D | 15 | 0B | 0A | 11 | 1C | ** | ** | ** |
| 6: | 07 | 04 | 02 | 0E | 16 | 08 | 09 | 12 | 1F | ** | ** | ** |
| 7: | 06 | 05 | 03 | 0F | 17 | 09 | 08 | 13 | 1E | ** | ** | ** |
| 8: | 09 | 0A | 0C | 00 | 18 | 06 | 07 | 1C | 11 | ** | ** | ** |
| 9: | 08 | 0B | 0D | 01 | 19 | 07 | 06 | 1D | 10 | ** | ** | ** |
| A: | 0B | 08 | 0E | 02 | 1A | 04 | 05 | 1E | 13 | ** | ** | ** |
| B: | 0A | 09 | 0F | 03 | 1B | 05 | 04 | 1F | 12 | ** | ** | ** |
| C: | 0D | 0E | 08 | 04 | 1C | 02 | 03 | 18 | 15 | ** | ** | ** |
| D: | 0C | 0F | 09 | 05 | 1D | 03 | 02 | 19 | 14 | ** | ** | ** |
| E: | 0F | 0C | 0A | 06 | 1E | 00 | 01 | 1A | 17 | ** | ** | ** |
| F: | 0E | 0D | 0B | 07 | 1F | 01 | 00 | 1B | 16 | ** | ** | ** |
| 10: | 11 | 12 | 14 | 18 | 00 | 1E | 1F | 04 | 09 | ** | ** | ** |
| 11: | 10 | 13 | 15 | 19 | 01 | 1F | 1E | 05 | 08 | ** | ** | ** |
| 12: | 13 | 10 | 16 | 1A | 02 | 1C | 1D | 06 | 0B | ** | ** | ** |
| 13: | 12 | 11 | 17 | 1B | 03 | 1D | 1C | 07 | 0A | ** | ** | ** |
| 14: | 15 | 16 | 10 | 1C | 04 | 1A | 1B | 00 | 0D | ** | ** | ** |
| 15: | 14 | 17 | 11 | 1D | 05 | 1B | 1A | 01 | 0C | ** | ** | ** |
| 16: | 17 | 14 | 12 | 1E | 06 | 18 | 19 | 02 | 0F | ** | ** | ** |
| 17: | 16 | 15 | 13 | 1F | 07 | 19 | 18 | 03 | 0E | ** | ** | ** |
| 18: | 19 | 1A | 1C | 10 | 08 | 16 | 17 | 0C | 01 | ** | ** | ** |
| 19: | 18 | 1B | 1D | 11 | 09 | 17 | 16 | 0D | 00 | ** | ** | ** |
| 1A: | 1B | 18 | 1E | 12 | 0A | 14 | 15 | 0E | 03 | ** | ** | ** |
| 1B: | 1A | 19 | 1F | 13 | 0B | 15 | 14 | 0F | 02 | ** | ** | ** |
| 1C: | 1D | 1E | 18 | 14 | 0C | 12 | 13 | 08 | 05 | ** | ** | ** |
| 1D: | 1C | 1F | 19 | 15 | 0D | 13 | 12 | 09 | 04 | ** | ** | ** |
| 1E: | 1F | 1C | 1A | 16 | 0E | 10 | 11 | 0A | 07 | ** | ** | ** |
| 1F: | 1E | 1D | 1B | 17 | 0F | 11 | 10 | 0B | 06 | ** | ** | ** |

To illustrate the interpretation of the links via numbers, the outlined switch "5:" indicates on its port #2 a connection to switch 7 (the encircled number 07 in the row 5:). In the row 7:, labeled as switch "7:", there is an encircled number 05 at its port #2 (column #2), which refers back to this same connection between the switch 5 and the switch 7 via port #2 on each switch. The same pattern can be observed between any pair of connected switches and ports.

EXAMPLE 2

Small Network with P=1536 (1.5K) Ports at $\phi=1$, Using Switches with Radix R=24

The LH solutions database search finds an exact match for d=8, n=256 switches of radix 12=24 and m=18 topological ports/switch. Diameter (max hops) of the network is D=3 hops, and average latency is Avg=2.2851562 hops. The bisection is b=6, providing thus E=6 free ports per switch at $\phi=1$. The total number of ports provided is $E \cdot n=6 \cdot 256=1536$ as required. The set of 18 generators is: $S_{18}=\{01, 02, 04, 08, 10, 20, 40, 80, 1A, 2D, 47, 78, 7E, 8E, 9D, B2, D1, F13\}_{hex}$. Note that the first 8 links are regular 8-cube links (power of 2), while the remaining 10 are LH augmentation links. These generators specify the target switches (as index 00 ... $FF_{hex}$) connected to switch 00 via ports #1, #2, ... #18 (switches on both ends of a link use the same port number for mutual connections). To compute the 18 links (to 18 target switches) for some other switch x≠00, one would simply XOR number x with the 18 generators. Table 4.16 shows the connection table only for the first 16 switches of the resulting network, illustrating this computation of the links. For example, switch 1 (row '1:') has on its port #4 target switch 09, which is computed as 1^8=9, where 8 was the generator in row '0:' for port #4. Checking then switch 9 (in row '9:'), on its port #4 is switch 01 (since 9^8=1), i.e. switches 1 and 9 are connected via port #4 on each. The table also shows that each switch has 6 ports #19, #20, ... #24 free.

TABLE 4.16

| Sw | #1 | #2 | #3 | #4 | #5 | #6 | #7 | #8 | #9 | #10 | #11 | #12 | #13 | #14 | #15 |
|---|---|---|---|---|---|---|---|---|---|---|---|---|---|---|---|
| 0: | 01 | 02 | 04 | 08 | 10 | 20 | 40 | 80 | 1A | 2D | 47 | 78 | 7E | 8E | 9D |
| 1: | 00 | 03 | 05 | 09 | 11 | 21 | 41 | 81 | 1B | 2C | 46 | 79 | 7F | 8F | 9C |
| 2: | 03 | 00 | 06 | 0A | 12 | 22 | 42 | 82 | 18 | 2F | 45 | 7A | 7C | 8C | 9F |
| 3: | 02 | 01 | 07 | 0B | 13 | 23 | 43 | 83 | 19 | 2E | 44 | 7B | 7D | 8D | 9E |
| 4: | 05 | 06 | 00 | 0C | 14 | 24 | 44 | 84 | 1E | 29 | 43 | 7C | 7A | 8A | 99 |
| 5: | 04 | 07 | 01 | 0D | 15 | 25 | 45 | 85 | 1F | 28 | 42 | 7D | 7B | 8B | 98 |
| 6: | 07 | 04 | 02 | 0E | 16 | 26 | 46 | 86 | 1C | 2B | 41 | 7E | 78 | 88 | 9B |
| 7: | 06 | 05 | 03 | 0F | 17 | 27 | 47 | 87 | 1D | 2A | 40 | 7F | 79 | 89 | 9A |
| 8: | 09 | 0A | 0C | 00 | 18 | 28 | 48 | 88 | 12 | 25 | 4F | 70 | 76 | 86 | 95 |
| 9: | 08 | 0B | 0D | 01 | 19 | 29 | 49 | 89 | 13 | 24 | 4E | 71 | 77 | 87 | 94 |
| A: | 0B | 08 | 0E | 02 | 1A | 2A | 4A | 8A | 10 | 27 | 4D | 72 | 74 | 84 | 97 |
| B: | 0A | 09 | 0F | 03 | 1B | 2B | 4B | 8B | 11 | 26 | 4C | 73 | 75 | 85 | 96 |
| C: | 0D | 0E | 08 | 04 | 1C | 2C | 4C | 8C | 16 | 21 | 4B | 74 | 72 | 82 | 91 |
| D: | 0C | 0F | 09 | 05 | 1D | 2D | 4D | 8D | 17 | 20 | 4A | 75 | 73 | 83 | 90 |
| E: | 0F | 0C | 0A | 06 | 1E | 2E | 4E | 8E | 14 | 23 | 49 | 76 | 70 | 80 | 93 |
| F: | 0E | 0D | 0B | 07 | 1F | 2F | 4F | 8F | 15 | 22 | 48 | 77 | 71 | 81 | 92 |
| 10: | ... | | | | | | | | | | | | | | |

| Sw | #16 | #17 | #18 | #19 | #20 | #21 | #22 | #23 | #24 |
|---|---|---|---|---|---|---|---|---|---|
| 0: | B2 | D1 | FB | ** | ** | ** | ** | ** | ** |
| 1: | B3 | D0 | FA | ** | ** | ** | ** | ** | ** |
| 2: | B0 | D3 | F9 | ** | ** | ** | ** | ** | ** |
| 3: | B1 | D2 | F8 | ** | ** | ** | ** | ** | ** |
| 4: | B6 | D5 | FF | ** | ** | ** | ** | ** | ** |
| 5: | B7 | D4 | FE | ** | ** | ** | ** | ** | ** |
| 6: | B4 | D7 | FD | ** | ** | ** | ** | ** | ** |
| 7: | B5 | D6 | FC | ** | ** | ** | ** | ** | ** |
| 8: | BA | D9 | F3 | ** | ** | ** | ** | ** | ** |
| 9: | BB | D8 | F2 | ** | ** | ** | ** | ** | ** |
| A: | B8 | DB | F1 | ** | ** | ** | ** | ** | ** |
| B: | B9 | DA | F0 | ** | ** | ** | ** | ** | ** |
| C: | BE | DD | F7 | ** | ** | ** | ** | ** | ** |
| D: | BF | DC | F6 | ** | ** | ** | ** | ** | ** |
| E: | BC | DF | F5 | ** | ** | ** | ** | ** | ** |
| F: | BD | DE | F4 | ** | ** | ** | ** | ** | ** |
| 10: | | | | | | | | | |

EXAMPLE 3

Large Network with P=655,360 (640K) Ports at $\phi=1$, Using Switches with Radix R=48

The database lookup finds the exact match using d=16, n=$2^{16}$=65,536=64K switches of radix R=48. Each switch uses m=38 ports for connections with other switches leaving E=48−38=10 ports/switch free, yielding total of P=E·n=10·64K=640K available ports as required. Bisection is b=10 resulting in $\phi$=E/b=1. The list of m=38 generators $S_{38}=\{h_1, h_2, \ldots h_{38}\}$ is shown in Table 4.17 in hex and binary base. The 38 links for some switch x (where x: 0 ... FFFF) are computed as $S_{38}(x) \equiv \{x\char`^h_1, x\char`^h_2, \ldots x\char`^h_{38}\}$. Diameter (max hops) of the network is D=5 hops, and the average latency is Avg=4.061691 hops.

TABLE 4.17

| | | |
|---|---|---|
| 1. | 1 | ................1 |
| 2. | 2 | ...............1. |
| 3. | 4 | ..............1.. |
| 4. | 8 | .............1... |
| 5. | 10 | ............1.... |
| 6. | 20 | ...........1..... |
| 7. | 40 | ..........1...... |
| 8. | 80 | .........1....... |
| 9. | 100 | ........1........ |
| 10. | 200 | .......1......... |
| 11. | 400 | ......1.......... |
| 12. | 800 | .....1........... |
| 13. | 1000 | ....1............ |
| 14. | 2000 | ...1............. |
| 15. | 4000 | ..1.............. |
| 16. | 8000 | .1............... |
| 17. | 6F2 | ......11.1111..1. |
| 18. | 1BD0 | ...11.1111.1.... |
| 19. | 1F3D | ...11111..1111.1 |
| 20. | 3D72 | ..1111.1.111..1. |
| 21. | 6B64 | .11.1.11.11..1.. |
| 22. | 775C | .111.111.1.111.. |
| 23. | 893A | 1...1..1..111.1. |
| 24. | 8B81 | 1...1.111.......1 |
| 25. | 9914 | 1..11..1..1.1.. |
| 26. | A4C2 | 1.1..1..11....1. |
| 27. | A750 | 1.1..111.1.1.... |
| 28. | B70E | 1.11.111....111. |
| 29. | BFF1 | 1.1111111111...1 |
| 30. | C57D | 11...1.1.11111.1 |
| 31. | D0A6 | 11.1....1.1..11. |
| 32. | D1CA | 11.1...111..1.1. |
| 33. | E6B5 | 111..11.1.11.1.1 |
| 34. | EAB9 | 111.1.1.1.111..1 |
| 35. | F2E8 | 1111..1.111.1... |
| 36. | F313 | 1111..11...1.11 |
| 37. | F9BF | 11111..11.111111 |
| 38. | FC31 | 111111....11...1 |

LH Performance Comparisons

The LH solutions database was used to compare LH networks against several leading alternatives from industry and research across broader spectrum of parameters. The resulting spreadsheet charts are shown in FIGS. 11-15. The metrics used for evaluation were Ports/Switch yield (ratio P/n, higher is better) and the cables consumption as Cables/Port (ratio: # of topological cables/P, lower is better). In order to maximize the fairness of the comparisons, the alternative networks were set up to generate some number of ports P using switches of radix R, which are optimal parameters values for a given alternative network (each network type has its own "natural" parameter values at which it produces the most efficient networks). Only then the LH network was constructed to match the given number of external ports P using switches of radix R (as a rule, these are not the optimal or "natural" parameters for LH networks).

In FIGS. 11-15, the Ports/Switch chart for each alternative network shows Ports/Switch yields for the LH network - - - and the alternative network . . . , along with the ratio LH/alternative _ with numbers on the right axis (e.g. a ratio 3 means that LH yields 3 times more Ports/Switch than the alternative). The second chart for each alternative network shows the Cables/Port consumption for the LH and the alternative, along with the ratio: alternative/LH on the right axis (e.g. a ratio 3 means that LH consumes 3 times fewer cables per port produced than the alternative). All networks are non-oversubscribed i.e. $\phi=1$.

Figure 11:
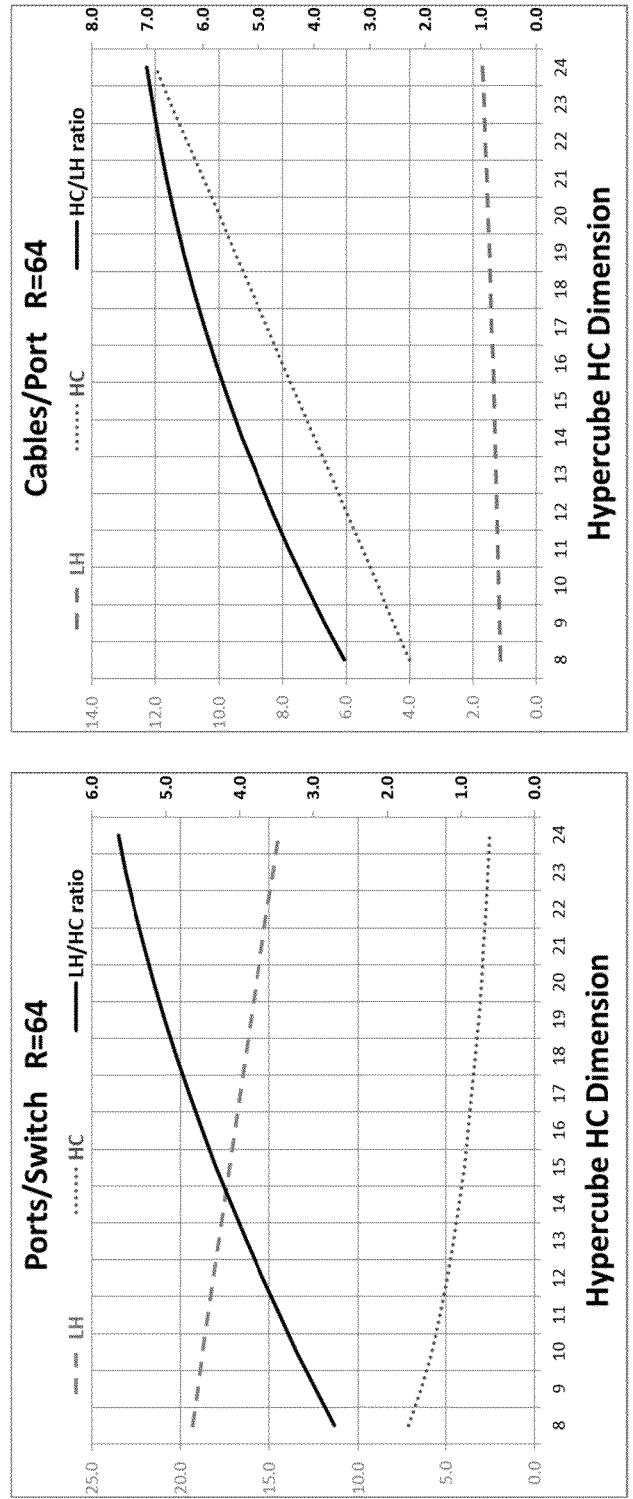
FIGS. 11-15 are charts comparing long hop networks with alternative network configurations.
Figure 12:
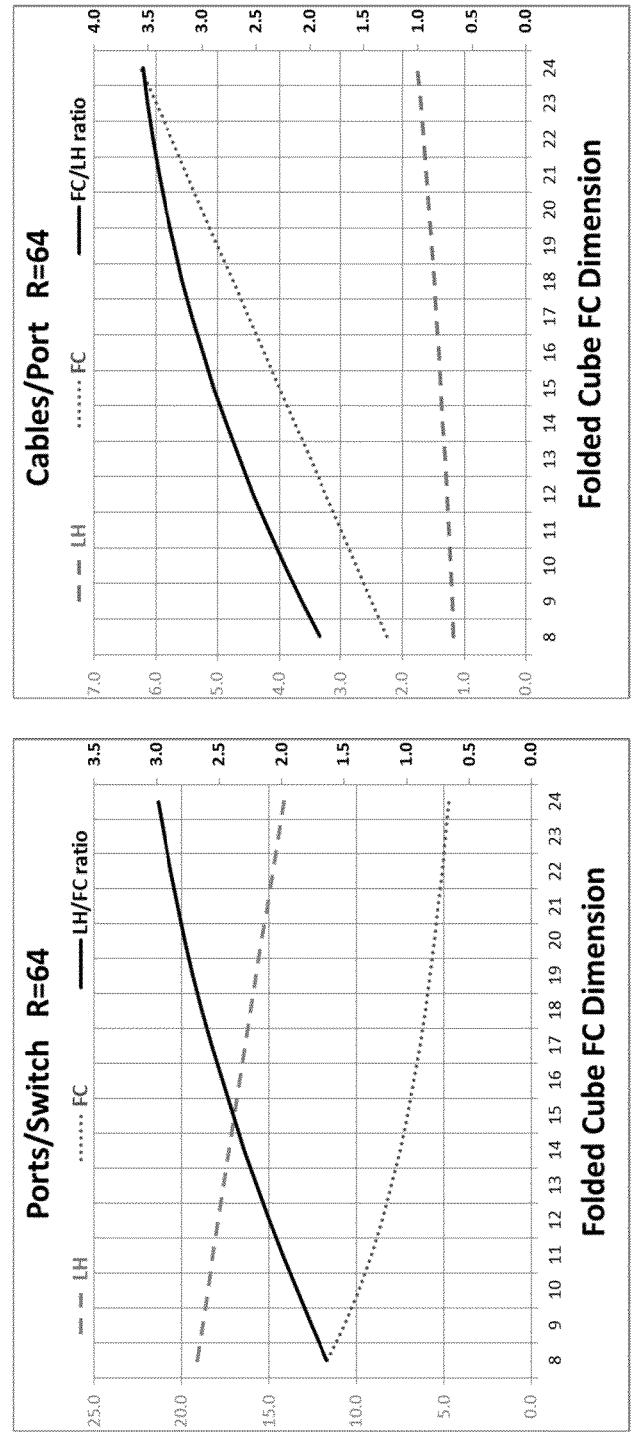
Figure 13:
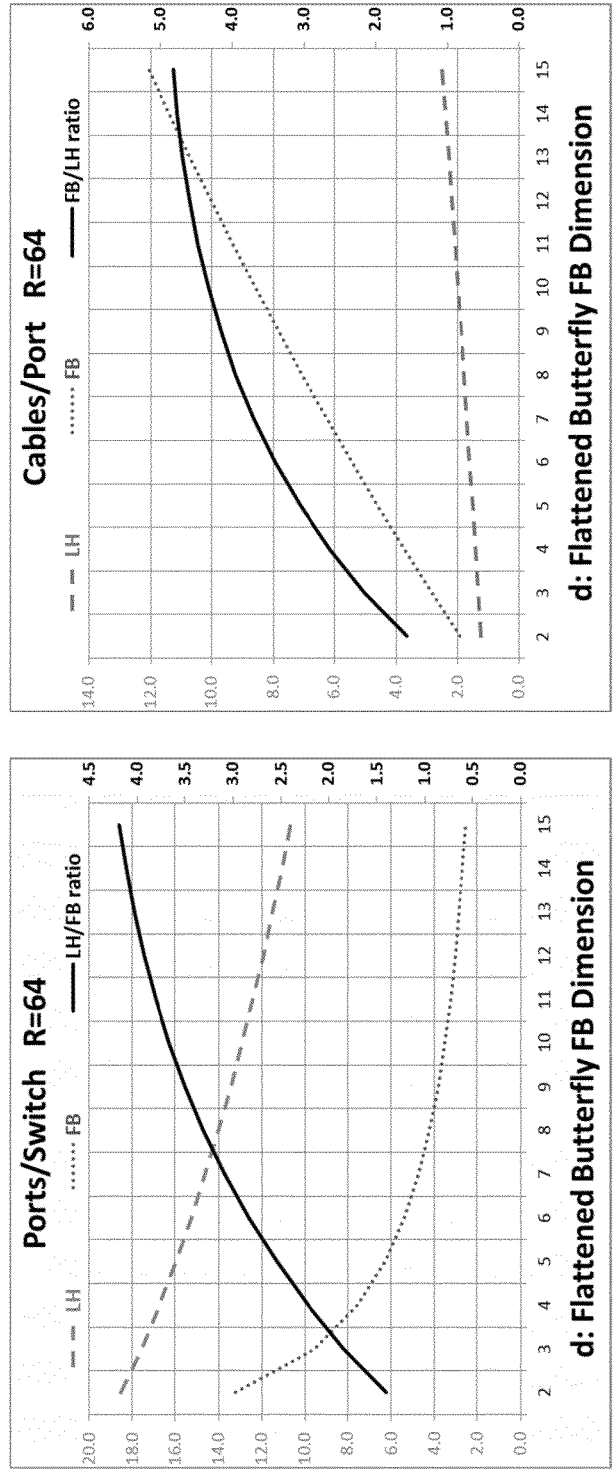
Figure 14:
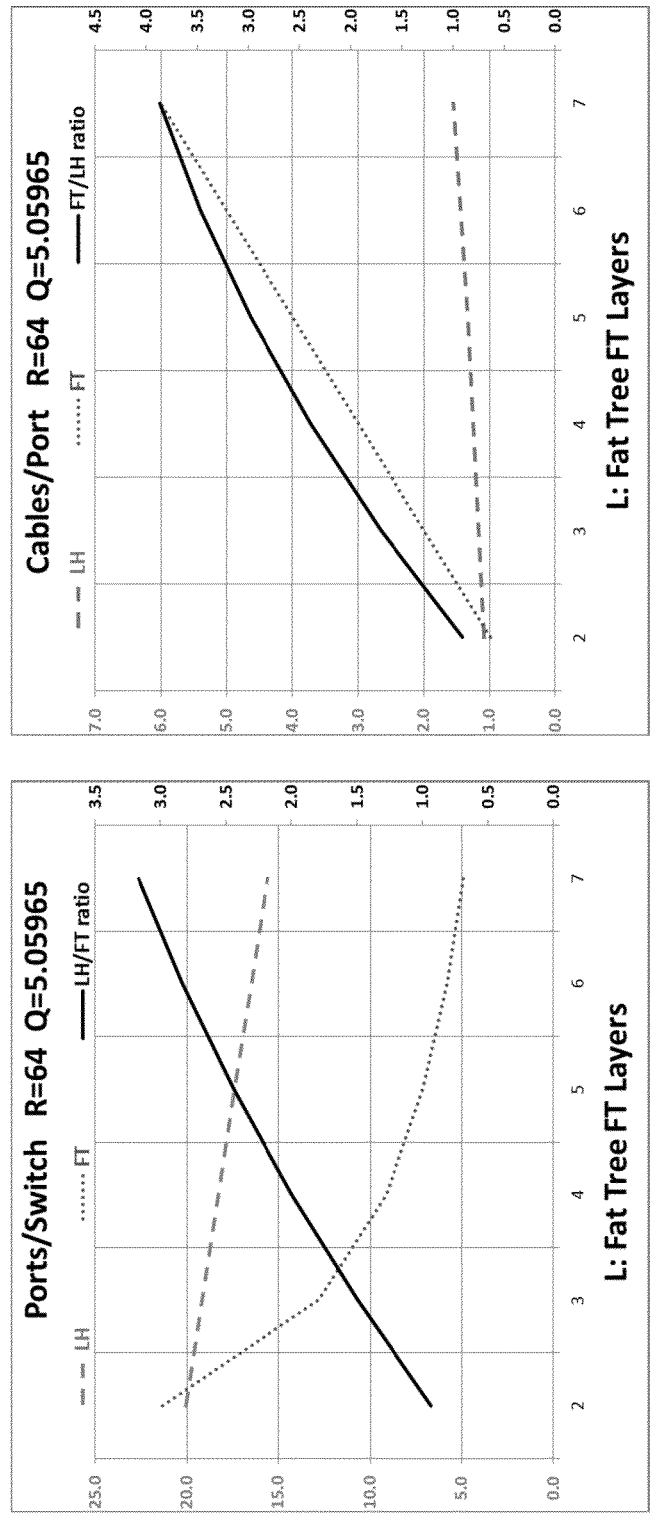

For example, the Ports/Switch chart in FIG. 11 shows yield for hypercube (HC), for network sizes from $n=2^8$ to $2^{24}$ switches of radix R=64. The Ports/Switch for LH network yielding the same total number of ports P is shown, along with the ratio LH/HC, which shows (on the right axis scale) that LH produces 2.6 to 5.8 times greater Ports/Switch yield than hypercube, hence it uses 2.6-5.8 times fewer switches than HC to produce the same number of ports P as HC at the same throughput. The second chart in FIG. 11 shows similarly the Cables/Port consumption for HC and LH, and the ratio HC/LH of the two (right axis scale), showing that LH consumes 3.5 to 7 times fewer cables to produce the same number of ports P as HC at the same throughput. The remaining charts in FIGS. 12-14 show the same type of comparisons for the other four alternatives.

Performance Measurement

It is desirable to maximize $\lambda$ since $\lambda$ quantifies the external port yield of each switch. Namely if each switch's port count (radix) is R, then R=E+T (where E is the number of external ports and T number of topological ports) and the E-port yield per IPA port is: Yield≡E/R=$\lambda/(\lambda+1)$, i.e. increasing $\lambda$ increases the Yield. But increasing $\lambda$ for a given N also lowers the bisection for that N, hence in practical applications, data center administrators need to select a balance of Yield vs. bisection and N suitable for the usage patterns in the data center. The centralized control and management software provides modeling tools for such evaluations.

Denoting the number of external ports and topology ports per switch as E and T, the radix (number of ports) R of a switch is R=E+T. The topology ports in turn consist of the d ports needed to connect a d-dimensional hypercube $HC^d$ and of h long hop ports used for trunking, so T=d+h. If the number of switches is N, the $N=2^d$ or d=log(N), where log(x) is the logarithm base 2 of x i.e. log(x)=ln(x)/ln(2)≈1.443·ln(x). In order to relate formally the invention's long hops to terminology used with conventional trunking (where each of the d $HC^d$ cables is replaced with q cables, a trunk quantum), define q≡T/d, i.e. T=q·d. Hence q and h are related as: q=1+h/d and h=d·(q−1). Using the ratio: $\lambda$≡E/T, E and T is expressed as T=R/(1+$\lambda$) and E=$\lambda$·R/(1+$\lambda$). Restating the bisection formula:

$$B \equiv B(N) = (N/2) \cdot q \cdot C = N/2(1+h/d) \cdot C \quad (5)$$

Where C is a single IPA switch port capacity (2·<Port Bit Rate> for duplex ports). Bisection B is the smallest total capacity of links connecting two halves of the network (i.e. it's the minimum for all possible network cuts into halves). Consider two network halves with N/2 switches each and E external ports per switch, there are E·N/2 external ports in each half. If these two sets of eternal ports were to transmit to each other at full port capacity C, the total capacity needed to support it is E·(N/2)·C. Since bisection limits the worst case capacity between halves to B, the oversubscription $\phi$ is defined as the ratio between the capacity needed E·(N/2)·C and the capacity for the job available via B:

$$\phi = E \cdot (N/2) \cdot C/B = E/q = \lambda \cdot d = \lambda \cdot \log(N) \quad (6)$$

Eq. (6) shows in what ratio $\lambda$≡E/T ports must be divided in order to obtain oversubscription $\phi$ using N switches: $\lambda = \phi/\log(N)$. The quantity most often of interest is the total number of external ports provided by the network, P=N·E, which in terms of other quantities typically given as constraints $\phi$, N and radix R), and recalling that E=$\lambda$·R/(1+$\lambda$), is then:

$$P = \frac{\phi \cdot R \cdot N}{\phi + \log(N)} \quad (7)$$

Although Eq. (7) doesn't yield a closed form expression for N, it does allow computation of the number of IPA switches N needed to get some target number of total network ports P at IB-oversubscription $\phi$, knowing the radix R of the switches being used. Qualitatively, the number of total network ports P increases slightly slower than linearly in N (when $\phi$ is kept fixed) due to the denominator D≡($\phi$+log(N)) which also increases with N. Its effects diminish as N increases (or if $\phi$ is large or grows with N), since doubling of N increments D by +1 (which is only by ~5% for N=64K and $\phi=\phi$. Within the log(log(P)) error margin, the N above grows as N~P·log(P), which is an unavoidable mathematical limit on performance of larger switches combined from N smaller switches at fixed $\phi$.

FIG. 16 (computed for the commercially available Pronto 3780 switch) shows the resulting network capacity based on a simple un-optimized configuration (for the lowest commonly used fixed IB-oversubscription $\phi=4$, other values of interest $\phi=1, 2, 5, 10, 15$ and 20 are shown later). The slight log(N) nonlinearity when using fixed $\phi$ can be seen in the price per port—while N increased by a factor 128K, the price per 10G port increased only 3.4 times (i.e. the cost per 10G port grew over 38,000 times slower than the network size and capacity, which is why the slight non-linearity can be ignored in practice). If instead of using fixed $\phi$ the fixed $\lambda$(E/P ratio) is used, then via Eq. (3): $\phi \equiv \phi(N,\lambda) = \lambda \cdot \log(N)$, the port Eq. (6) becomes linear in N:

$$P = \frac{\lambda \cdot R \cdot N}{1+\lambda}$$

i.e. we get a fixed cost and power per port as N grows. In this case the tradeoff is that it is $\phi$ which now grows as $\lambda$·log(N) as N grows. Recalling that typical aggregate oversubscriptions on core switches and routers are ~200+ in the current data centers, log(N) is quite moderate in comparison. The network bandwidth properties for $\lambda=1$ are shown in FIG. 17 where the cost per 10G port remains fixed at $500 (or $104 per 1G port) and power at 14.6 W. Results for some values of $\lambda \neq 1$ are shown later.

Elimination of CAM Tables

By using mathematically convenient topologies such as an enhanced hypercube connection pattern or its hierarchical variants, the switch forwarding port can be computed on the fly via simple hardware performing a few bitwise logical operations on the destination address field, without any expensive and slow forwarding Content Addressable Memory (CAM) tables being required. Hence, for customized switches, price and power use advantages can be gained by removing CAM hardware entirely.

Exception and Fault Handling Using CAM

Although the most favorable embodiments of the invention can eliminate CAMs completely, a much smaller (by at least 3 orders of magnitude smaller) CAM hardware can still be useful to maintain forwarding exceptions arising from faults or congestion. Since the enhanced hypercubic topology allows for forwarding via simple, small logic circuits (in the ideal, exception free case), the only complication arises when some port P is faulty due to a fault at the port or failure/congestion at the nearest neighbor switch connected to it. Since number of such exceptions is limited by the radix R of the switch, the necessary exception table needs a space for at most R small entries (typical R=24 . . . 128, entry size 5-7 bits). A match of a computed output port with an entry in the reduced CAM overrides the routine forwarding decision based on the Jump Vector computed by the logic circuit. Such a tiny table can be implemented in the substantially reduced residual CAMs, or even within the address decoding logic used in forwarding port computation. This exception table can also be used to override the routine forwarding decisions for local and global traffic management and load balancing.

Improved Trunking and Link Aggregation

In order to increase the pipe capacity along overloaded paths, while under the tree topology constraints, the conventional data center solution is trunking (or link aggregation in the IEEE 802.1AX standard, or Cisco's commercial EtherChannel product), which amounts to cloning the link between two switches, resulting in multiple parallel links between the two switches using additional pairs of ports. The invention shows a better version of trunking for increasing the bisection with a fixed number of switches.

With the invention, this problem arises when number of switches in a network is fixed for some reason so bisection cannot be increased by increasing N. Generally, this restriction arises when the building block switches are a smaller number of high radix switches (such as the Arista 7500) rather than the larger number of low radix switches that allow the desirable high bisection bandwidth as provided by the invention. Data centers making use of the invention can use conventional trunking by building hypercubes using multiple parallel cables per hypercube dimension. While that will increase the bisection as it does for regular tree based data center networks, there are better approaches that can be used.

The procedure is basically the opposite of the approach used for traditional trunking. By adding a link from some switch A, instead of picking the target switch B from those closest to A, B is picked such that it is the farthest switch from A. Since the invention's topologies maintain uniform bisection across the network, any target switch will be equally good from the bisection perspective, which is not true for conventional trees or fat trees. By taking advantage of this uniformity, picking the farthest switch B also maximally reduces the longest and the average hop counts across the network. For example, with a hypercube topology, the farthest switch from any switch A is the switch B which is on the long diagonal from A. Adding that one link to A cuts its longest path by half, and reduce the average path by at least 1 hop. When the long hops are added uniformly to all switches (hence N/2 wires are added per new long hop), the resulting topology is called enhanced hypercube. FIG. 18 shows the reductions in the maximum and average hops due to adding from 1 to 20 long hops. In FIG. 18, LH shows hex bitmasks of the long hop, i.e. the index of the farthest switch chosen.

The table was obtained by a simple 'brute force' counting and updates of distance tables as the new long hops were added. At each stage, the farthest node from the origin is used as a new link (a variety of tiebreaking rules were explored to provide a pick when multiple 'farthest' nodes are equally far, which is the common occurrence). After each link is added the distance table is updated. For Dim=4, N=16, adding long hops beyond 11 doesn't have an effect since the small network becomes fully meshed (when total number of links is N−1), hence all distances become 1 hop.

Optimizing Wiring Using Port Dimension Mapping

In some embodiments of the invention, systems being implemented via a set of switches in a data center, (e.g. available as line cards in a rack), wiring such dense networks can easily become very complex, error prone and inefficient. With $(d!)^N$ topologically equally correct mappings between ports and dimensions for a d-dimensional hypercube using $N=2^d$ switches, d ports per switch, there are lots of ways to create an unmanageable, error prone, wasteful tangle. The invention optimizes the mapping between the ports and HC/FB dimensions using the following rules:
 (i) The same dimensions are mapped to the same ports on all switches
 (ii) Consecutive dimensions (0, 1, . . . d−1) are mapped onto consecutive ports (a, a+1, . . . a+d−1)

Figure 19:
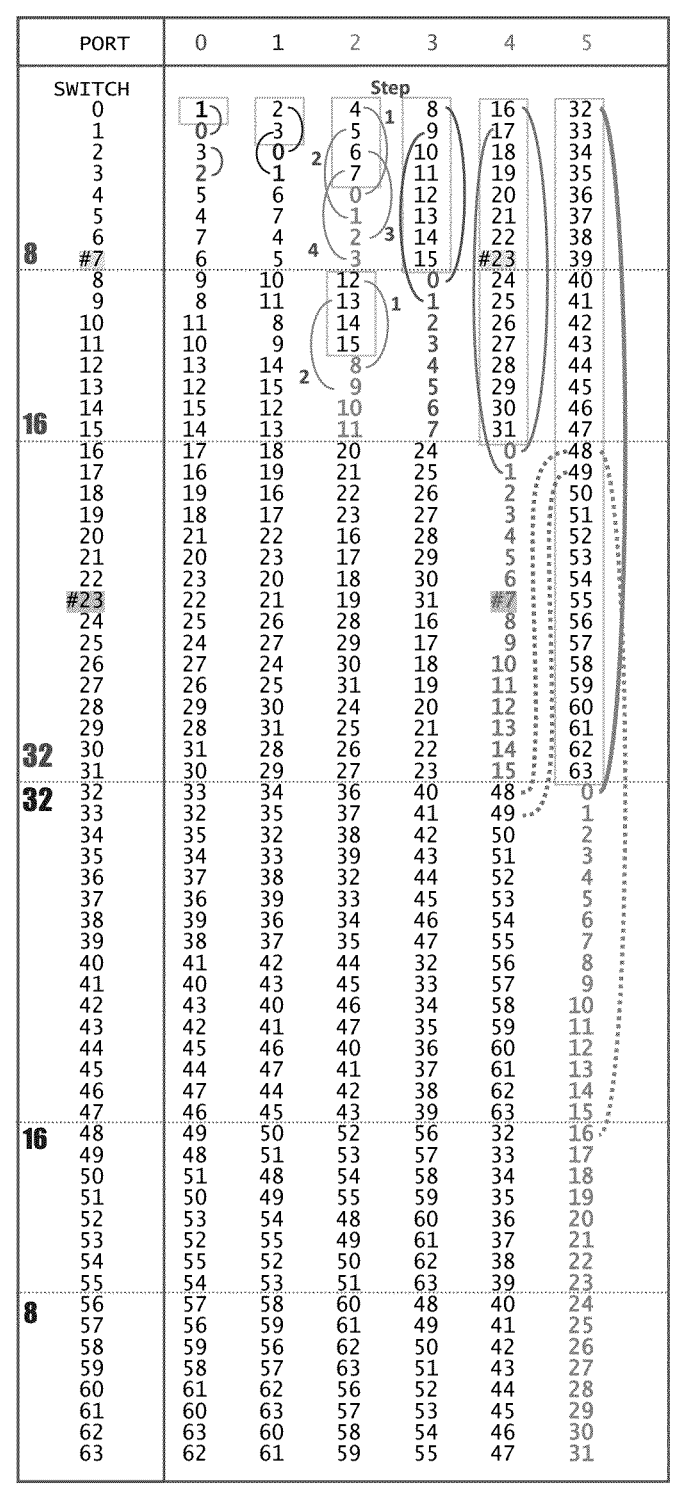

The resulting wiring pattern shown in FIG. 19 has the following advantages over a general topologically correct mapping:
 a) All cables belonging to the same dimension have the same length
 b) All cables have the same port number on both ends (cables strictly vertical)
 c) All cables in the same vertical column (dimension) have the same lengths Provided the cables and corresponding port connectors in the same column are color coded using matching colors (properties (b) and (c) makes such coding possible), and the cables are of the minimum length necessary in each vertical column, this port-dimension mapping makes the wiring of a rack of switches easy to learn, easy to connect and virtually error proof (any errors can be spotted at a glance). The total length of cables is also the minimum possible (requiring no slack) and it has the fewest number of distinct cable lengths allowed by the topology. In addition to economizing the quantity and complexity of the wiring, the shortening and uniformity of cables reduces the power needed to drive the signals between the ports, a factor identified as having commercial relevance in industry research.

Details of Connecting $64=2^6$ Switches→6-D Hypercube

In FIG. 19, the column headers show 6 color coded port numbers 0=red, 1=blue, 2=orange, 3=purple, 4=green and 5=cyan. The 64 switches are line cards mounted in a rack one below the other and they are depicted as 64 separate rows 0, 1, 2, . . . 63. The 6 ports/switch used for wiring these switches into a 6-D hypercube, line up into 6 columns (the wire colors match the port colors in each column).

The 6 numbers inside some row #k show the 6 switches connected to the 6 ports of the switch #k. E.g. row #7 shows that switch #7 is connected to switches #6, 5, 3, 15, 23, 39 on its ports 0, 1, 2, . . . 5. Picking now say, port (column) #4 for switch (row) #7, it connects on port 4 to switch #23. Looking down to switch (row) #23, its port (column) #4 it connects back to switch #7 i.e. switch 7 and switch 23 are connected to each other's port #4. This simple rule—two switches always connect on the same port # with each other holds generally for hypercubes. This leads to the proposed port and cable color coding scheme. E.g. green: 4 cables connect green ports #4 on some pair of switches, red: 0 cables connect red ports #0 on some other pair of switches, blue:1 cables connect blue ports #1, etc.

The wiring pattern is as simple. All wires of the same color have the same length $L=2^{port\#}$, e.g. orange: 2 wire (connecting always ports #2, orange:2 ports) has length $2^2=4$, green:4 $2^4=16$, red: $02^0=1$, etc. Hence switch pairs connected on their port #2 with each other are 4 rows apart, e.g. switch (row) 0 connects on its port #2 to switch 4 on its port #2 and they use orange:2 wire (the color of port #2). This connection is shown as the top orange: 2 arc connecting numbers 4 and 0. The next orange:2 (port #2) wire start at the next unconnected row, which is row #1 (switch #1), and connects to row 1+4=5 (switch #5), and so on until the first row already connected on port #2 is reached, which is row #4 (Step 1-φ. At that point 8 top rows on port #2 are connected. Then proceed down to the next row with free port #2, which is row 8. That port #2 is now connected with the port #2 down 4 rows, i.e. with row 8+4=12, which is shown with orange: 2 wire linking numbers 12 and 8. Now the next two rows (orange: 2 arc connecting numbers 13 and 9), etc, until column (port) #2 is connected on all switches. Then follows purple: 3 port #3, using purple: 3 wires $2^3=8$ slots long, and repeat the same procedure, except with longer wires . . . etc.

Containers for Prewired Internal Topology

While the above wiring of a 64-switch hypercube $H_6=H$ (64) is not difficult since errors are unlikely because starting at the top row and going down, any new wire can go into just one port of the matching color, the pattern above suggests a simple way to design easily connectable internally prewired containers, which eliminate much of the tedium and expense of this kind of dense manual wiring.

Consider the above H(64) as being composed of two prewired H(32) boxes A and B (separated by the dotted horizontal line at 32/32). The first 5 dimensions, ports 0, 1, . . . 4, of each H(32) are already fully wired and the only missing connections are the 32 wires connecting ports #5 on the 32 switches from one to the other container, in perfectly orderly manner (row 0 of container A to row 0 of container B, row 1 from A to row 1 from B, . . . etc). Hence, instead of wiring 32×6=192 wires for H(64), two prewired containers and 32 wires now connect between them in a simple 1, 2, 3 . . . order. The job is made even easier with a bundled, thick cable with these 32 lines and a larger connector on each box, requiring thus only one cable to be connected.

Looking further at the wiring relation between port #4 and port #5, it is obvious that these thick cables (each carrying e.g. 64 or 128 Cat 5 cables) follow the exact pattern as ports #1 and #2, except with cable bundles and big connectors instead of single Cat 5 cables and individual ports. Hence, if one had a row of internally prewired (e.g. via ASIC) 128-switch containers (e.g. one rack 64RU tall, 2 line cards per slot), each container having 8 color coded big connectors lined up vertically on its back panel, matching color thick cables may be used that repeat the above exact wiring pattern between these $2^8=256$ containers (except it goes horizontally) to create a network with $2^7+8=32K$ IPA switches (for only $393 million), providing 786,432×10Gports (1 port per 10G virtual server with 32 virtual machines (VMs), totaling 25,165,824 VMs; i.e. switching cost <$16/VM). For large setups a single frame may be used where any newly added container can just be snapped into the frame (without any cables), that has built in frame-based connectors (with all the inter-container thick cabling prewired inside the frame base).

The ultimate streamlining of the wiring (and of a lot more) is achieved by using "merchant silicon", where all such dense wiring, along with the connectors and their supporting hardware on the switch is replaced with ASICs tying together the bare switching fabric chips. This approach not only eliminates the wiring problem, but also massively reduces the hardware costs and power consumption.

For ASIC wiring of the FIG. 19 pattern, in order to reduce the number of circuit layers the connection order must be reversed, changing all wire intersects into nestings, allowing for single layer wiring. The resulting hypercube is just another one among the alternate labelings.

Non-Power-of-2 Networks

The above manual wiring scheme can also be used to build a network that has a number of switches N which is not a power of 2 (thus it cannot form a conventional hypercube). Consider the case of a network where that has 32 switches (d=5, using ports #0 . . . #4, rows 0 . . . 31) and now wish to add two more switches, (rows) #32 and #33. This starts the $6^{th}$ dimension (port #5, long cyan wires), but only having two of the 32 cyan lines connected on port #6 (the two are connecting port #6 in rows 0↔32 and 1↔33 for the 2 new switches #32 and #33). The first 5 ports #0-#4 of the two new switches have no switches to go to, since these haven't been filled in (these will come later in the rows 34-63).

The problem with such partial wiring is that it severely restricts forwarding to and from the new switches (just 1 link instead of 6 links), along with reduced bandwidth and fragility (due to single points of failure. This problem can be eliminated by using port (column) #4 of the new first new switch (row) #32. The port #32:4 normally connects (via green wire going down to row #48) to switch: port #48:4, but the switch #48 isn't there yet. Switch #48 also connects on port #5 (via dotted cyan wire) back to the existent switch #16:5. Thus, there are two broken links #32:4↔#48:4 and #48:5↔#16:5, with missing switch #48 in the middle. Therefore, the two ends of existing switches can be connected directly to each other, i.e. #32:4↔#16:5 as shown by the top dotted green wire (which happens to be just the right length, too). Later, when switch #48 is finally added, the shortcut (green dotted wire going up) moves down to #48:4 while the #16:5, which becomes free as well (after moving the green wire down), now connects to #48:5 (dotted cyan wire). The same maneuver applies to switch #33 as shown with the $2^{nd}$ green dotted wire. The analogous shortcuts follows for lower ports of #32 and #33 e.g. the broken pairs #32:3↔#40:3 and #40:5↔#8:5 are short-circuited via #32:3↔#8:5 etc, resulting in full (with natural forwarding) 6-D connectivity for the new switches and their neighbors. The general technique is to first construct correct links for the target topology (e.g. hypercube), which include the non-existent nodes. Then one extends all shortest paths containing the non-existent nodes until they reach existent nodes on both ends. The existent nodes terminating such "virtual" shortest paths (made of non-existent nodes on the inner links) are connected directly, using the available ports (reserved on existent nodes for connections with as yet non-existent ones).

Programmable Connector Panel

Another approach according to embodiments of the invention for interconnecting switches can include building large, software controlled super-connectors ("C-Switches"), where making any desired connections between the physical connectors can be controlled by software.

Unlike a standard switch, which forwards packets dynamically based on the destination address in the packet frame header, a C-Switch forwards packets statically, where the settings for the network of crossbar connections within the C-Switch can be provided by an external program at initialization time. Without any need for high speed dynamic forwarding and buffering of data packets, the amount of hardware or power used by a C-Switch is several orders of magnitude smaller than a standard switch with the same number of ports.

The individual connectors (or per-switch bundles of for example 48 individual circuit cables brought in via trunked thick cables, plugged into a large single connector), plug into the C-Switch's panel (which can cover 3-5 sides of the C-Switch container), which can include a matrix containing hundreds or thousands of receptacles. Beyond the simple external physical connection, everything else can be done via software controls. Any desired topology can be selected via an operator using software to select from a library of topologies or topology modules or topology elements.

To facilitate physical placement and heat management, C-Switches can be modular, meaning that a single C-Switch module can combine several hundred to several thousand connectors, and the modules can be connected via single or few cables (or fiber links), depending on the internal switching mechanism used by the C-Switch. In such a modular implementation, the inter-module cabling can be done via the cabling built into the frame where the connections can be established indirectly, by snapping a new module into the frame.

There is a great variety of possible ways to implement core functionality of a C-Switch, ranging from telephony style crossbar switches, to arrays of stripped down, primitive hub or bridge elements, to nanotech optical switches and ASIC/FPGA techniques. Since the internal distances within a C-Switch are several orders of magnitude smaller than standard Ethernet connections, it is useful (for the heat & power reduction) that the incoming signal power be downscaled by a similar factor before entering the crossbar logic (the signals can be amplified back to the required levels on the output from the crossbar logic). In other embodiments, for example using MEMS based devices, power reduction may not be necessary where optical signals are switched via piezo-electrically controlled nano-mirrors or other purely optical/photonic techniques such as DLP normally used for projection screens, where such down/up-scaling is implicit in the transceivers.

The internal topology of the C-Switch can be multi-staged since the complexity of a single, flat crossbar grows as $O(X^2)$ for X external ports. For example, a arrangable non-blocking hypercubic topology requires a hypercube dimension of d, connecting $N=2^d$ smaller crossbars, which is twice the number of external ports p per smaller crossbar, i.e. $d=2p$. Hence each small crossbar of radix 3p has a circuit complexity (number of cross points) of $O(9p^2)$. The number of external ports $X=N \cdot p=2^{2p} \cdot p$ determines value p needed for a given X in implicit form where approximately $p \approx \frac{1}{2} \log(X) + O(\log(\log(X)))$. Hence, the number of small crossbars is $N=2^d \approx X \cdot \log(X)$. With the small crossbar radix $p=72$, the C-Switch hardware scales to $X=2^{24} \approx 16$ million ports.

This kind of software controlled multi-connector has a much wider applicability than data centers, or even than Ethernet LANs, since cabling and connectors are a major problem in many other settings and at much smaller scales of connectivity.

Use of C-Switches for Layer 2 Network Optimization

The traffic patterns in a data center are generally not uniform all-to-all traffic. Instead, smaller clusters of servers and storage elements often work together on a common task (e.g. servers and storage belonging to the same client in a server farm). The integrated control plane of the current invention allows traffic to be monitored, and to identify these types of traffic clusters and reprogram the C-Switch so that the nodes within a cluster become topologically closer within the enhance hypercube of Ethernet switches. By reducing the path lengths of the more frequent traffic patterns or flows by using a C-Switch, the load on the switching network is reduced since fewer switching operations are needed on average from ingress to egress, hence increasing capacity. The C-Switch is used in this new division of labor between the dynamic switching network of the Layer 2 switches and the crossbar network within the C-Switch, which offloads and increases the capacity of the more expensive network (switches) by the less expensive network (crossbars). This is a similar kind of streamlining of the switching network by C-Switch that layer 2 switching networks perform relative to the more expensive router/layer 3 networks. In both cases, a lower level, more primitive and less expensive form of switching takes over some of the work of the more expensive form of switching.

Wiring Improvements

Although the d-cube wiring is highly regular and can be performed mechanically (a la weaving), the 'long hops' do complicate the simple pattern enough to make it error prone for brute force manual wiring. Since this problem is shared by many other desirable topologies, a general solution is desirable to make networks built according to the invention practical in the commercial world.

Computer Assisted Manual Wiring

In this method, the switches are numerically labeled in a hierarchical manner tailored to the packaging and placement system used, allowing technicians to quickly locate the physical switch. A wiring program displays the wiring instructions in terms of the visible numbers on the switches (containers, racks, boxes, rooms) and ports. The program seeks to optimize localization/clustering of the wiring steps, so that all that is needed in one location is grouped together and need not be revisited.

C-Box—Prewired Crossbar for Fixed Topologies

This is a more attainable lower tech variation of the C-Switch in the form of a connector box with pre-wired topologies, such as enhanced hypercubes, within certain range of sizes. Front panels of the C-Box provide rows of connectors for each switch (with ~10-20 connectors per switch) with numbered rows and columns for simple, by the numbers, wiring for the entire rows of rack switches and hosts.

C-Box is as easy to hook up and functions exactly as the C-Switch (e.g. with a built in processor and a unified control plane per box), except that the topology is fixed. As with the C-Switch, multiple C-Boxes can be connected via thick cables to form a larger network.

Automated Wiring Verification

This facility is useful for the manual wiring methods described above. Diagnostic software connected to the network can test the topology and connections, then indicates which cables are not connected properly and what corrective actions need to be taken.

Data Center Application

Figure 20:
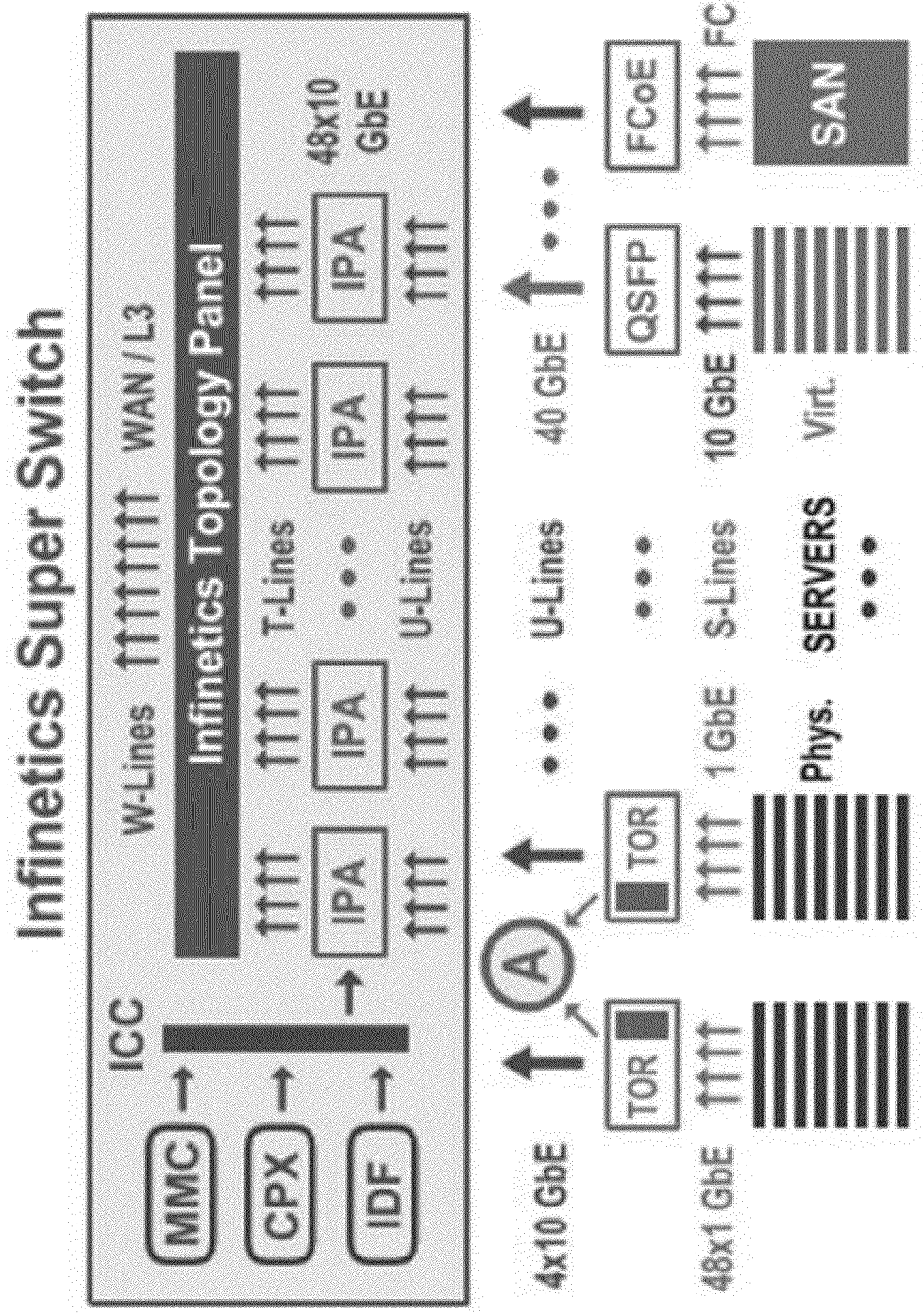
FIG. 20 illustrates the integrated super switch architecture across an entire data center according to an embodiment of the invention.
Figure 21:
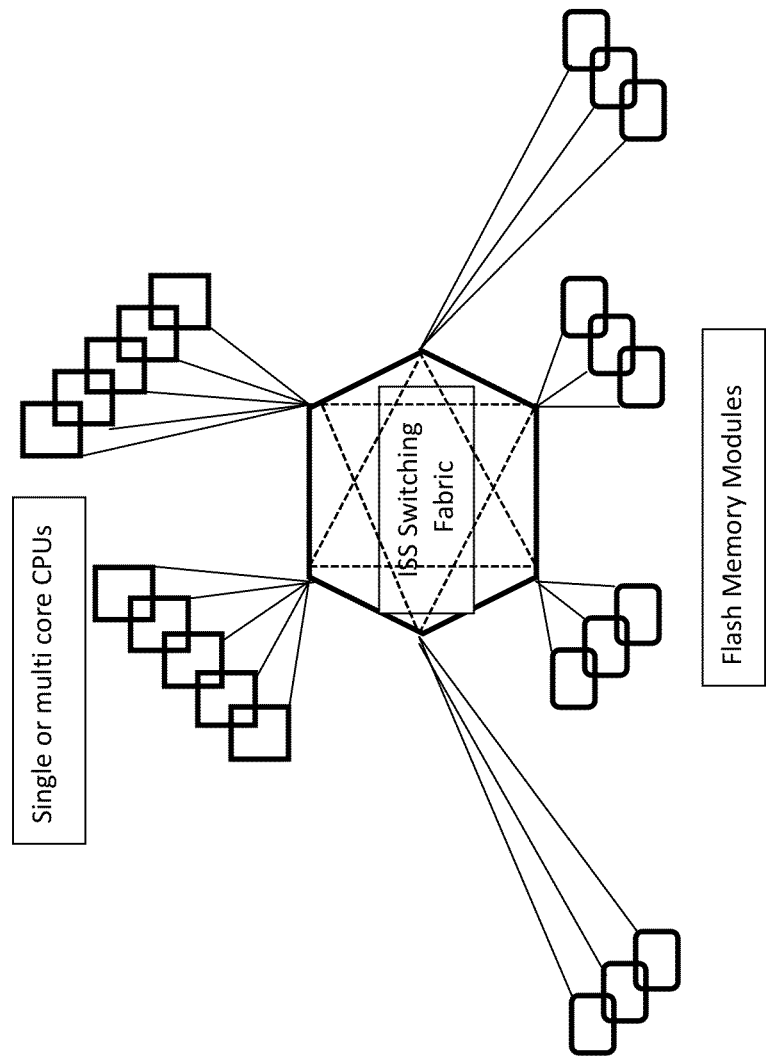
FIG. 21 illustrates a network architecture showing a flexible radix switch fabric according to an embodiment of the invention.

FIG. 20 shows an embodiment of the invention applied to a complete data center. The particular details of this diagram are illustrative only, and those skilled in the art will be able to see that many other combinations of data center components with various attributes such as number or ports and port speed may also be used, and connected in various topologies. The cables (vertical arrows) are coded by capacity and named according to their roles: S(erver)-Lines from server to TORs or transceivers, Uplink)-Lines from edge to network ports, T(opology)-Lines: internal to the network (aggregate switching fabric via scalable topology & forwarding) and W(AN)-Lines to routers/L3. The only long lines, thus posing cabling bulk problems, are U-Lines, but these already exist in a standard data center. The internal switching fabric of the network consists of the fabric from variable number of common off-the-shelf (COTS) switches with firmware extensions, connected via the Topology Panel (ITP). Depending on size and complexity of topology (which depends on the type of data center), the ITP block may merely symbolize a prescribed pattern of direct connections between ports (by the number wiring), or it can be realized as a prewired connector panel or as programmable crossbar switch.

The network spanned by the T-Lines is the network backbone. The encircled "A" above the top-of-rack (TOR) switches represents fabric aggregation for parts of the TOR fabric which reduces the TOR inefficiencies.

The control and management software, MMC (Management, Monitoring and Control module), CPX (Control Plane Executive) and IDF (Data Factory), can run on one or more servers connected to the network switching fabric.

Virtual Machine Motion

In a data center using virtual machine instances, the MMC and CPX can cooperate to observe and analyze the traffic patterns between virtual machine instances. Upon discovering a high volume of data communication between two virtual machine instances separated by a large number of physical network hops, the MMC and/or CPX can issue instructions to the virtual machine supervisor that results in one or more virtual machine instances being moved to physical servers separated by a smaller number of network hops or network hops that are less used by competing network communication. This function both optimizes the latency between the virtual machines and releases usage of some network links for use by other communicating entities.

Layer 3+Protocol Performance Improvement

The most commonly used layer 3 (or higher) reliable communication protocols, such as TCP and HTTP, which have large communication overheads and non-optimal behaviors in data center environments, can be substantially optimized in managed data center networks with a unified control plane such as in the current invention.

The optimization consists of replacing the conventional multi-step sequence of protocol operations (such as three way handshake and later ACKs in TCP, or large repetitive request/reply headers in http) which have source and destination addresses within the data center, with streamlined, reliable Layer 2 virtual circuits managed by the central control plane where such circuits fit naturally into the flow-level traffic control. In addition to reducing communication overhead (number of frames sent, or frame sizes via removal of repetitive, large headers) and short-circuiting the slow error detection and recovery (the problem known as "TCP incast performance collapse"), this approach also allows for better, direct implementation of the QoS attributes of the connections (e.g. via reservation of the appropriate network capacity for the circuit). The network-wide circuit allocation provides additional mechanism for global anticipatory traffic management and load balancing that operates temporally ahead of the traffic in contrast to reactive load balancing. This approach of tightly integrating with the underlying network traffic management is a considerable advance over current methods of improving layer 3+ protocol performance by locally "spoofing" remote responses without visibility into the network behavior between the spoofing appliances at the network end points.

Further, by operating in the network stacks/hypervisor, the virtualized connections cooperate with the Layer 2 flow control, allowing for congestion/fault triggered buffering to occur at the source of the data (the server memory), where the data is already buffered for transmission, instead of consuming additional and far more expensive and more limited fast frame buffers in the switches. This offloading of the switch frame buffers further improves the effective network capacity, allowing switches to handle much greater fluctuations of the remaining traffic without having to drop frames.

Flexible Radix Switch Control Plane

Control Plane Capabilities

The FRS Control Plane (FRS-CP) makes use of the advanced routing and traffic management capabilities of the Infinetics Super Switch (ISS) architecture. It can also be used to control conventional switches, although some of the capabilities for Quality of Service control congestion control may be limited.

FRS-CP provides:

Performance

Controls the flat fully meshed layer 2 substrate/fabric to maximize effective throughput to near physical limits Self-configuring, self-balancing, self-healing dynamic networks Device and service level bandwidth optimization and QoS guarantees Management Unified logical management framework for all networked devices Hierarchical group-based management to reduce large network complexity Autonomic, self-healing traffic flow management Security Single point of authentication for all points of attachment and services at origin Group-based networked device isolation throughout physical and virtualized networks Cost Savings Far less network infrastructure required; substantial savings on capital expenditures, power, and payroll Subsumes the functionality of other monolithic appliances such as load balancers, NATs, firewalls Control Plane Architecture FRS-CP can include a central control system that connects directly to all the switches in the network, which may be replicated for redundancy and failover. Each switch can run an identical set of services that discover network topology and forward data packets.

Figure 24:
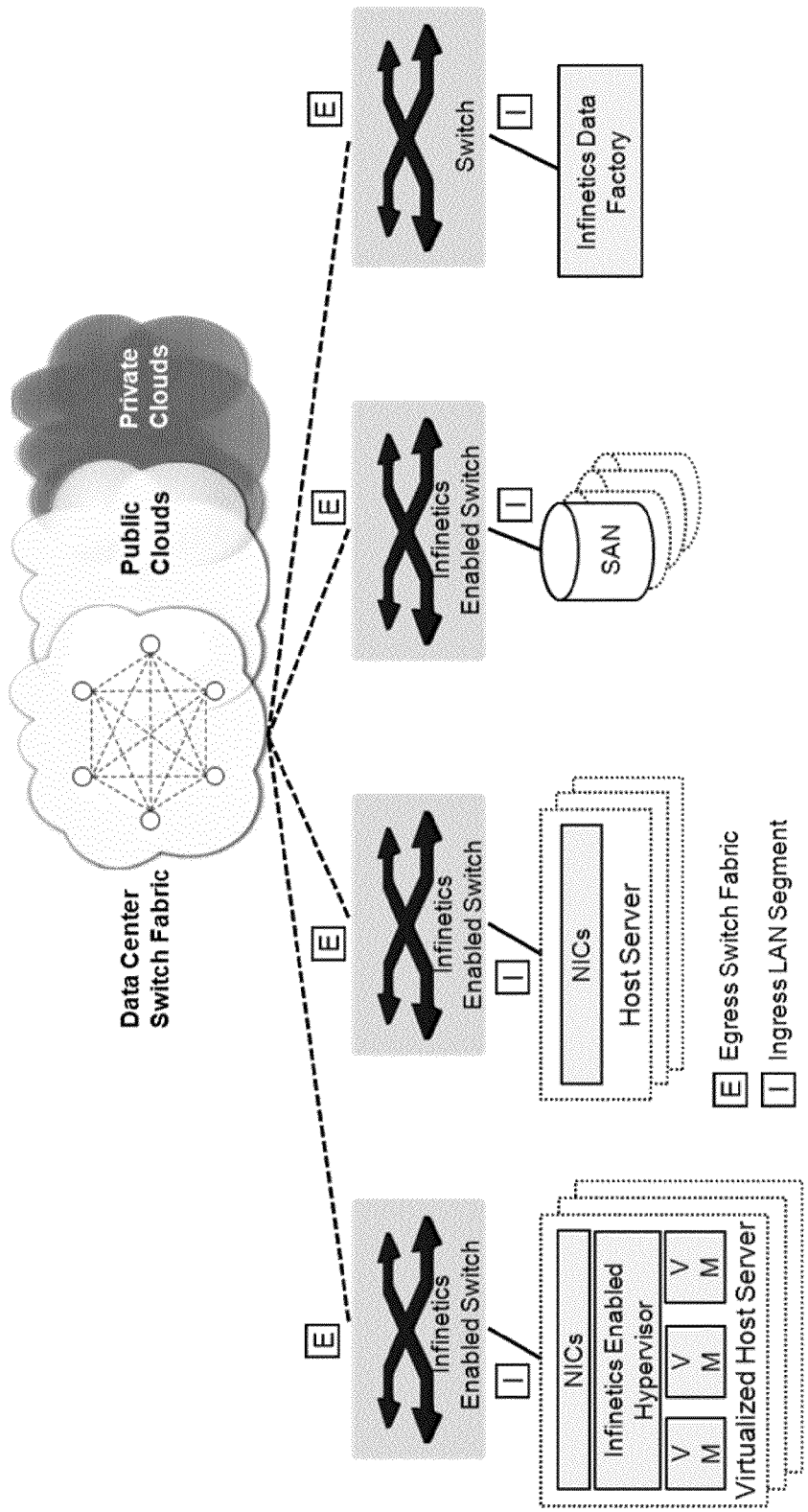
FIG. 24 illustrates a network architecture according to one embodiment of the invention.

Switches can be divided into three types based upon their role in the network, as shown in FIG. 24:

Ingress switches
Fabric switches
Egress switches

ARP and broadcast squelching. When a specific machine attempts to locate another machine on the network in a classic network, it sends out a broadcast ARP (sort of a where are you type message), which will be transmitted across the entire network. This message needs to be sent to every machine across the network on every segment which significantly lowers the throughput capacity of the network. We keep a master list (distributed to every switch) of every host on the network, so that any host can find any other host immediately. Also any other broadcast type packets which would have been sent completely across the network are also blocked. (** See CPX Controller/Data Factory)

Overview

Data Factory (IDF)

Figure 25:
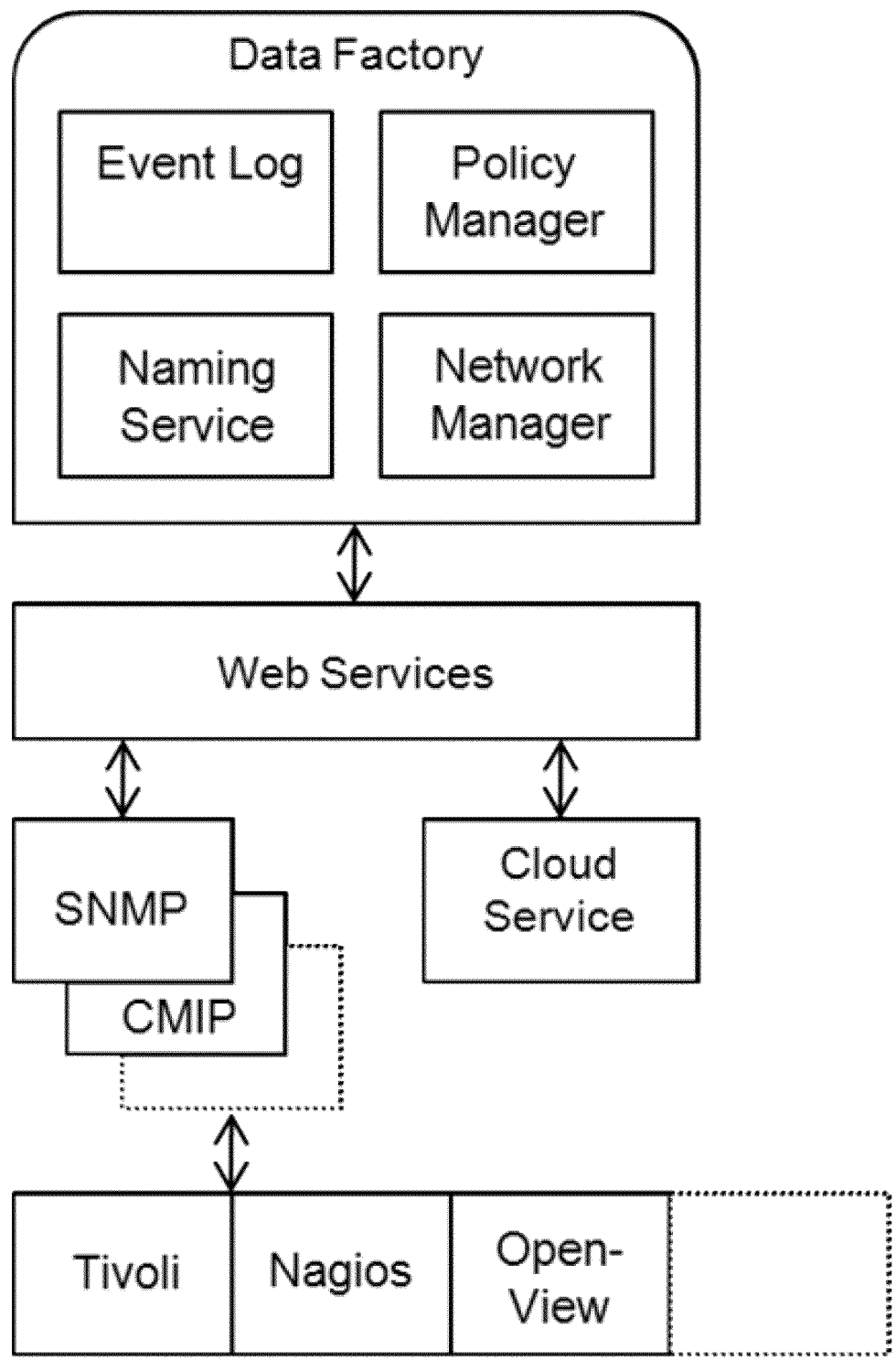
FIG. 25 illustrates a system including a Data Factory according to some embodiments of the invention.

FIG. 25 shows a system according to one embodiment of the invention. The Data Factory component can be used to establish the behavior of the IPA Network. The Control Plane Executive (CPX) uses the data stored in the data factory to configure the network and to set up services such as security and quality guarantees. Management consoles access this component to modify system behavior and retrieve real time network status.

Control Plane Executive (CPX)

Figure 26:
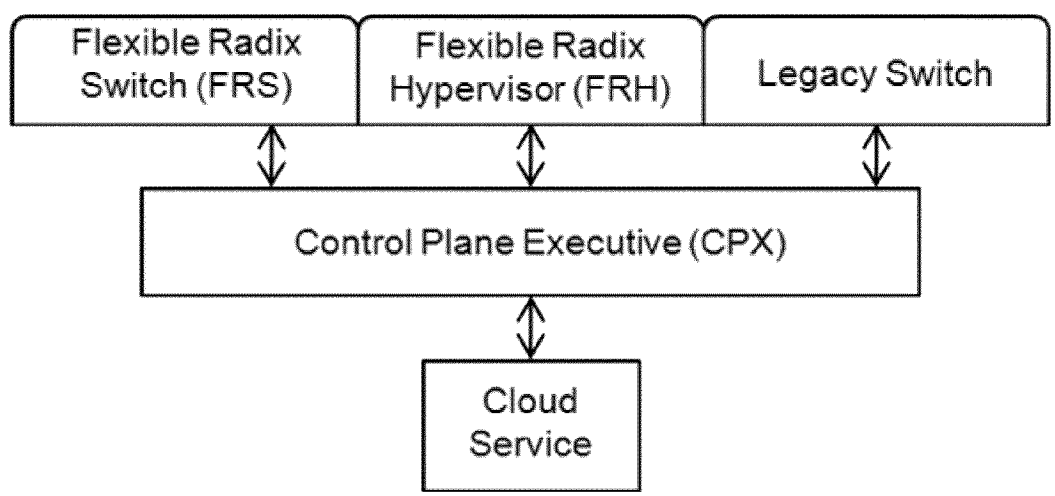
FIG. 26 illustrates a system interconnecting a control plane executive (CPX) according to some embodiments of the invention.

The Data Factory communicates with the Control Plane Executive (CPX) through a service interface using a communication mechanism such as Thrift or JSON as shown in FIG. 26. Any form of encryption can be supported. In accordance with some embodiments of the invention, a public key encryption system can be used.

Universal Boundary Manager (UBM)

In accordance with some embodiments of the invention, the UBM can provide some or all of the following functions:

- Abstracts the physical network to a unified and hierarchical logical group with rights-based inheritance for security and QoS parameters
- Controls visibility of hosts and services
- Provides a single "Firewall" around perimeter of entire layer 2 network managing routing decisions for quality assurance and security enforcement for network access
- Scriptable policy management based upon time-of-day, congestion and application type
- Data stored in the Data Factory, and read by CPX for distribution to the switches.

A UBM entry can describe a name for an organization or a specific service. A UBM entry could be a company name like ReedCO which would contain all the machines that the company ReedCO would use in the data center. A UBM entry can also be used to describe a service available in that data center. A UBM entry has the following attributes:

Name of node
DNS Name of this node (for DNS lookup)
Port(s)—these are the port(s) that are allowed to the specified machines. If there are no ports, then this is a container Node which means it is used to store a list of allowed machines.
QOS information
Parent Node. Each parent can have multiple child Nodes, but each child can only have one parent Node.
Allow Public Access To allow external access, a flag can be provided in or associated with the Node definition that indicates that this Node can be accessible from anybody without restrictions. So a typical company with a Database server, Backup Database server, WWW server, and Backup server could look like the following:

COMPCO (Lists all four computers, but no public access)
DB (lists just the Database server)
BACKUPDB (lists just the backup database server)
BACKUP (Lists just the backup server)
WWW (Lists just the WWW server, but allow public connections)

A machine table contains at least the following information:

MAC Address
IP Address (If the machine is defined as static)
Description of machine The firewall rules that are necessary to allow dataflow across the network can be created from this table. Only flows that are allowed will be sent to the KLM.

UBM Service

The Universal Boundary Manager service can provide membership services, security services and QoS. There can be two or more types of UBM groups:

Transparent UBM Group

A transparent group can be used as an entry point into the IPA Eco-System. It can be visible and allow standard IP traffic to flow over its interface—UBM Interfaces can be determined by port number—e.g. Port 80. This type of group can be used to handle legacy IP applications such as Mail and associated Web Services. Since a Web Service can be tied to an IP port, limited security (at the Port Level) and QoS attributes (such as Load Balancing) can be attributes of the UBM structure.

| Transparent UBM Group Features |
| --- |
| Visible |
| Limited Security (Port Level)/No Security |
| Allows legacy IP (v4 & v6) Traffic |
| Qos Lite |

| Transparent UBM Group Attributes |
| --- |
| Traffic Sensitive Routing/Most Efficient Path to Destination |
| Layer 2 Ring Routing (Distributed Hash) |
| Layer 3 Fallback if Layer 2 Ring Routing Fails |
| Connectionless QoS Tunnel |
| Explicit Congestion Control Notification |

Opaque UBM Group

An opaque group can have all the attributes of the Transparent group's attributes, but allows for the extension of pure IPA security, signaling (switch layer) and the ability to provided guaranteed QoS.

| Opaque UBM group Features |
| --- |
| Hidden - group Members only know about group Members |
| Membership Driven |
| Secure (Utilizing Public Key Security or Lattice based cryptography) |
| Polymorphic Membership Model (The rise of Inheritance) |
| Pure IPA |
| Guaranteed QoS based upon proprietary meshed network |

| Opaque UBM group Attributes |
| --- |
| All of the transparent group benefits |
| Infinetics Certificate Authority Security Sub-System |
| Guaranteed QoS Properties |
| Signaling |

The major extensions to the Opaque group can include the security attributes along with the guaranteed QoS attributes. Multiple opaque or visible groups can be defined from this core set of attributes.

Firewall

The firewall can be a network-wide mechanism to pre-authorize data flows from host to host. Since every host on the network must be previously configured by the network administrator before it can be used, no host can successfully transmit or receive data unless it has been authorized in the network. Furthermore because of the built in security model applied to all devices connected to the network, hosts can only communicate with other authorized hosts. There is no way a rogue host can successfully communicate with any unauthorized host. The data defined in the UBM can control all access to hosts. The KLM loaded into each Hypervisor can provide this functionality. Alternatively, this functionality can be provided on each switch for each attached physical host.

Figure 22:
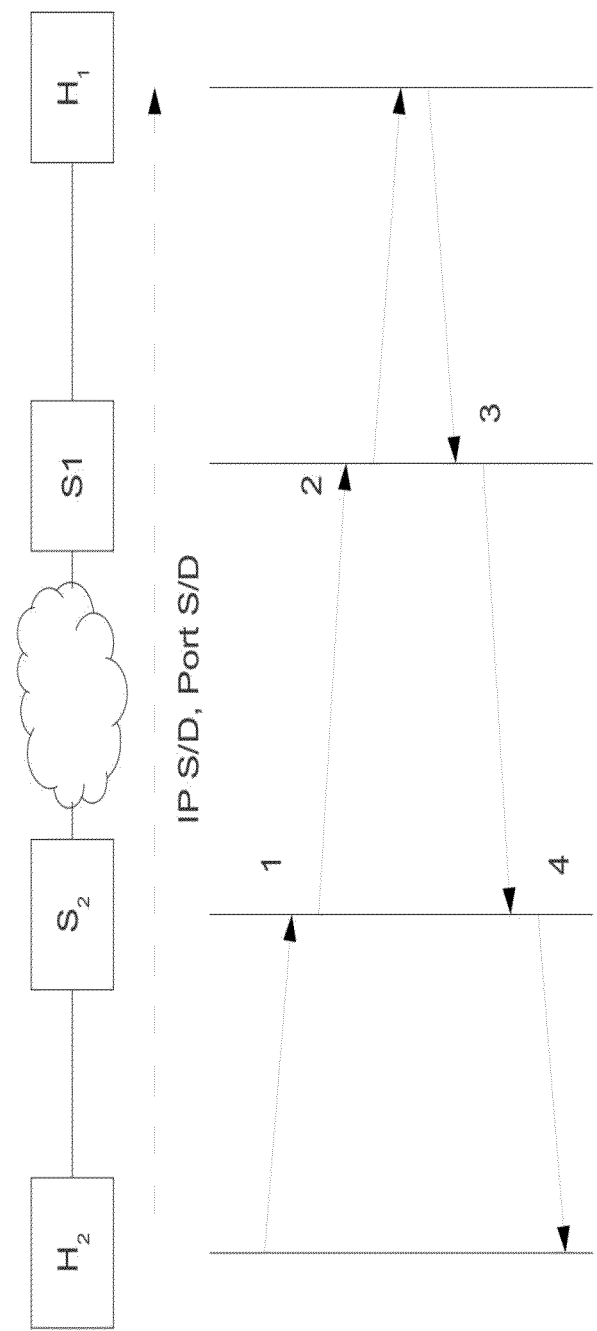
FIG. 22 illustrates the flow of a data packet from an ingress switch through a network according to an embodiment of the present invention.

The ingress switch where a data packet from a host first arrives in the network can use the following rules to determine whether the data packet will be admitted to the network as shown in FIG. 22:

Forward Path Rules
Ingress Switch
   I. Is H2 using the correct Ethernet Address? (Drop point 1)
      I. Use source IP address to fetch triplet, compare addresses
   II. Can H2 send to H1 on the given destination port? (Drop point 2)
      I. (Use UBM group rules.)
   III. Send packet to S1
   IV. Create "reverse" rule for H1->H2 for given source Port
      I. Time stamp and age out rule.
Egress Switch
   I. Can H2 send to H1 on the given destination port? (Drop point 3)
   II. Create "reverse" rule for H1->H2 for given source Port
      I. Time stamp and age out rule.
   III. Send packet to H1
Reverse Path Rules
Ingress Switch
   I. Is H1 using the correct Ethernet Address? (drop point φ
      I. Use source IP # to fetch triplet, compare MAC #s
   II. Can H1 send to H2 on the given destination port? (drop point 5)
      I. UseUBM group information
   III. Send encapsulated packet to S2
Egress Switch
   I. Can 112 send to H1 on the given destination port? (drop point 6)
      I. Use reverse rule.
   II. Send packet to 111

This is the opposite way to which traditional firewalls work, where data is allowed to enter the network from any source, the data then traverses the network and is prevented from reaching a destination host once the data packet has nearly reached its intended destination. This significantly lowers "backbone" traffic on the network.

Central Services
Data Factory

This is the starting point for full control of the network. All static and dynamic data is stored here, and a user interface is used to view and modify this data.

CPX Controller

The CPX computer is the Control Plane Executive which controls all switches, and receives and sends data to the switches. This data is what is necessary to route data, firewall info, etc. It also controls the ICP (Integrated Control Plane) module which determines topology, and controls the IFX (Firmware eXtensions) which are installed on every switch and hypervisor.

CPX connects to the Data Factory to read all of the configuration data necessary to make the entire network work. It also writes both log data and current configuration data to the Data Factory for presentation to users.

ICP (Integrated Control Plane)

This module controls each instance of IFX on each switch, and takes that neighbor data from each IFX instance and generates cluster data which is then sent back to each IFX instance on each switch.

CPX Interaction with ICP

The types of data that will flow through CPX for the data plane are:
Triplets
Firewall Rules/QoS Data
Topology Information
Logging Data Triplets (which contain the Host IP Address, Switch ID, and MAC address of the host) are generated by the Host detector that runs on each switch. The detected triplets are sent through the Host Controller to the CPX controller. First the triplet's data is validated to make sure that this host MAC address (and IP address if defined), is a valid one. Once validate, the triplet is enabled in the network. Optionally, before a host's triplet is added to the database, the host can be forced to validate themselves using various standard methods such as 802.1x.

The triplets can be sent to the Data Factory for permanent storage, and are also sent to other switches that have previously requested that triplet. The sends will be timed out, so that if a switch has not requested a specific triplet for a specific time, the CPX will not automatically send it if it changes again unless the ICP requests it.

When a switch needs to route data to a host that it does not have a triplet for, the host controller sends a request for the triplet associated with the specific IP address. The CPX looks up that triplet and sends it to the IFX which in turn sends it to the KLM module so that the KLM can route data.

Firewall rules and Quality of Service (QOS) data travel along the same route as triplets. A switch always receives all the firewall rules involving hosts that are connected to that switch so that quick decisions can be made by the KLM module. If a firewall rule changes, then it is sent to the IFX which sends it to the KLM module. In cases where there are firewall rules with schedules or other "trigger points", the firewall rules are sent to the IFX and IFX sends them to the KLM module at the appropriate time.

Logging Data such as data sent/received, errors, etc is sent from the KLM (or some other module) to IFX, and then to CPX which sends it to the Data Factory.

ICP Interaction with IFX on Switches

CPX controls ICP which then controls each instance of IFX on each switch through ICP, telling it to send "discover" packets, and return back neighbor topology data to ICP. All this data is stored in the Data Factory for permanent storage, and for presentation to users. This topology data is used by IFX to generate routes. When link states change, the IFX module notifies ICP, and a new routing table will be generated by IFX. Initially IFX will reroute the data around the affected path.

CPX Interaction with Data Factory

CPX reads the following data from the Data Factory:
   Host information to validate the host being allowed, including authorization keys, etc.
   Firewall Rules and QoS for inter-host interaction
   Triplets that have been previously deposited into the Factory
   Routing and topology data CPX writes the following data into the Data Factory:
  Triplet information determined by host detectors
  Topology and routing data determined by CPX and IFX
  Log information about changes in network infrastructure, including routing, host, and other data ICP Data Factory The following information is needed by ICP.

This can happen at a very high rate upon startup, and can reoccur on a regular basis very slowly
  Switch Information
    Key Value will either be MAC or IP address
    Data Returned will be information necessary for to calculate topology, and identify switches.
  Topology information previously written by CPX before. This will be used as "hints" to restart routing in case of a failed switch for example
  Routing information necessary to route data between switches. This will need to be updated on all affected switches whenever the ICPupdates the Datastore Factory.

The following information will be written by ICP.

This can happen on a very regular basis (e.g., at least 1 per second and can occur more often), but the writes can be buffered and delayed for writing if need be. The data will not be read on a regular basis, except for startup, but will need to be updated on all other switches. Of course the data will be read by the User for network status monitoring.
  Switch Status—Current Status of each switch, including port status
  Topology information—links between switches including metadata about each link
  Routing information. Calculated "best" routes between switches ICP Data Needed for Switches The following information will be written by the switches
  Triplets from switches for hosts. These will be written whenever a new host comes online, or a host goes away. They can happen anywhere from once every few seconds, to much more often as hosts come online. There needs to be some sort of acknowledgement that the specific host being added already exists in the UBM so that we can route to that host. If the host does not exist we need to flag that host's information so that the user can see that a undefined host has been activated on the network, and allow the user to add it to the UBM.

The following information will be read by the switches.

All of these reads can occur as fast as possible. Any slowness in these reads may slow down the data path.
  Triplets for hosts. This can happen quite often, and needs to be as fast as possible.
  UBM data that allows all the data necessary to create the firewall/QOS rules, multi-server data, and everything else necessary to route to that host.
  The data that will be delivered to the switches from the UBM is:
    Firewall Rules with QOS information
    Multi-server data. This is all the servers of an equivalent type.

Switch Services

The following services can run on all switches in the network.

IFX (Firmware eXtensions)

Figure 23:
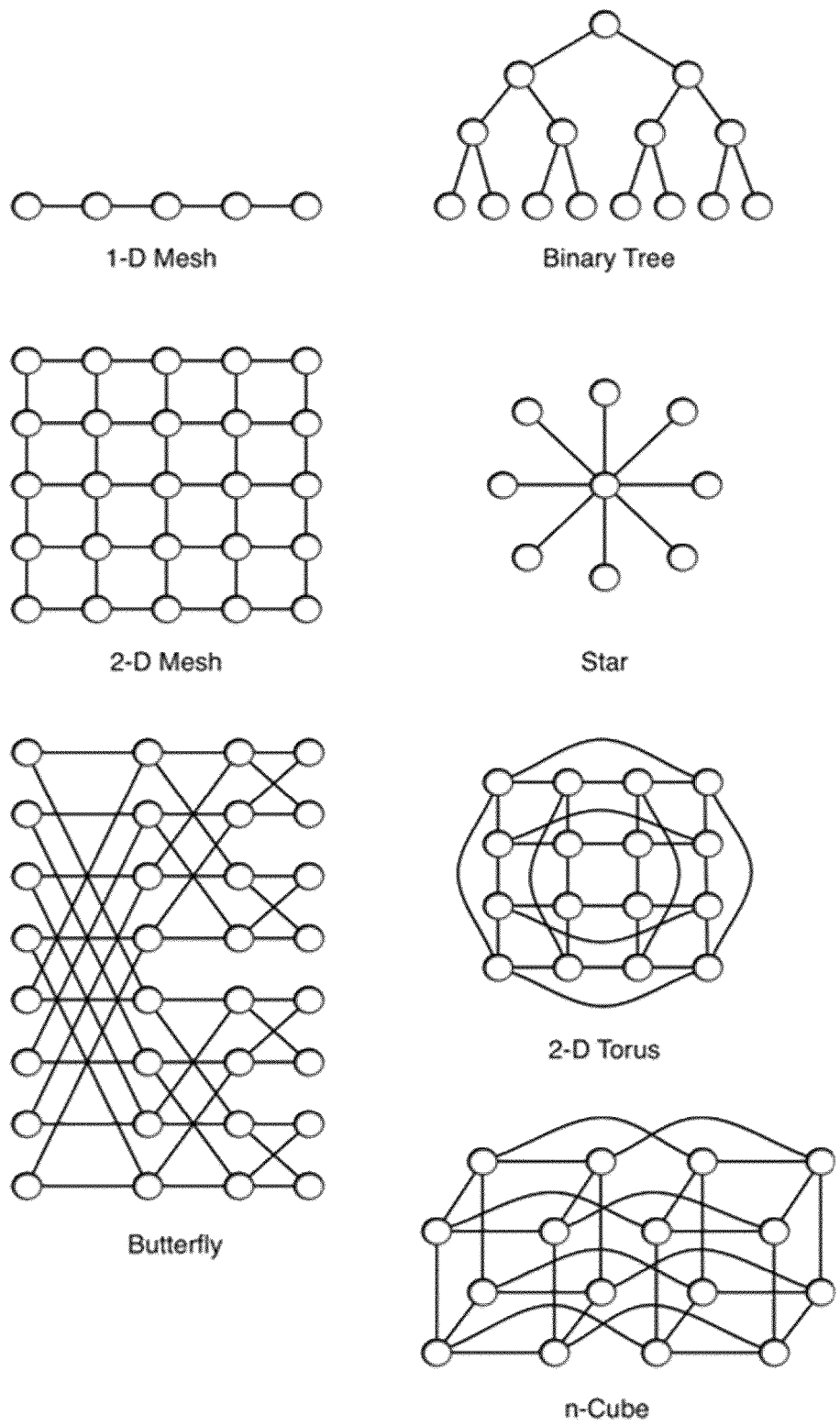
FIG. 23 illustrates various network logical topographies according to an embodiment of the present invention.

This module runs on each switch and is responsible for determining the topology of the neighbors. It sends data back to the ICP module about its local physical connectivity, and also receives topology data from ICP. It supports multiple simultaneous network logical topologies, including n-cube, butterfly, torus, etc as shown in FIG. 23. It uses a raw Ethernet frame to probe the devices attached to this switch only. It also takes the topology data from ICP, and the cluster data from ICP and calculates forwarding tables.

IFXS (Firmware eXtensions for Servers)

This module runs on each hypervisor and interact s with the Hypervisor/KLM module to control the KLM. Flow data related to how many bytes of data flowing from this hypervisor to various destinations is accepted by this module and used to calculate forwarding tables.

Hypervisor Controller

This can include a Linux kernel loadable module (KLM) that implements the Data plane. It can be controlled by the Switch Controller.

The input to this module are:
  Triplets from this and other switches
  Firewall Rules and QoS Associated data
  Routes from IFX The KLM can route packets from hosts to either other hosts, or to outside the network if needed (and allowed by rules). All packets sent across the "backbone" can be encrypted, if privacy is required.

The KLM switch module can have access to caches of the following data: triplets (they map IPv4 addresses into (Egress Switch ID, host Ethernet Address pairs); routes (they define the outbound interfaces, and next hop Ethernet Address to use to reach a given Egress Switch); and firewall rules (they define which IPv4 flows are legal, and how much bandwidth they may utilize).

The KLM can eavesdrop on all IP traffic that flows from VM instances (that are supported by the local hypervisor). It can, for example, use functionality (defined in the Linux netfilter library) to STEAL, DROP, or ACCEPT individual IP datagrams that are transmitted by any VM.

When a datagram is transmitted by a VM, the KLM switch can intercepts (STEALs) it and determines if firewall rules classify the corresponding flow to be legal. If it's illegal, the packet is dropped. If the flow is legal and it's destination is local to the hypervisor, it's made to obey QoS rules, and delivered. If the flow is legal and exogenous, the local triplet cache is consulted with the destination IP address as an index. If a triplet exists, it determines the Egress Switch ID (which is just a six-byte Ethernet address). If a route also exists to the Egress switch, then the packet will be forwarded with the destination switch Topological MAC address put into the Ethernet frame.

The KLM can use a dedicated Ethernet frame type to make it impossible for any backbone switch or rogue host to send a received frame up its protocol stack.

When a frame arrives at a hypervisor, it can be intercepted by its kernel's protocol handler (functionality inside the KLM) for Ethernet frame type defined. The protocol handler can examine the IP datagram, extract the destination IP address, and then index it into it's triplet cache to extract the Ethernet address of the local VM. If no triplet exists, the frame can dropped. The socket buffer's protocol type can switched from 0xbee5 to 0x0800, and the packet can be made to obey QoS rules before it is queued for transmission to the local host.

The KLM can use IFXS, for example, as its method to talk with CPX to access the data factory.

EXAMPLES

FIG. 24 shows a typical use case where switching systems according to various embodiments of the invention can be used within a data center.

Figure 15:
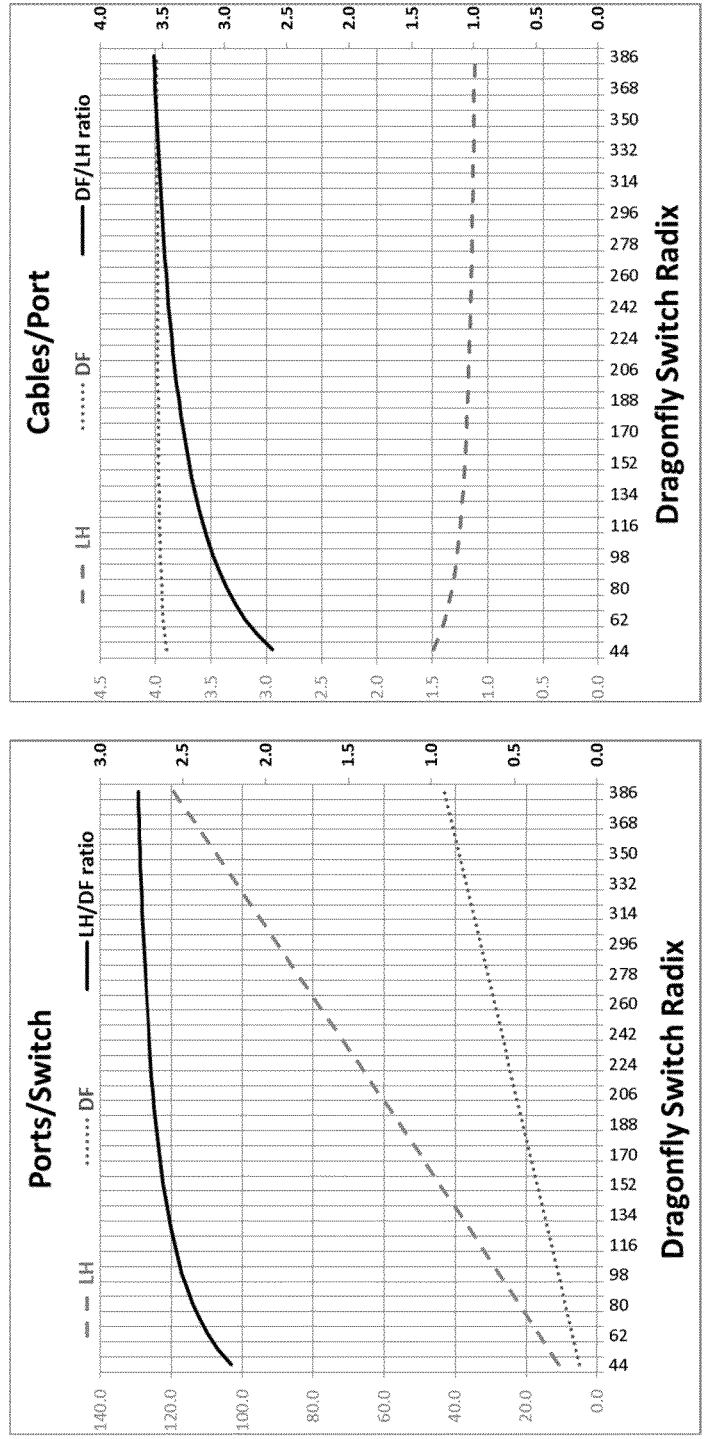

FIG. 15 shows one embodiment of the invention where the FRS is used alone to provide an ultra-high bisection bandwidth connection between multiple CPU cores and a large array of flash memory modules. The prior art approach for having CPU cores transfer data to and from flash memory treats the flash memory modules as an emulated disk drive where data is transferred serially from a single "location". The invention allows large numbers of CPUs or other consumers or generators of data communicate in parallel to multiple different flash memory storage modules. In this embodiment of the invention, the ISS network can be designed using the physical constraints of the various methods that semiconductor devices are packaged and interconnected. This embodiment results in a network that has a different connection pattern than would be used in a data center, but still provides extremely high bisection bandwidth for the available physical connections within and between semiconductor devices and modules.

Additional supporting information relating to the construction of Long Hop networks is provided in attached Appendix A, which is hereby incorporated by reference.

Those skilled in the art will realize that the methods of the invention may be used to develop networks than interconnect devices or nodes with arbitrary functionality and with arbitrary types of information being exchanged between the nodes. For example, nodes may implement any combination of storage, processing or message forwarding functions, and the nodes within a network may be of different types with different behaviors and types of information exchanged with other nodes in the network or devices connected to the network.

The invention claimed is:

1. A method of constructing a network for the transfer of data from a source device to a destination device the method comprising:
   selecting a base symmetric network structure, wherein the topology of the base symmetric network structure substantially corresponds to a Cayley graph;
   defining at least one of:
     a number of source and destination devices to be connected to the network,
     a number switches to be used in the network,
     a number of ports per switch, and
     an oversubscription characteristic of the network;
   determining a generator matrix as a function of at least one of:
     the number of source and destination devices to be connected to the network,
     the number switches to be used in the network,
     the number of ports per switch, and
     the oversubscription characteristic of the network;
   determining a wiring pattern for interconnecting each of the switches as a function of the generator matrix; and
   interconnecting the switches of the network with interconnecting wires according to the wiring pattern.

2. The method according to claim 1 wherein the base network structure substantially corresponds to a hypercube having a dimension d.

3. The method according to claim 2 wherein the generator matrix is determined as a function of the number of interconnections between switches of the network and the dimension, d, of the hypercube.

4. The method according to claim 1 wherein the generator matrix is an error correcting code (ECC) generating matrix and the wiring pattern is determined by rotating the error correcting code generating matrix.

5. The method according to claim 4, wherein the error correcting code generating matrix is rotated counterclockwise.

6. The method according to claim 1 wherein the oversubscription characteristic of the network is determined as a function of a number of ports defined for connection to source computers and destination computers and a bisection of the network.

7. The method according to claim 6 wherein the bisection is determined as a function of a Walsh function.

8. The method according to claim 7 wherein the bisection is determined by constructing primary equipartitions defined by patterns of 1's and 0s in a Walsh function.

9. The method according to claim 7 wherein the bisection is determined by constructing primary equipartitions defined by the sign pattern in an algebraic Walsh function.

10. The method according to claim 1 wherein the generator matrix is an error correcting code (ECC) generating matrix derived from digital (t,m,s) nets parameters and the wiring pattern is determined by rotating the error correcting code generating matrix.

11. The method according to claim 4 wherein ECC distance metrics are constructed using a Lee distance.

12. The method according to claim 4 wherein ECC distance metrics are constructed using a Hamming distance.

13. A network constructed according to the method of claim 1.

14. A network constructed by connecting a plurality of switched, the network comprising
   a defined number of switches, each switch being connected to at least one other switch by an internal switch connection and the network including a defined number of internal switch connections;
   the switched being arranged in a symmetric network structure, wherein the topology of the base symmetric network structure substantially corresponds to a Cayley graph;
   the switches being interconnected according to a wiring pattern, the wiring pattern being determined as a function of a generator matrix, wherein the generator matrix is determined as a function of the number of internal switch connections.

15. A network according to claim 14 wherein the base network structure substantially corresponds to a hypercube having a dimension d.

16. A network according to claim 14 wherein the generator matrix is determined as a function of the number of internal switch connections and the dimension, d, of the hypercube.

17. A network according to claim 14 wherein the generator matrix is an error correcting code generating matrix and the wiring pattern is determined by rotating the error correcting code generating matrix.

18. A network according to claim 17, wherein the error correcting code generating matrix is rotated counterclockwise.

19. A network according to claim 14, wherein the generator matrix is determined as a function of at least one of:
   a number of source and destination devices to be connected to the network,
   the number switches used in the network,
   a number of ports per switch, and
   an oversubscription characteristic of the network.

20. A network according to claim 19 wherein the oversubscription characteristic of the network is determined as a function of the number of ports defined for connection to source and destination devices and a bisection of the network.

* * * * *